United States Patent
Geng et al.

(10) Patent No.: US 11,867,921 B2
(45) Date of Patent: Jan. 9, 2024

(54) SHORT DISTANCE ILLUMINATION OF A SPATIAL LIGHT MODULATOR USING A CURVED REFLECTOR

(71) Applicant: META PLATFORMS TECHNOLOGIES, LLC, Menlo Park, CA (US)

(72) Inventors: Ying Geng, Bellevue, WA (US); Jacques Gollier, Sammamish, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 393 days.

(21) Appl. No.: 16/858,353

(22) Filed: Apr. 24, 2020

(65) Prior Publication Data

US 2021/0080741 A1 Mar. 18, 2021

Related U.S. Application Data

(60) Provisional application No. 62/900,320, filed on Sep. 13, 2019.

(51) Int. Cl.
*G02B 27/28* (2006.01)
*F21V 8/00* (2006.01)
(Continued)

(52) U.S. Cl.
CPC ........... *G02B 27/283* (2013.01); *G02B 6/005* (2013.01); *G02B 6/0058* (2013.01);
(Continued)

(58) Field of Classification Search
USPC ........................................................ 359/238
See application file for complete search history.

(56) References Cited

U.S. PATENT DOCUMENTS

| 5,387,991 A | 2/1995 | Mitsutake et al. |
| 5,734,505 A | 3/1998 | Togino et al. |
| (Continued) | | |

FOREIGN PATENT DOCUMENTS

| WO | WO2017/003778 A2 | 1/2017 |
| WO | WO2019/111237 A1 | 6/2019 |

OTHER PUBLICATIONS

Facebook Technologies, LLC, International Search Report and Written Opinion, PCT/US2020/048657, dated Feb. 15, 2021, 16 pgs.

(Continued)

*Primary Examiner* — Joseph P Martinez
*Assistant Examiner* — Grant A Gagnon
(74) *Attorney, Agent, or Firm* — Morgan, Lewis & Bockius LLP

(57) ABSTRACT

A display device includes a light source, a spatial light modulator, and an optical assembly. The light source is configured to provide illumination light and the spatial light modulator positioned to receive the illumination light. The optical assembly includes an optical element and a curved reflector that is distinct and separate from the optical element. The curved reflector is disposed relative to the light (Continued)

source so that at least a portion of the illumination light is reflected by the curved reflector toward the optical element, is reflected by the optical element toward the curved reflector, and is transmitted through the curved reflector. A method performed by the display device is also disclosed.

17 Claims, 36 Drawing Sheets

(51) Int. Cl.
    *G02B 27/01*         (2006.01)
    *H04N 9/31*          (2006.01)
    *G02B 17/08*         (2006.01)

(52) U.S. Cl.
    CPC ......... *G02B 6/0061* (2013.01); *G02B 17/086* (2013.01); *G02B 27/0172* (2013.01); *G02B 27/0179* (2013.01); *G02B 27/286* (2013.01); *H04N 9/3152* (2013.01); *G02B 2027/0118* (2013.01); *G02B 2027/0138* (2013.01); *G02B 2027/0178* (2013.01); *G02B 2027/0187* (2013.01)

(56) References Cited

U.S. PATENT DOCUMENTS

| | | |
|---|---|---|
| 6,224,216 B1 | 5/2001 | Parker et al. |
| 6,310,713 B2 | 10/2001 | Doany et al. |
| 6,795,042 B1 | 9/2004 | Nagata et al. |
| 2003/0128341 A1 | 7/2003 | Li |
| 2005/0122487 A1 | 6/2005 | Koyama et al. |
| 2005/0128441 A1 | 6/2005 | Morgan |
| 2005/0174771 A1 | 8/2005 | Conner |
| 2006/0139580 A1 | 6/2006 | Conner |
| 2006/0238660 A1 | 10/2006 | Takeda |
| 2008/0316761 A1 | 12/2008 | Minano et al. |
| 2013/0301011 A1 | 11/2013 | Cook et al. |
| 2017/0374327 A1 | 12/2017 | Ouderkirk et al. |
| 2018/0180980 A1 | 6/2018 | Ouderkirk et al. |

OTHER PUBLICATIONS

Facebook Technologies, LLC, International Search Report and Written Opinion, PCT/US2020/048658, dated Jan. 11, 2021, 14 pgs.
Geng, Office Action, U.S. Appl. No. 16/858,312, dated Feb. 24, 2021, 11 pgs.
Facebook Technologies, LLC, International Search Report and Written Opinion, PCT/US2020/048566, dated Nov. 11, 2020, 10 pgs.
Final Office Action dated Jun. 3, 2021 for U.S. Application No. 16/858,312, filed 24 Apr. 2020, 9 Pages.
International Preliminary Report on Patentability for International Application No. PCT/US2020/048566, dated Mar. 24, 2022, 8 pages.
International Preliminary Report on Patentability for International Application No. PCT/US2020/048657, dated Mar. 24, 2022, 12 pages.
International Preliminary Report on Patentability for International Application No. PCT/US2020/048658, dated Mar. 24, 2022, 11 pages.
Non-Final Office Action dated Feb. 22, 2022 for U.S. Appl. No. 16/858,312, filed Apr. 24, 2020, 9 pages.
Restriction Requirement dated Nov. 18, 2020 for U.S. Appl. No. 161858,312, filed Apr. 24, 2020, 11 Pages.
Non-Final Office Action dated Jun. 22, 2022 for U.S. Appl. No. 16/858,341, filed Apr. 24, 2020, 12 pages.
Non-Final Office Action dated Aug. 31, 2022 for U.S. Appl. No. 16/858,331, filed Apr. 24, 2020, 10 pages.
Notice of Allowance dated Sep. 1, 2022 for U.S. Appl. No. 16/858,312, filed Apr. 24, 2020, 8 pages.
Notice of Allowance dated Dec. 14, 2022 for U.S. Appl. No. 16/858,312, filed Apr. 24, 2020, 3 pages.
Notice of Allowance dated Nov. 21, 2022 for U.S. Appl. No. 16/858,341, filed Apr. 24, 2020, 2 pages.
Notice of Allowance dated Oct. 7, 2022 for U.S. Appl. No. 16/858,341, filed Apr. 24, 2020, 15 pages.

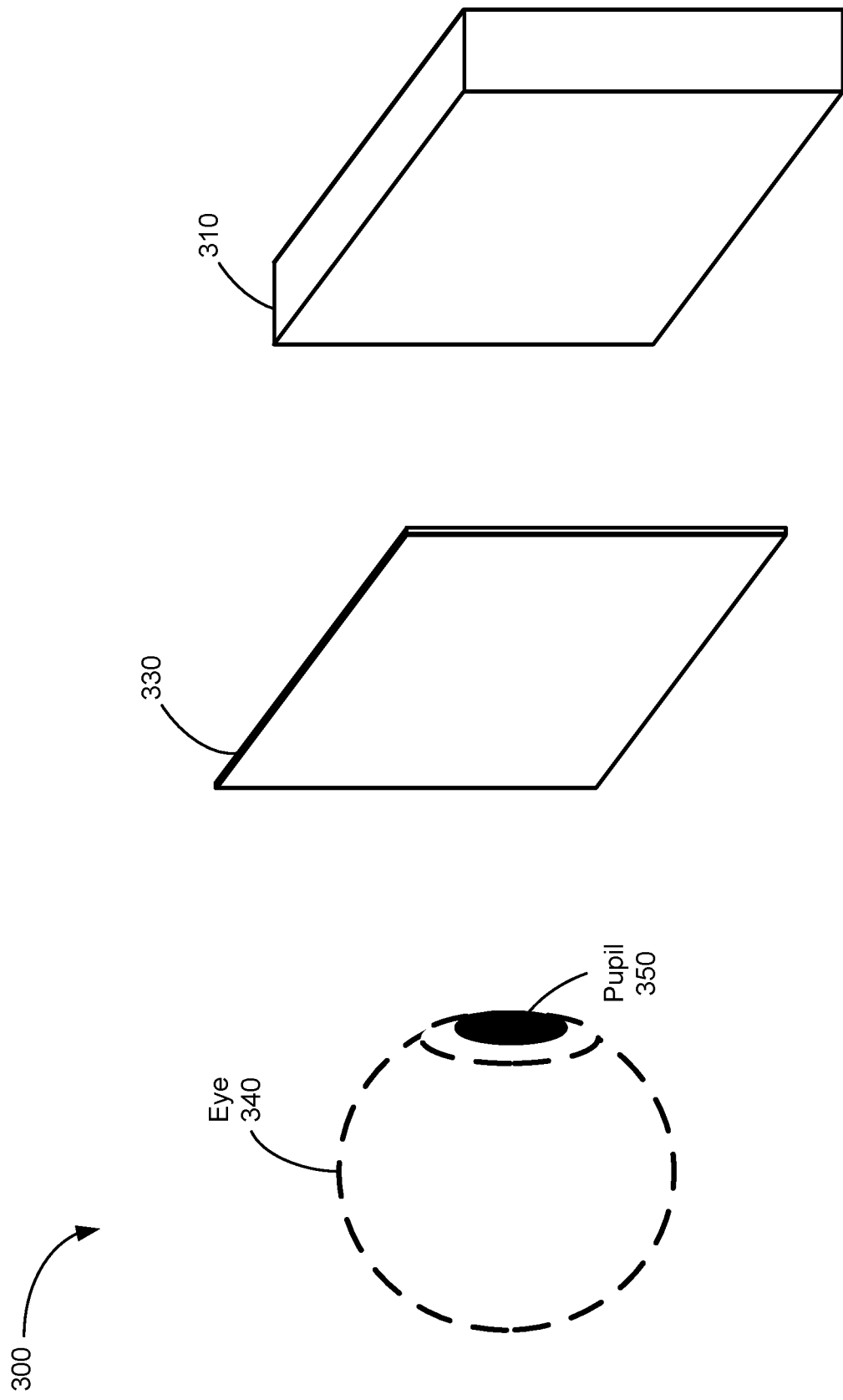

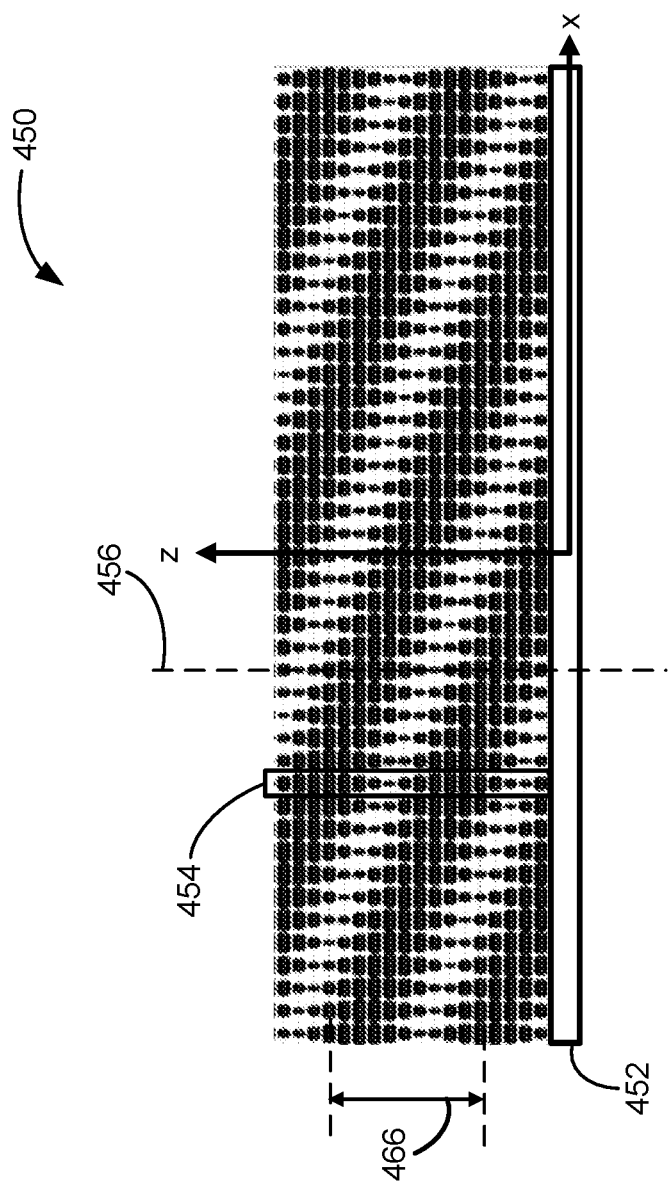

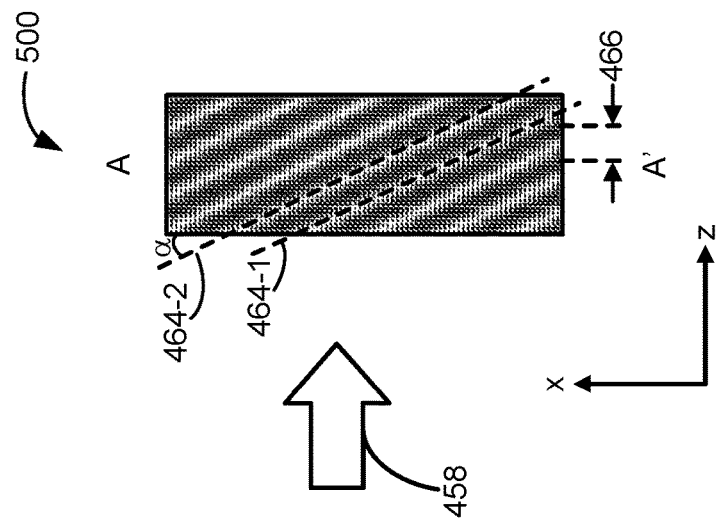
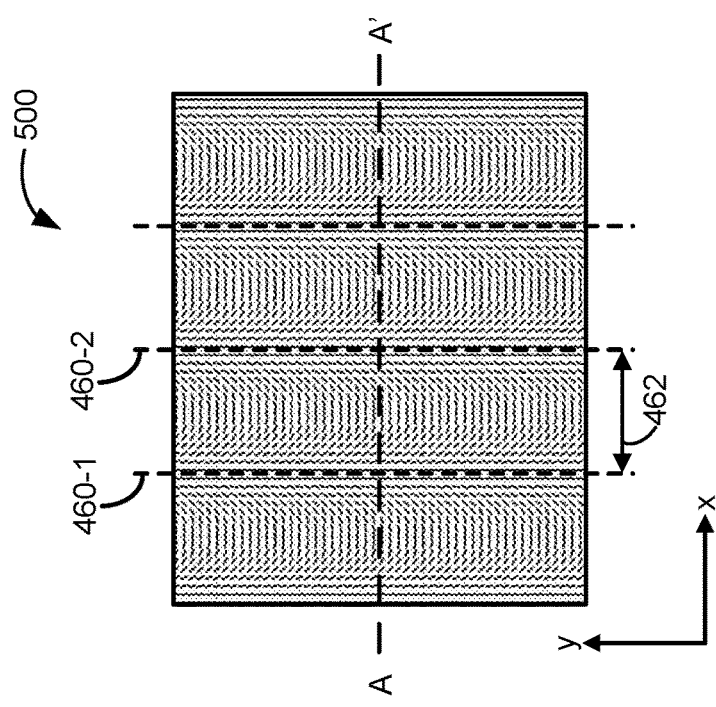
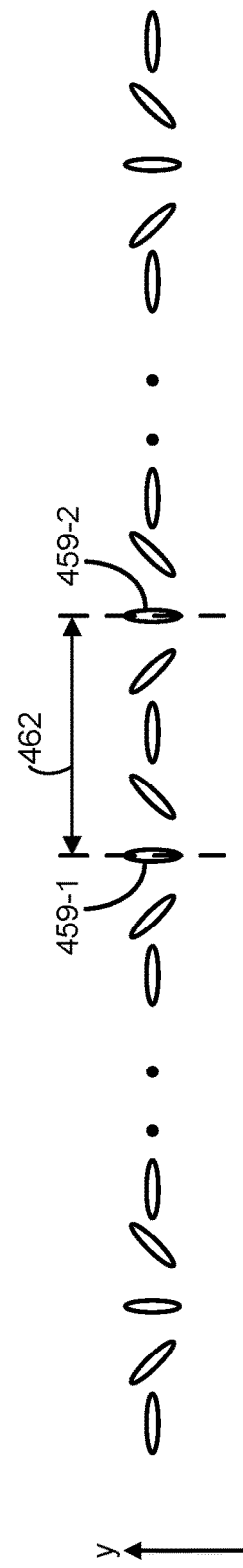
Figure 4C
Figure 4D
Figure 4E

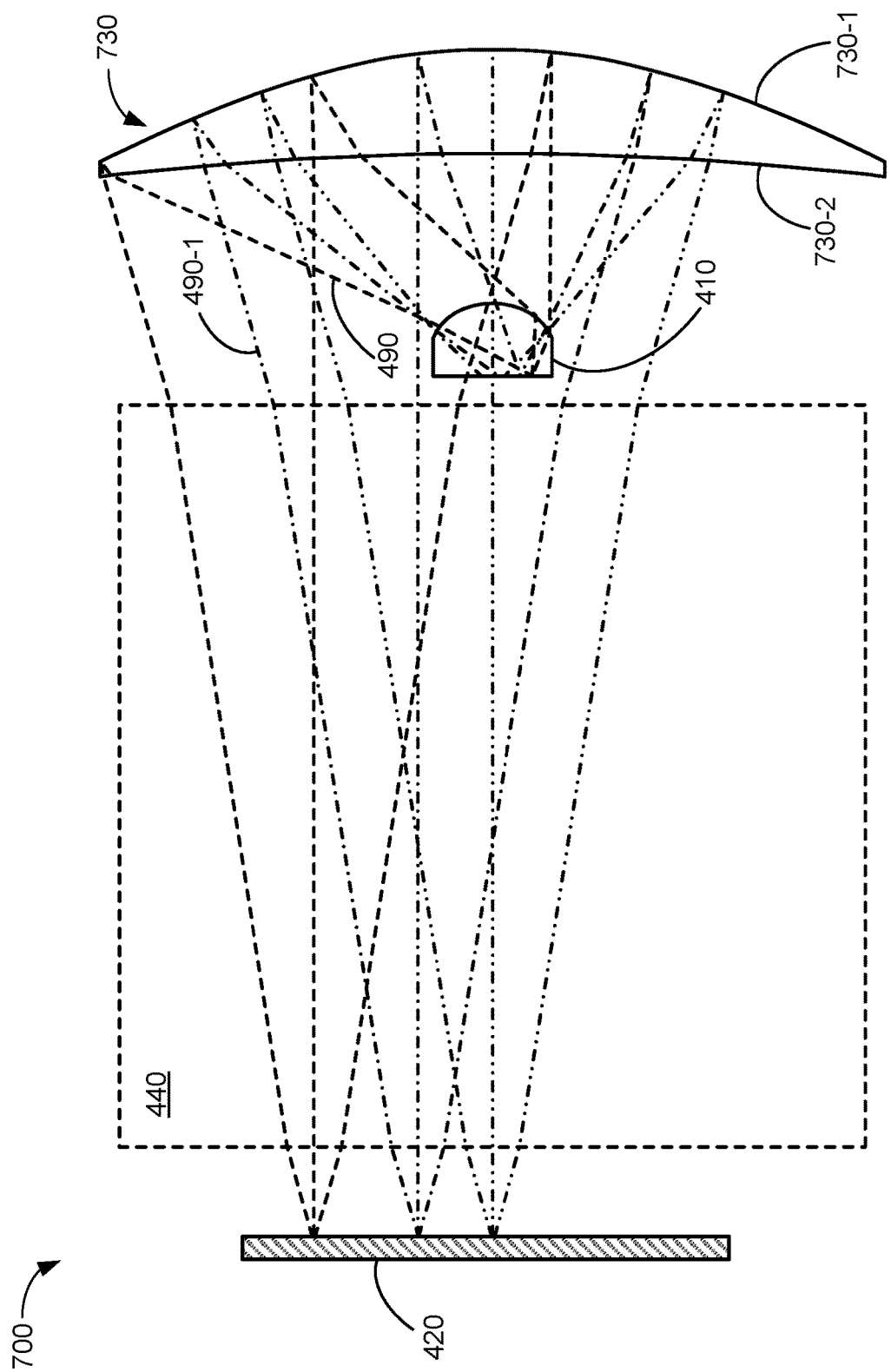

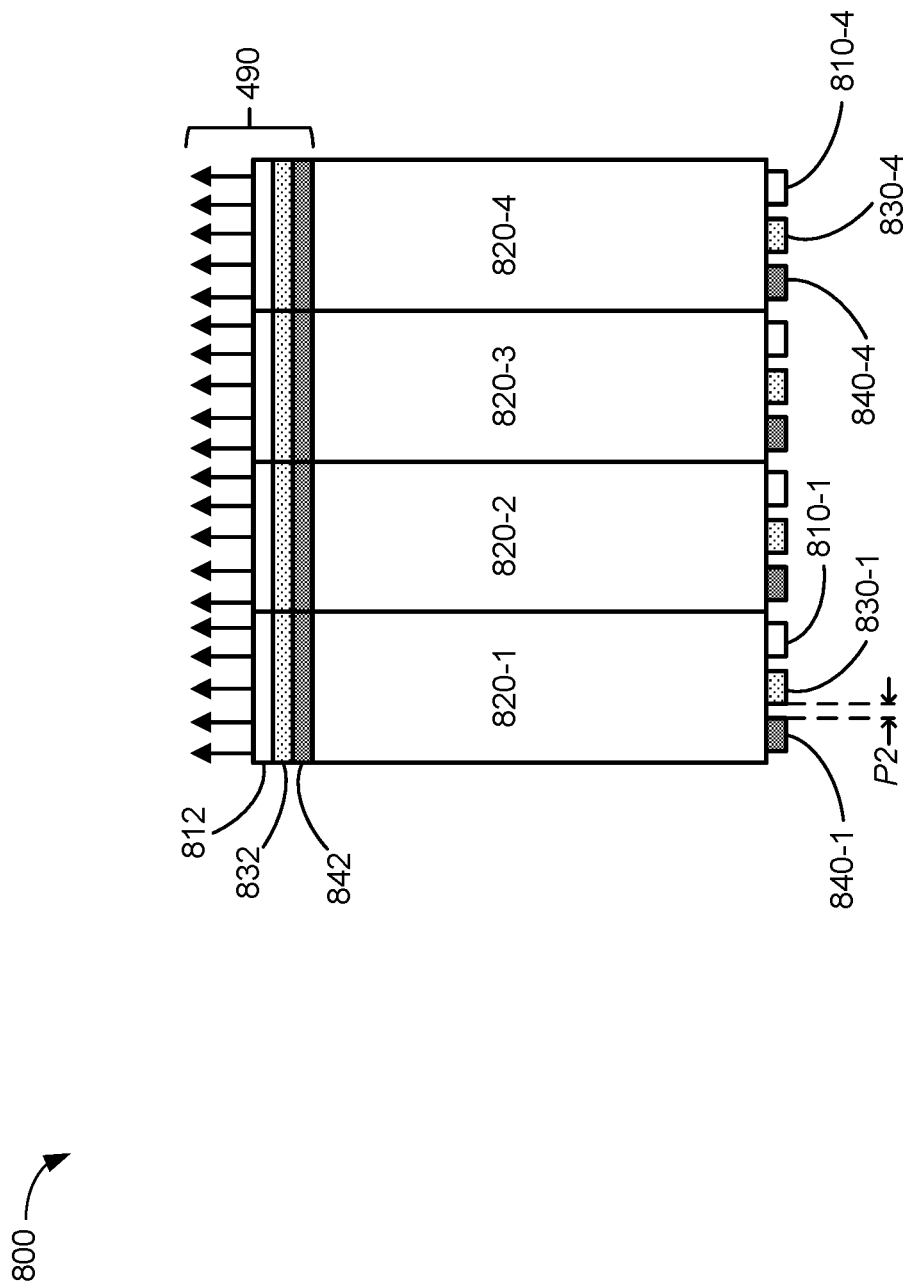

902 Output illumination light from a light source.

904 The light source includes a first plurality of light emitting elements and a plurality of waveguides. Provide, from a respective light emitting element of the first plurality of light emitting elements, first light having wavelengths in a first wavelength range. Guide the first light by a respective waveguide of the plurality of waveguides that is coupled to the respective light emitting element of the first plurality of light emitting elements. Transmit, by the respective waveguide, the first light provided by the respective light emitting element of the first plurality of light emitting elements as at least a portion of the illumination light.

910 The light source also includes a second plurality of light emitting elements. Provide, from a respective light emitting element of the second plurality of light emitting elements, second light having wavelengths in a first wavelength range. Guide the second light by a respective waveguide of the plurality of waveguides that is coupled to the respective light emitting element of the second plurality of light emitting elements. Transmit, by the respective waveguide, the second light provided by the respective light emitting element of the second plurality of light emitting elements as at least a portion of the illumination light.

916 The light source includes a plurality of light emitting elements. Activate a subset, less than all, of the plurality of light emitting elements.

950 Receive, at a beam splitter, the first portion of the illumination light transmitted through the optical assembly. Provide, with the beam splitter the first portion of the illumination light in a first direction toward a spatial light modulator. Output modulated light from the spatial light modulator. Receive, at the beam splitter, the modulated light output from the spatial light modulator. Provide, with the beam splitter, the modulated light in a second direction that is non-parallel to the first direction. Receive, at the beam splitter, the first portion of the illumination light in a first direction toward the spatial light modulator.

952 Modulating the first portion of the illumination light with the spatial light modulator includes reflecting a subset, less than all, of the first portion of the illumination light.

960 Modulate, with the spatial light modulator, the second potion of the illumination light. Output modulated light from the spatial light modulator. Receive, at the beam splitter, the modulated light output from the spatial light modulator. Provide, with the beam splitter, the modulated light in a second direction that is non-parallel to the first direction. The modulated light output from the spatial light modulator includes the modulated first portion of the illumination light and the modulated second portion of the illumination light.

1002 Output illumination light from a light source. The light source is positioned adjacent to a first reflective surface of an optical assembly. The first reflective surface defines an aperture, and the optical assembly has a second reflective surface that is located opposite to the first reflective surface.

1006 The light source includes a first plurality of light emitting elements and a plurality of waveguides. Provide, from a respective light emitting element of the first plurality of light emitting elements, first light having wavelengths in a first wavelength range. Guide the first light by a respective waveguide of the plurality of waveguides that is coupled to the respective light emitting element of the first plurality of light emitting elements. Transmit, by the respective waveguide, the first light provided by the respective light emitting element of the first plurality of light emitting elements as at least a portion of the illumination light.

1010 The light source also includes a second plurality of light emitting elements. Provide, from a respective light emitting element of the second plurality of light emitting elements, second light having wavelengths in a first wavelength range. Guide the second light by a respective waveguide of the plurality of waveguides that is coupled to the respective light emitting element of the second plurality of light emitting elements. Transmit, by the respective waveguide, the second light provided by the respective light emitting element of the second plurality of light emitting elements as at least a portion of the illumination light.

1014 The light source includes a plurality of light emitting elements. Activate a subset, less than all, of the plurality of light emitting elements.

Figure 10A

1040 Transmit a second portion of the illumination light at the second reflective surface toward the third reflective surface. The second portion of the illumination light is distinct from the first portion of the illumination light. Reflect, at the third reflective surface, the second portion of the illumination light transmitted at the second reflective surface toward the second reflective surface. Reflect, at the second reflective surface, the second portion of the illumination light reflected at the third reflective surface toward the third reflective surface. Transmit, through the third reflective surface and the second reflective surface, the second portion of the illumination light reflected by the second reflective surface.

1050 Receive, at a beam splitter, the first portion of the illumination light transmitted through the second reflective surface. Direct, with the beam splitter, the first portion of the illumination light in a first direction toward the spatial light modulator. Modulate, with the spatial light modulator, the first portion of the illumination light. Output modulated light from the spatial light modulator. Receive, at the beam splitter, the first portion of the illumination light in a first direction toward the spatial light modulator. Direct, with the beam splitter, the modulated light in a second direction that is non-parallel to the first direction.

1052 Reflect a subset, less than all, of the first portion of the illumination light.

1102 Output illumination light from a light source.

1104 The light source includes a first plurality of light emitting elements and a plurality of waveguides. Provide, from a respective light emitting element of the first plurality of light emitting elements, first light having wavelengths in a first wavelength range. Guide the first light by a respective waveguide of the plurality of waveguides that is coupled to the respective light emitting element of the first plurality of light emitting elements. Transmit, by the respective waveguide, the first light provided by the respective light emitting element of the first plurality of light emitting elements as at least a portion of the illumination light.

1112 The light source also includes a second plurality of light emitting elements. Provide, from a respective light emitting element of the second plurality of light emitting elements, second light having wavelengths in a first wavelength range. Guide the second light by a respective waveguide of the plurality of waveguides that is coupled to the respective light emitting element of the second plurality of light emitting elements. Transmit, by the respective waveguide, the second light provided by the respective light emitting element of the second plurality of light emitting elements as at least a portion of the illumination light.

1122 The light source includes a plurality of light emitting elements. Activate a subset, less than all, of the plurality of light emitting elements.

1124 The optical element is disposed relative to the light source and a curved reflective polarizer. Transmit the at least a portion of the illumination light provided by the light source through the optical element toward the curved reflective polarizer.

```
┌─────────────────────────────────────────────────────────────────┐
│ 1202 Output illumination light from a light source.             │
│  ┌──────────────────────────────────────────────────────────┐   │
│  │ 1210 The light source includes a first plurality of light emitting elements
│  │ and a plurality of waveguides. Provide, from a respective light emitting
│  │ element of the first plurality of light emitting elements, first light having
│  │ wavelengths in a first wavelength range. Guide the first light by a
│  │ respective waveguide of the plurality of waveguides that is coupled to the
│  │ respective light emitting element of the first plurality of light emitting
│  │ elements. Transmit, by the respective waveguide, the first light provided
│  │ by the respective light emitting element of the first plurality of light
│  │ emitting elements as at least a portion of the illumination light.
│  │
│  │   ┌────────────────────────────────────────────────────┐
│  │   │ 1212 The light source also includes a second plurality of light
│  │   │ emitting elements. Provide, from a respective light emitting element
│  │   │ of the second plurality of light emitting elements, second light
│  │   │ having wavelengths in a first wavelength range. Guide the second
│  │   │ light by a respective waveguide of the plurality of waveguides that is
│  │   │ coupled to the respective light emitting element of the second
│  │   │ plurality of light emitting elements. Transmit, by the respective
│  │   │ waveguide, the second light provided by the respective light
│  │   │ emitting element of the second plurality of light emitting elements as
│  │   │ at least a portion of the illumination light.
│  │   └────────────────────────────────────────────────────┘
│  └──────────────────────────────────────────────────────────┘
│  ┌──────────────────────────────────────────────────────────┐
│  │ 1216 The light source includes a plurality of light emitting elements.
│  │ Activate a subset, less than all, of the plurality of light emitting elements.
│  └──────────────────────────────────────────────────────────┘
└─────────────────────────────────────────────────────────────────┘
```

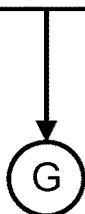

Figure 12A

SHORT DISTANCE ILLUMINATION OF A SPATIAL LIGHT MODULATOR USING A CURVED REFLECTOR

RELATED APPLICATIONS

This application claims the benefit of, and priority to, U.S. Provisional Patent Application Ser. No. 62/900,320, filed Sep. 13, 2019, which is incorporated by reference herein in its entirety. This application is related to (1) U.S. patent application Ser. No. 16/858,331, filed on Apr. 24, 2020, entitled "Short Distance Illumination of a Spatial Light Modulator Using a Pancake Lens Assembly", (2) U.S. patent application Ser. No. 16/858,341, filed on Apr. 24, 2020, entitled "Short Distance Illumination of a Spatial Light Modulator Using an Optical Element with an Aperture", and (3) U.S. patent application Ser. No. 16/858,312, filed on Apr. 24, 2020, entitled "Short Distance Illumination of a Spatial Light Modulator Using a Single Reflector", all of which are incorporated by reference herein in their entireties.

TECHNICAL FIELD

This relates generally to display devices, and more specifically to illuminators for use in head-mounted display devices.

BACKGROUND

Head-mounted display devices (also called herein head-mounted displays) are gaining popularity as means for providing visual information to a user. For example, the head-mounted display devices are used for virtual reality and augmented reality operations.

High-resolution displays are desired in head-mounted display devices. Because a display of a head-mounted display device is located adjacent to eyes of a user, if a low resolution display is used, the spacing between pixels of the display would be visible to the user (as if the view is seen through a screen door). However, high-resolution displays are large and heavy, which have limited their application in head-mounted display devices.

SUMMARY

Accordingly, there is a need for compact and light-weighted head-mounted display devices. Such head-mounted display devices will enhance user experience with virtual reality and/or augmented reality operations.

The above deficiencies and other problems associated with conventional head-mounted displays are reduced or eliminated by the disclosed optical components and display devices.

In accordance with some embodiments, a display device includes a light source, a spatial light modulator, and an optical assembly. The light source is configured to provide illumination light, and the spatial light modulator is positioned to receive the illumination light. The optical assembly includes a first reflective surface and a second reflective surface that is opposite to the first reflective surface. The optical assembly is positioned relative to the light source so that at least a first portion of the illumination light received by the optical assembly is (i) transmitted through the first reflective surface toward the second reflective surface, (ii) reflected by the second reflective surface toward the first reflective surface, (iii) reflected by the first reflective surface toward the second reflective surface, and (iv) transmitted through the second reflective surface.

In accordance with some embodiments, a method includes outputting illumination light from a light source and receiving the illumination light at a first reflective surface of an optical assembly. The optical assembly includes a second reflective surface located opposite to the first reflective surface. The method also includes transmitting a first portion of the illumination light through the first reflective surface toward the second reflective surface; and reflecting, at the second reflective surface, the first portion of the illumination light transmitted through the first reflective surface toward the first reflective surface. The method further includes reflecting, at the first reflective surface, the first portion of the illumination light reflected by the second reflective surface toward the second reflective surface; and transmitting, through the second reflective surface, the first portion of the illumination light reflected by the first reflective surface. The method also includes receiving the first portion of the illumination light at a spatial light modulator.

In accordance with some embodiments, a display device includes a light source, a spatial light modulator, and an optical assembly. The light source is configured to provide illumination light and the spatial light modulator is positioned to receive the illumination light. The optical assembly includes a first reflective surface with an aperture and a second reflective surface that is opposite to the first reflective surface. The optical assembly is positioned relative to the light source so that at least a first portion of the illumination light received by the optical assembly is (i) reflected by the second reflective surface toward the first reflective surface, (ii) reflected by the first reflective surface toward the second reflective surface, and (iii) transmitted through the second reflective surface.

In accordance with some embodiments, a method includes outputting illumination light from a light source. The light source is positioned adjacent to a first reflective surface of an optical assembly. The first reflective surface defines an aperture and the optical assembly includes a second reflective surface that is located opposite to the first reflective surface. The method further includes (i) reflecting, at the second reflective surface, a first portion of the illumination light toward the first reflective surface; (ii) reflecting, at the first reflective surface, the first portion of the illumination light reflected by the second reflective surface toward the second reflective surface; (iii) transmitting the first portion of the illumination light reflected by the first reflective surface through the second reflective surface; and (iv) receiving the first portion of the illumination light at a spatial light modulator.

In accordance with some embodiments, a display device includes a light source, a spatial light modulator, and an optical assembly. The light source is configured to provide illumination light. The spatial light modulator is positioned to receive the illumination light. The optical assembly includes an optical element and a curved reflector that is distinct and separate from the optical element. The curved reflector is disposed relative to the light source so that at least a portion of the illumination light is (i) reflected by the curved reflector toward the optical element, (ii) reflected by the optical element toward the curved reflector, and (iii) transmitted through the curved reflector.

In accordance with some embodiments, a method includes outputting illumination light from a light source; receiving the illumination light at a curved reflector; and reflecting at least a portion of the illumination light at the curved reflector. The method also includes reflecting, at an optical element, the at least a portion of the illumination light reflected by the curved reflector toward the curved reflector; transmitting, through the curved reflector, the at least a portion of the illumination light reflected by the optical element; and receiving the at least a portion of the illumination light at a spatial light modulator.

In accordance with some embodiments, a display device includes a light source, a spatial light modulator, and an optical assembly. The light source is configured to provide illumination light. The spatial light modulator is positioned to receive the illumination light. The optical element includes a reflective surface and the optical element is positioned relative to the light source so that at least a portion of the illumination light received by the optical element is reflected at the reflective surface back toward the light source.

In accordance with some embodiments, a method includes outputting illumination light from a light source, receiving at least a portion of the illumination light at a reflective surface of an optical element, reflecting the at least a portion of the illumination light at the reflective surface, and receiving the at least a portion of the illumination light at a spatial light modulator.

Thus, the disclosed embodiments provide for illuminators and display devices that include such illuminators, and methods for using and making such illuminators. In some embodiments, the display devices are head-mounted display devices.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 3A is an isometric view of a display device in accordance with some embodiments.

FIGS. 4B-4E illustrate a polarization selective element in accordance with some embodiments.

FIG. 7 is a schematic diagram illustrating a display device in accordance with some embodiments.

FIGS. 8A-8C are schematic diagrams illustrating a light source in accordance with some embodiments.

FIGS. 9A-9C is a flow diagram illustrating a method of providing short distance illumination in accordance with some embodiments.

FIGS. 10A-10C is a flow diagram illustrating a method of providing short distance illumination in accordance with some embodiments.

FIGS. 11A-11B is a flow diagram illustrating a method of providing short distance illumination in accordance with some embodiments.

FIGS. 12A-12B is a flow diagram illustrating a method of providing short distance illumination in accordance with some embodiments.

These figures are not drawn to scale unless indicated otherwise.

DETAILED DESCRIPTION

There is a need for head-mounted display devices that are lightweight, compact, and can provide uniform illumination.

The present disclosure provides display devices that produce uniform illumination in a compact footprint. The display device includes an optical assembly that is configured to direct illumination light emitted from a light source toward a spatial light modulator (e.g., reflective spatial light modulator).

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first reflector could be termed a second reflector, and, similarly, a second reflector could be termed a first reflector, without departing from the scope of the various described embodiments. The first reflector and the second reflector are both light reflectors, but they are not the same reflector.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

Figure 1:
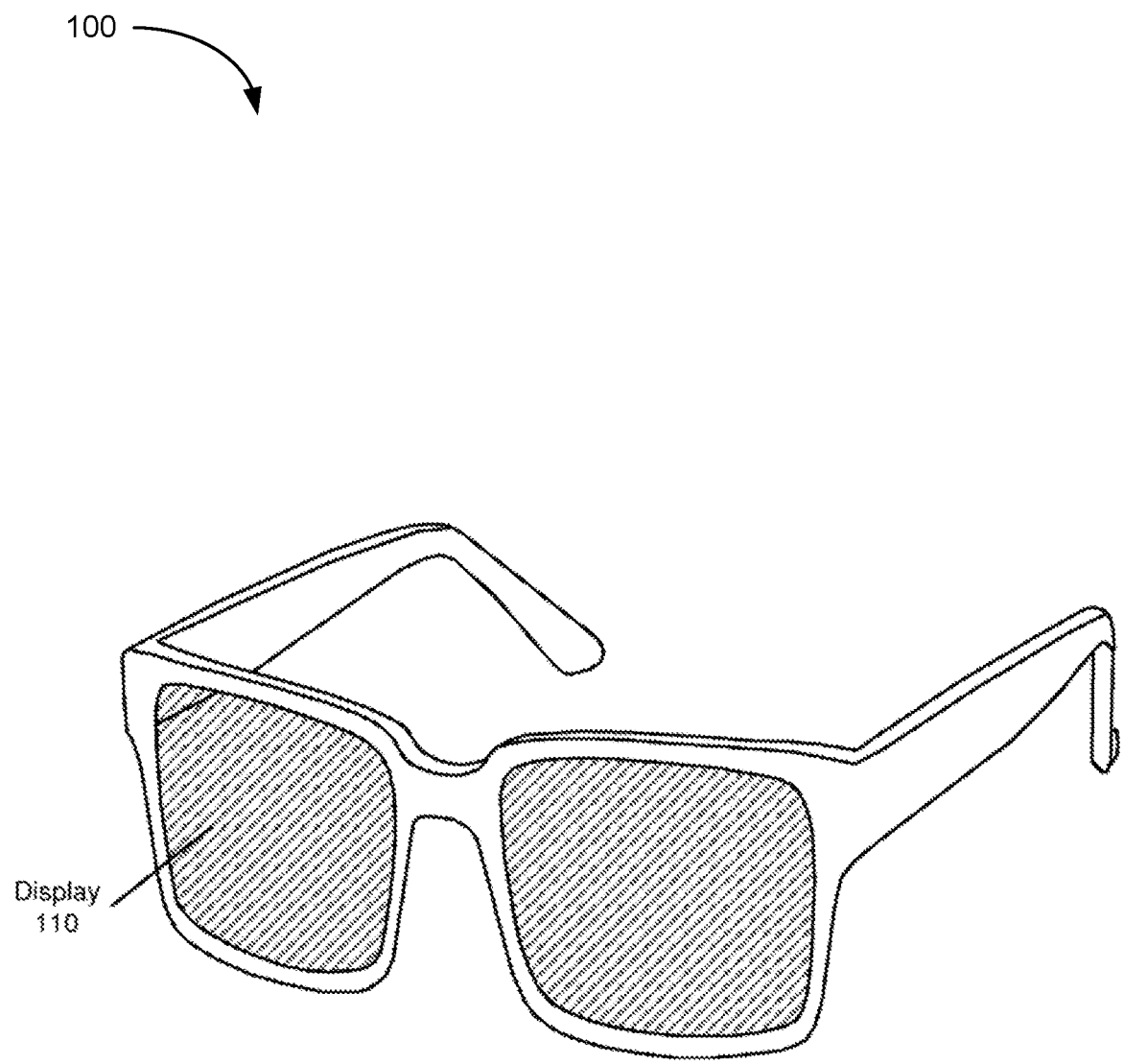
FIG. 1 is a perspective view of a display device in accordance with some embodiments.

FIG. 1 illustrates display device 100 in accordance with some embodiments. In some embodiments, display device 100 is configured to be worn on a head of a user (e.g., by having the form of spectacles or eyeglasses, as shown in FIG. 1) or to be included as part of a helmet that is to be worn by the user. When display device 100 is configured to be worn on a head of a user or to be included as part of a helmet, display device 100 is called a head-mounted display. Alternatively, display device 100 is configured for placement in proximity of an eye or eyes of the user at a fixed location, without being head-mounted (e.g., display device 100 is mounted in a vehicle, such as a car or an airplane, for placement in front of an eye or eyes of the user). As shown in FIG. 1, display device 100 includes display 110. Display 110 is configured for presenting visual contents (e.g., augmented reality contents, virtual reality contents, mixed reality contents, or any combination thereof) to a user.

Figure 2:
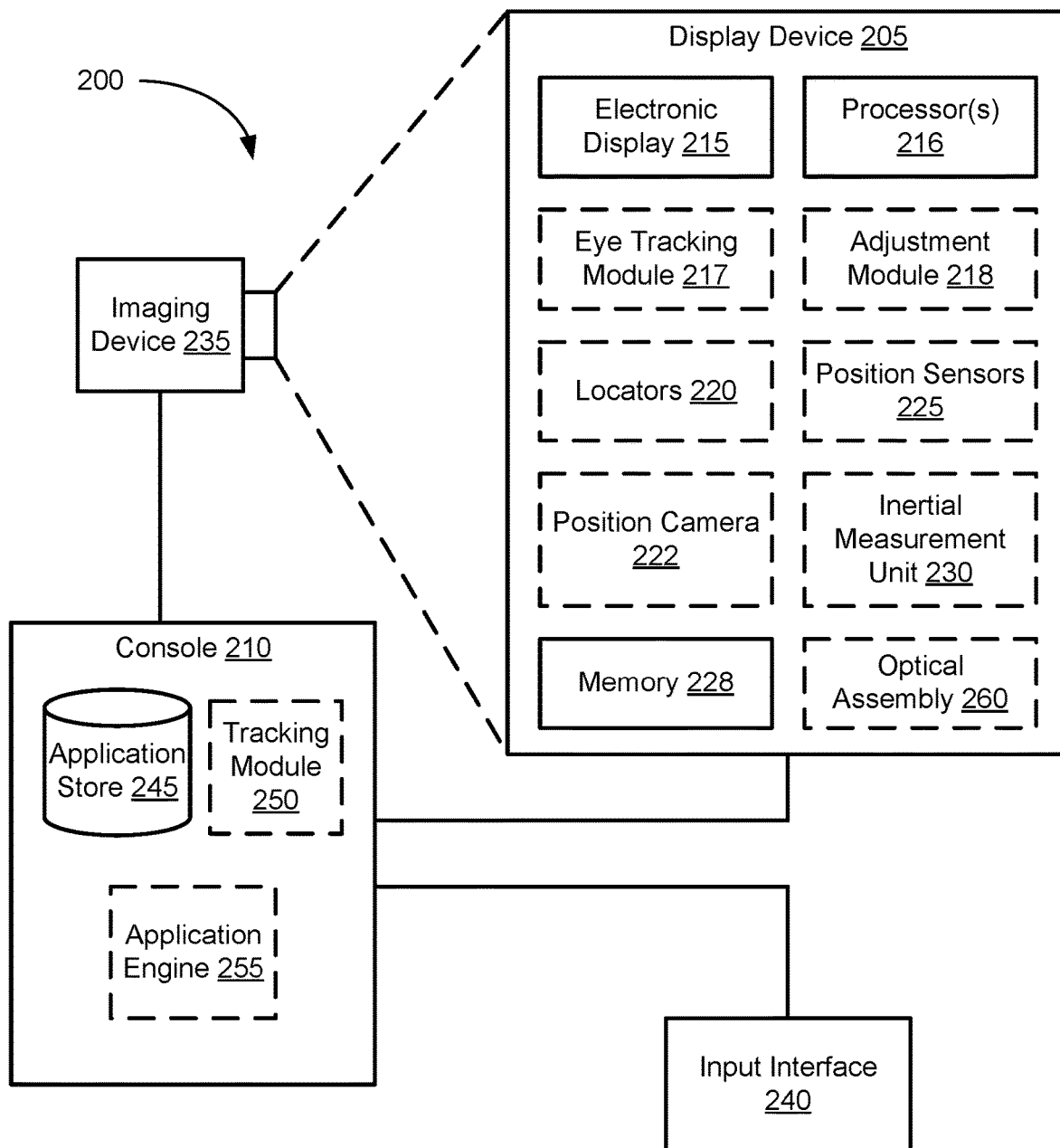
FIG. 2 is a block diagram of a system including a display device in accordance with some embodiments.

In some embodiments, display device 100 includes one or more components described herein with respect to FIG. 2. In some embodiments, display device 100 includes additional components not shown in FIG. 2.

FIG. 2 is a block diagram of system 200 in accordance with some embodiments. The system 200 shown in FIG. 2 includes display device 205 (which corresponds to display device 100 shown in FIG. 1), imaging device 235, and input interface 240 that are each coupled to console 210. While FIG. 2 shows an example of system 200 including display device 205, imaging device 235, and input interface 240, in other embodiments, any number of these components may be included in system 200. For example, there may be multiple display devices 205 each having associated input interface 240 and being monitored by one or more imaging devices 235, with each display device 205, input interface 240, and imaging devices 235 communicating with console 210. In alternative configurations, different and/or additional components may be included in system 200. For example, in some embodiments, console 210 is connected via a network (e.g., the Internet) to system 200 or is self-contained as part of display device 205 (e.g., physically located inside display device 205). In some embodiments, display device 205 is used to create mixed reality by adding in a view of the real surroundings. Thus, display device 205 and system 200 described here can deliver augmented reality, virtual reality, and mixed reality.

In some embodiments, as shown in FIG. 1, display device 205 corresponds to display device 100 and is a head-mounted display that presents media to a user. Examples of media presented by display device 205 include one or more images, video, audio, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in an augmented environment.

In some embodiments, display device 205 also acts as an augmented reality (AR) headset. In these embodiments, display device 205 augments views of a physical, real-world environment with computer-generated elements (e.g., images, video, sound, etc.). Moreover, in some embodiments, display device 205 is able to cycle between different types of operation. Thus, display device 205 operate as a virtual reality (VR) device, an augmented reality (AR) device, as glasses or some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, adjustment module 218, one or more locators 220, one or more position sensors 225, one or more position cameras 222, memory 228, inertial measurement unit (IMU) 230, one or more optical assemblies 260, or a subset or superset thereof (e.g., display device 205 with electronic display 215, optical assembly 260, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores programs, modules and data structures, and/or instructions for displaying one or more images on electronic display 215.

Electronic display 215 displays images to the user in accordance with data received from console 210 and/or processor(s) 216. In various embodiments, electronic display 215 may comprise a single adjustable display element or multiple adjustable display elements (e.g., a display for each eye of a user). In some embodiments, electronic display 215 is configured to project images to the user through one or more optical assemblies 260.

In some embodiments, the display element includes one or more light emission devices and a corresponding array of spatial light modulators. A spatial light modulator is an array of electro-optic pixels, opto-electronic pixels, some other array of devices that dynamically adjust the amount of light transmitted by each device, or some combination thereof. These pixels are placed behind one or more lenses. In some embodiments, the spatial light modulator is an array of liquid crystal based pixels in an LCD (a Liquid Crystal Display). Examples of the light emission devices include: an organic light emitting diode, an active-matrix organic light-emitting diode, a light emitting diode, some type of device capable of being placed in a flexible display, or some combination thereof. The light emission devices include devices that are capable of generating visible light (e.g., red, green, blue, etc.) used for image generation. The spatial light modulator is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array.

One or more optical components in the one or more optical assemblies 260 direct light from the arrays of light emission devices (optionally through the emission intensity arrays) to locations within each eyebox and ultimately to the back of the user's retina(s). An eyebox is a region that is occupied by an eye of a user of display device 205 (e.g., a user wearing display device 205) who is viewing images from display device 205. In some cases, the eyebox is represented as a 10 mm×10 mm square. In some embodiments, the one or more optical components include one or more coatings, such as anti-reflective coatings, and one or more polarization volume holograms (PVH).

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed.

Eye tracking module 217 determines locations of each pupil of a user's eyes. In some embodiments, eye tracking module 217 instructs electronic display 215 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Additionally or alternatively, the reflection off of the surfaces of the eye is used to also determine location of the pupil. In some cases, the IR detector array scans for retro-reflection and identifies which IR emission devices are active when retro-reflection is detected. Eye tracking module 217 may use a tracking lookup table and the identified IR emission devices to determine the pupil locations for each eye. The tracking lookup table maps the received signals on the IR detector array to locations (corresponding to pupil locations) in each eyebox. In some embodiments, the tracking lookup table is generated via a calibration procedure (e.g., user looks at various known reference points in an image and eye tracking module 217 maps the locations of the user's pupil while looking at the reference points to corresponding signals received on the IR tracking array). As mentioned above, in some embodiments, system 200 may use other eye tracking systems than the embedded IR eye tracking system described herein.

Adjustment module 218 generates an image frame based on the determined locations of the pupils. In some embodiments, this sends a discrete image to the display that will tile sub-images together thus a coherent stitched image will appear on the back of the retina. Adjustment module 218 adjusts an output (i.e. the generated image frame) of electronic display 215 based on the detected locations of the pupils. Adjustment module 218 instructs portions of electronic display 215 to pass image light to the determined locations of the pupils. In some embodiments, adjustment module 218 also instructs the electronic display not to provide image light to positions other than the determined locations of the pupils. Adjustment module 218 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof.

Optional locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (i.e., an LED or other type of light emitting device), locators 220 may emit light in the visible band (e.g., about 400 nm to 750 nm), in the infrared band (e.g., about 750 nm to 1 mm), in the ultraviolet band (about 100 nm to 400 nm), some other portion of the electromagnetic spectrum, or some combination thereof.

In some embodiments, locators 220 are located beneath an outer surface of display device 205, which is transparent to the wavelengths of light emitted or reflected by locators 220 or is thin enough to not substantially attenuate the wavelengths of light emitted or reflected by locators 220. Additionally, in some embodiments, the outer surface or other portions of display device 205 are opaque in the visible band of wavelengths of light. Thus, locators 220 may emit light in the IR band under an outer surface that is transparent in the IR band but opaque in the visible band.

IMU 230 is an electronic device that generates calibration data based on measurement signals received from one or more position sensors 225. Position sensor 225 generates one or more measurement signals in response to motion of display device 205. Examples of position sensors 225 include: one or more accelerometers, one or more gyroscopes, one or more magnetometers, another suitable type of sensor that detects motion, a type of sensor used for error correction of IMU 230, or some combination thereof. Position sensors 225 may be located external to IMU 230, internal to IMU 230, or some combination thereof.

Based on the one or more measurement signals from one or more position sensors 225, IMU 230 generates first calibration data indicating an estimated position of display device 205 relative to an initial position of display device 205. For example, position sensors 225 include multiple accelerometers to measure translational motion (forward/back, up/down, left/right) and multiple gyroscopes to measure rotational motion (e.g., pitch, yaw, roll). In some embodiments, IMU 230 rapidly samples the measurement signals and calculates the estimated position of display device 205 from the sampled data. For example, IMU 230 integrates the measurement signals received from the accelerometers over time to estimate a velocity vector and integrates the velocity vector over time to determine an estimated position of a reference point on display device 205. Alternatively, IMU 230 provides the sampled measurement signals to console 210, which determines the first calibration data. The reference point is a point that may be used to describe the position of display device 205. While the reference point may generally be defined as a point in space; however, in practice the reference point is defined as a point within display device 205 (e.g., a center of IMU 230).

In some embodiments, IMU 230 receives one or more calibration parameters from console 210. As further discussed below, the one or more calibration parameters are used to maintain tracking of display device 205. Based on a received calibration parameter, IMU 230 may adjust one or more IMU parameters (e.g., sample rate). In some embodiments, certain calibration parameters cause IMU 230 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 235 generates calibration data in accordance with calibration parameters received from console 210. Calibration data includes one or more images showing observed positions of locators 220 that are detectable by imaging device 235. In some embodiments, imaging device 235 includes one or more still cameras, one or more video cameras, any other device capable of capturing images including one or more locators 220, or some combination thereof. Additionally, imaging device 235 may include one or more filters (e.g., used to increase signal to noise ratio). Imaging device 235 is configured to optionally detect light emitted or reflected from locators 220 in a field of view of imaging device 235. In embodiments where locators 220 include passive elements (e.g., a retroreflector), imaging device 235 may include a light source that illuminates some or all of locators 220, which retro-reflect the light toward the light source in imaging device 235. Second calibration data is communicated from imaging device 235 to console 210, and imaging device 235 receives one or more calibration parameters from console 210 to adjust one or more imaging parameters (e.g., focal length, focus, frame rate, ISO, sensor temperature, shutter speed, aperture, etc.).

In some embodiments, display device 205 includes one or more optical assemblies 260. In some embodiments, display device 205 optionally includes a single optical assembly 260 or multiple optical assemblies 260 (e.g., an optical assembly 260 for each eye of a user). In some embodiments, the one or more optical assemblies 260 receive image light for the computer generated images from the electronic display device(s) 215 and direct the image light toward an eye or eyes of a user. The computer-generated images include still images, animated images, and/or a combination thereof. The computer-generated images include objects that appear to be two-dimensional and/or three-dimensional objects.

In some embodiments, electronic display device 215 projects computer-generated images to one or more reflective elements (not shown), and the one or more optical assemblies receive the image light from the one or more reflective elements and direct the image light to the eye(s) of the user. In some embodiments, the one or more reflective elements are partially transparent (e.g., the one or more reflective elements have a transmittance of at least 15%, 20%, 25%, 30%, 35%, 40%, 45%, or 50%), which allows transmission of ambient light. In such embodiments, computer-generated images projected by electronic display 215 are superimposed with the transmitted ambient light (e.g., transmitted ambient image) to provide augmented reality images.

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, data from brain signals, data from other parts of the human body, or any other suitable device for receiving action requests and communicating the received action requests to console 210. An action request received by input interface 240 is communicated to console 210, which performs an action corresponding to the action request. In some embodiments, input interface 240 may provide haptic feedback to the user in accordance with instructions received from console 210. For example, haptic feedback is provided when an action request is received, or console 210 communicates instructions to input interface 240 causing input interface 240 to generate haptic feedback when console 210 performs an action.

Console 210 provides media to display device 205 for presentation to the user in accordance with information received from one or more of: imaging device 235, display device 205, and input interface 240. In the example shown in FIG. 2, console 210 includes application store 245, tracking module 250, and application engine 255. Some embodiments of console 210 have different modules than those described in conjunction with FIG. 2. Similarly, the functions further described herein may be distributed among components of console 210 in a different manner than is described here.

When application store 245 is included in console 210, application store 245 stores one or more applications for execution by console 210. An application is a group of instructions, that when executed by a processor, is used for generating content for presentation to the user. Content generated by the processor based on an application may be in response to inputs received from the user via movement of display device 205 or input interface 240. Examples of applications include: gaming applications, conferencing applications, video playback application, or other suitable applications.

When tracking module 250 is included in console 210, tracking module 250 calibrates system 200 using one or more calibration parameters and may adjust one or more calibration parameters to reduce error in determination of the position of display device 205. For example, tracking module 250 adjusts the focus of imaging device 235 to obtain a more accurate position for observed locators on display device 205. Moreover, calibration performed by tracking module 250 also accounts for information received from IMU 230. Additionally, if tracking of display device 205 is lost (e.g., imaging device 235 loses line of sight of at least a threshold number of locators 220), tracking module 250 re-calibrates some or all of system 200.

In some embodiments, tracking module 250 tracks movements of display device 205 using second calibration data from imaging device 235. For example, tracking module 250 determines positions of a reference point of display device 205 using observed locators from the second calibration data and a model of display device 205. In some embodiments, tracking module 250 also determines positions of a reference point of display device 205 using position information from the first calibration data. Additionally, in some embodiments, tracking module 250 may use portions of the first calibration data, the second calibration data, or some combination thereof, to predict a future location of display device 205. Tracking module 250 provides the estimated or predicted future position of display device 205 to application engine 255.

Application engine 255 executes applications within system 200 and receives position information, acceleration information, velocity information, predicted future positions, or some combination thereof of display device 205 from tracking module 250. Based on the received information, application engine 255 determines content to provide to display device 205 for presentation to the user. For example, if the received information indicates that the user has looked to the left, application engine 255 generates content for display device 205 that mirrors the user's movement in an augmented environment. Additionally, application engine 255 performs an action within an application executing on console 210 in response to an action request received from input interface 240 and provides feedback to the user that the action was performed. The provided feedback may be visual or audible feedback via display device 205 or haptic feedback via input interface 240.

FIG. 3A is an isometric view of display device 300 in accordance with some embodiments. In some other embodiments, display device 300 is part of some other electronic display (e.g., a digital microscope, a head-mounted display device, etc.). In some embodiments, display device 300 includes light emission device 310 and an optical assembly 330, which may include one or more lenses and/or other optical components. In some embodiments, display device 300 also includes an IR detector array.

Light emission device 310 emits image light and optional IR light toward the viewing user. Light emission device 310 includes one or more light emission components that emit light in the visible light (and optionally includes components that emit light in the IR). Light emission device 310 may include, e.g., an array of LEDs, an array of microLEDs, an array of OLEDs, or some combination thereof.

In some embodiments, light emission device 310 includes an emission intensity array (e.g., a spatial light modulator) configured to selectively attenuate light emitted from light emission device 310. In some embodiments, the emission intensity array is composed of a plurality of liquid crystal cells or pixels, groups of light emission devices, or some combination thereof. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation. In this manner, the emission intensity array is able to provide image light and/or control what portion of the image light is passed to the optical assembly 330. In some embodiments, display device 300 uses the emission intensity array to facilitate providing image light to a location of pupil 350 of eye 340 of a user, and minimize the amount of image light provided to other areas in the eyebox.

The optical assembly 330 includes one or more lenses. The one or more lenses in optical assembly 330 receive modified image light (e.g., attenuated light) from light emission device 310, and direct the modified image light to a location of pupil 350. The optical assembly 330 may include additional optical components, such as color filters, mirrors, etc.

An optional IR detector array detects IR light that has been retro-reflected from the retina of eye 340, a cornea of eye 340, a crystalline lens of eye 340, or some combination thereof. The IR detector array includes either a single IR sensor or a plurality of IR sensitive detectors (e.g., photodiodes). In some embodiments, the IR detector array is separate from light emission device 310. In some embodiments, the IR detector array is integrated into light emission device 310.

In some embodiments, light emission device 310 including an emission intensity array make up a display element. Alternatively, the display element includes light emission device 310 (e.g., when light emission device 310 includes individually adjustable pixels) without the emission intensity array. In some embodiments, the display element additionally includes the IR array. In some embodiments, in response to a determined location of pupil 350, the display element adjusts the emitted image light such that the light output by the display element is refracted by one or more lenses toward the determined location of pupil 350, and not toward other locations in the eyebox.

In some embodiments, display device 300 includes one or more broadband sources (e.g., one or more white LEDs) coupled with a plurality of color filters, in addition to, or instead of, light emission device 310.

In some embodiments, display device 300 (or light emission device 310 of display device 300) includes a spatial light modulator (e.g., a reflective spatial light modulator), such as a Liquid Crystal on Silicon (LCoS) spatial light modulator. In some embodiments, the LCoS spatial light modulator includes liquid crystals. In some embodiments, the LCoS spatial light modulator includes ferroelectric liquid crystals. The spatial light modulator has an array of pixels (or subpixels), and a respective pixel (or a respective subpixel) may be individually controlled to reflect light impinging thereon (e.g., a pixel is activated to reflect light impinging thereon or deactivated to cease reflecting the light impinging thereon) or modulate the reflected light (e.g., a pixel is activated to change the polarization of the reflected light or deactivated to cease changing the polarization of the reflected light, or vice versa). In some embodiments, display device 300 includes multiple spatial light modulators (e.g., a first spatial light modulator for a first color, such as red, a second spatial light modulator for a second color, such as green, and a third spatial light modulator for a third color, such as blue). Such a spatial light modulator requires an illuminator that provides light to the spatial light modulator.

LCoS spatial light modulators typically reflect a portion of illumination light to provide image light, and non-uniformity in the illumination light will lead to non-uniformity in the image light. Thus, there is a need for compact illuminators that can provide uniform illumination of LCoS spatial light modulators.

Figure 3B:
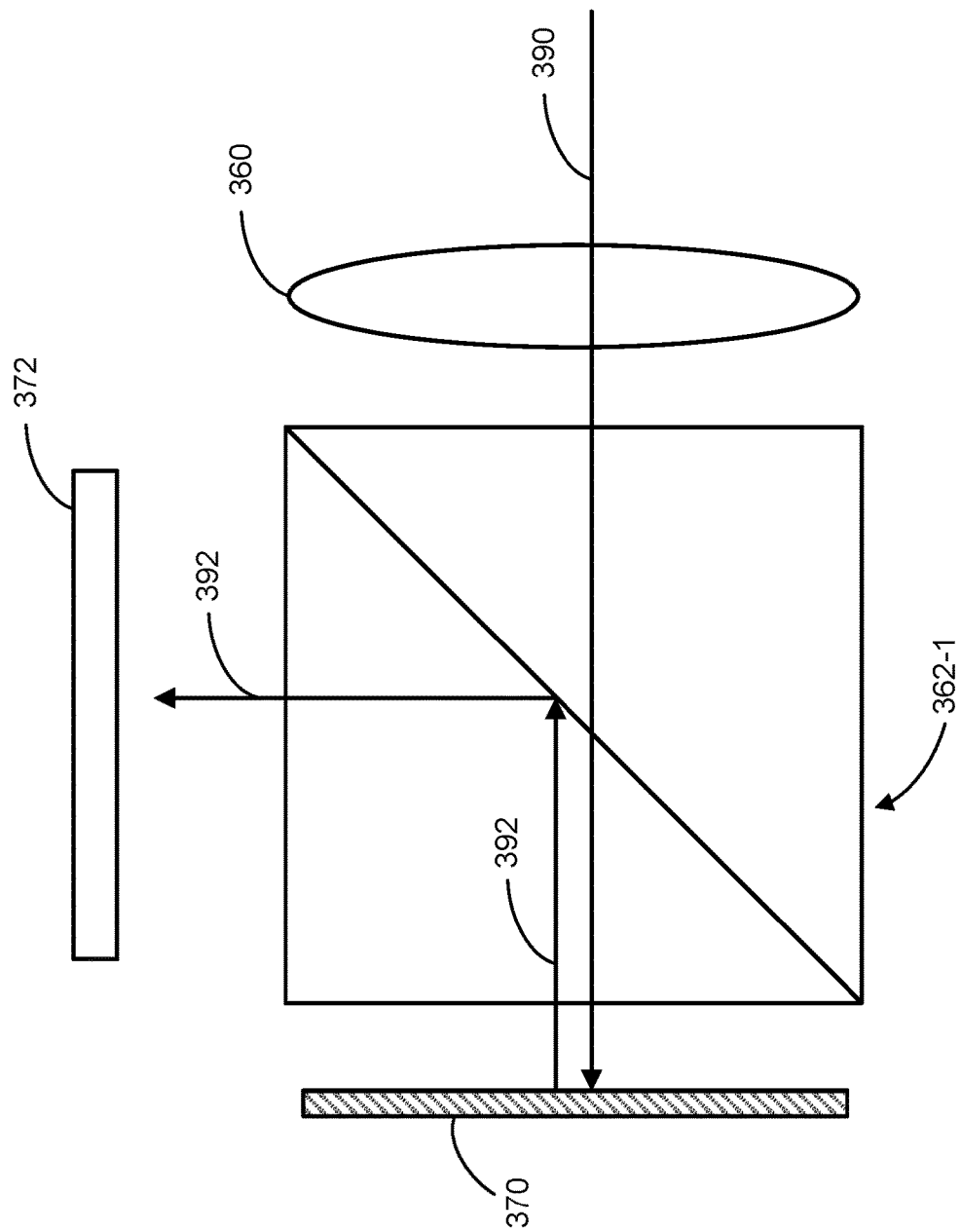
FIGS. 3B-3C are schematic diagrams illustrating example illumination configurations for use in a display device in accordance with some embodiments.
Figure 3C:
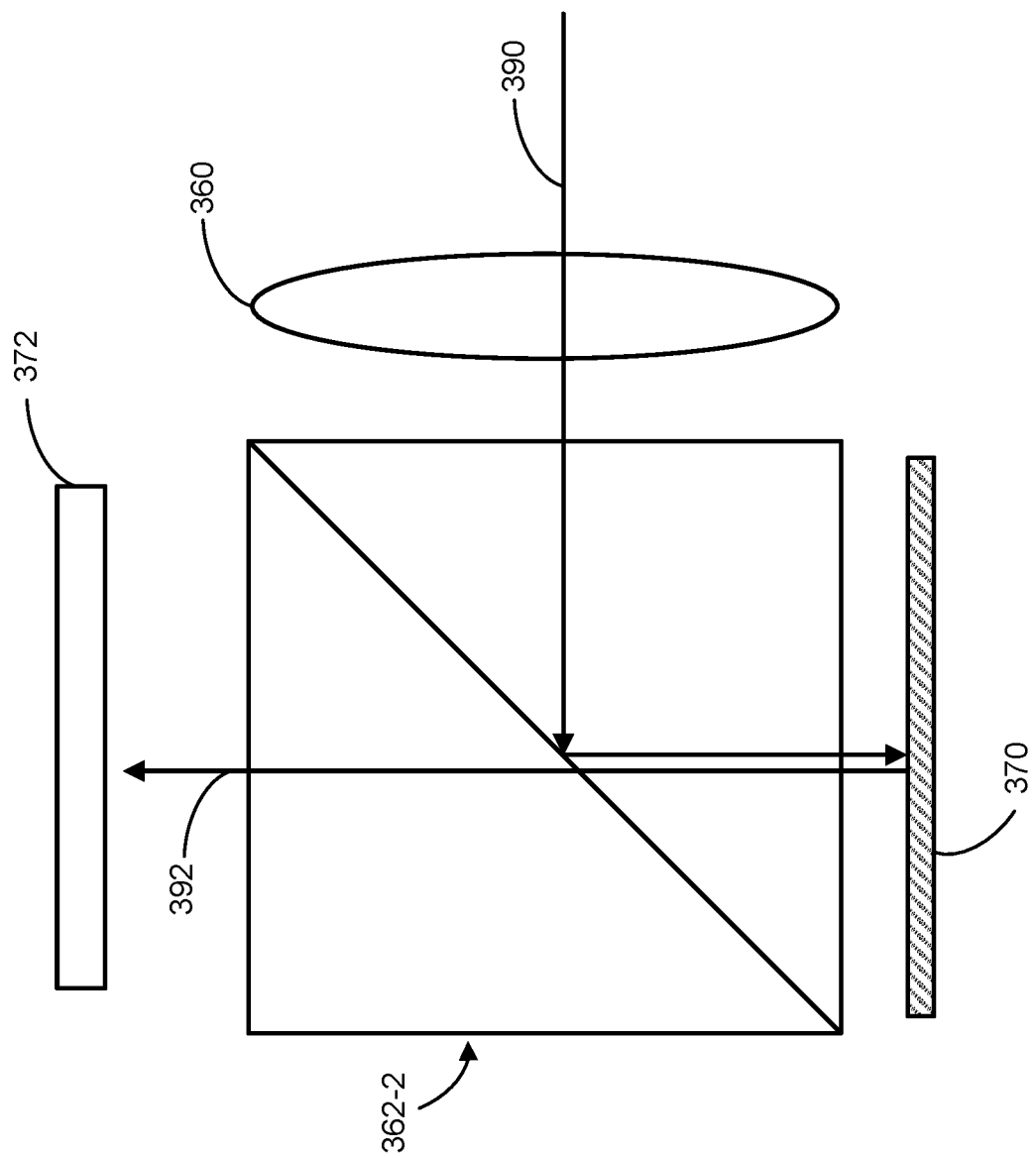

FIGS. 3B-3C are schematic diagrams illustrating example illumination configurations for use in display device 300 in accordance with some embodiments. In FIGS. 3B and 3C, illumination light 390 is transmitted through an optical assembly 360 (e.g., one or more optical components) toward a polarizing beam splitter (PBS) 362-1 or 362-2. The PBS 362-1 or 362-2 provides the illumination light 390 in a first direction towards a spatial light modulator 370 (e.g., a reflective spatial light modulator, such as an LCoS spatial light modulator), receives modulated light 392 output from the spatial light modulator 370, and provides the modulated light 392 in a second direction that is different from (e.g., non-parallel to) the first direction. In some embodiments, the first direction and the second direction form an angle that is between 30 degrees and 150 degrees, between 45 degrees and 135 degrees, or between 60 degrees and 120 degrees. In FIG. 3B, the illumination light 390 is transmitted through PBS 362-1 (e.g., without a change in direction). Additionally, the modulated light 392, output from the spatial light modulator 370, is reflected by PBS 362-1 toward an output assembly 372 (e.g., display optics or a waveguide with an optical input coupler). In FIG. 3C, the illumination light 390 is reflected by PBS 362-2 toward the spatial light modulator 370 and the modulated light 392, output from the spatial light modulator 370, is transmitted through PBS 362-2 toward output assembly 372 (e.g., without a change in direction).

Although FIGS. 4A, 4F-4J, 5A-5D, 6A-6E, and 7 illustrate devices with a configuration similar to the configuration shown in FIG. 3B (an optical axis of the optical assembly 360 is parallel to an optical axis of the spatial light modulator 370), the optical components in FIGS. 4A, 4F-4J, 5A-5D, 6A-6E, and 7 may be arranged so that the optical components are in a configuration similar to the configuration shown in FIG. 3C (the optical axis of the optical assembly 360 is non-parallel (e.g., perpendicular) to the optical axis of the spatial light modulator 370). For brevity, the detailed description of such configurations is omitted herein.

FIGS. 4A, 4F-4J, 5A-5D, 6A-6E, and 7 illustrate example optical devices that enable a compact illuminator in accordance with some embodiments. Such optical devices may be used to illuminate a spatial light modulator (e.g., reflective spatial light modulator), such as an LCoS spatial light modulator. In some embodiments, such optical devices are separate from the spatial light modulator. In some embodiments, such optical devices include the spatial light modulator (e.g., the spatial light modulator is integrated into the optical device).

Figure 4A:
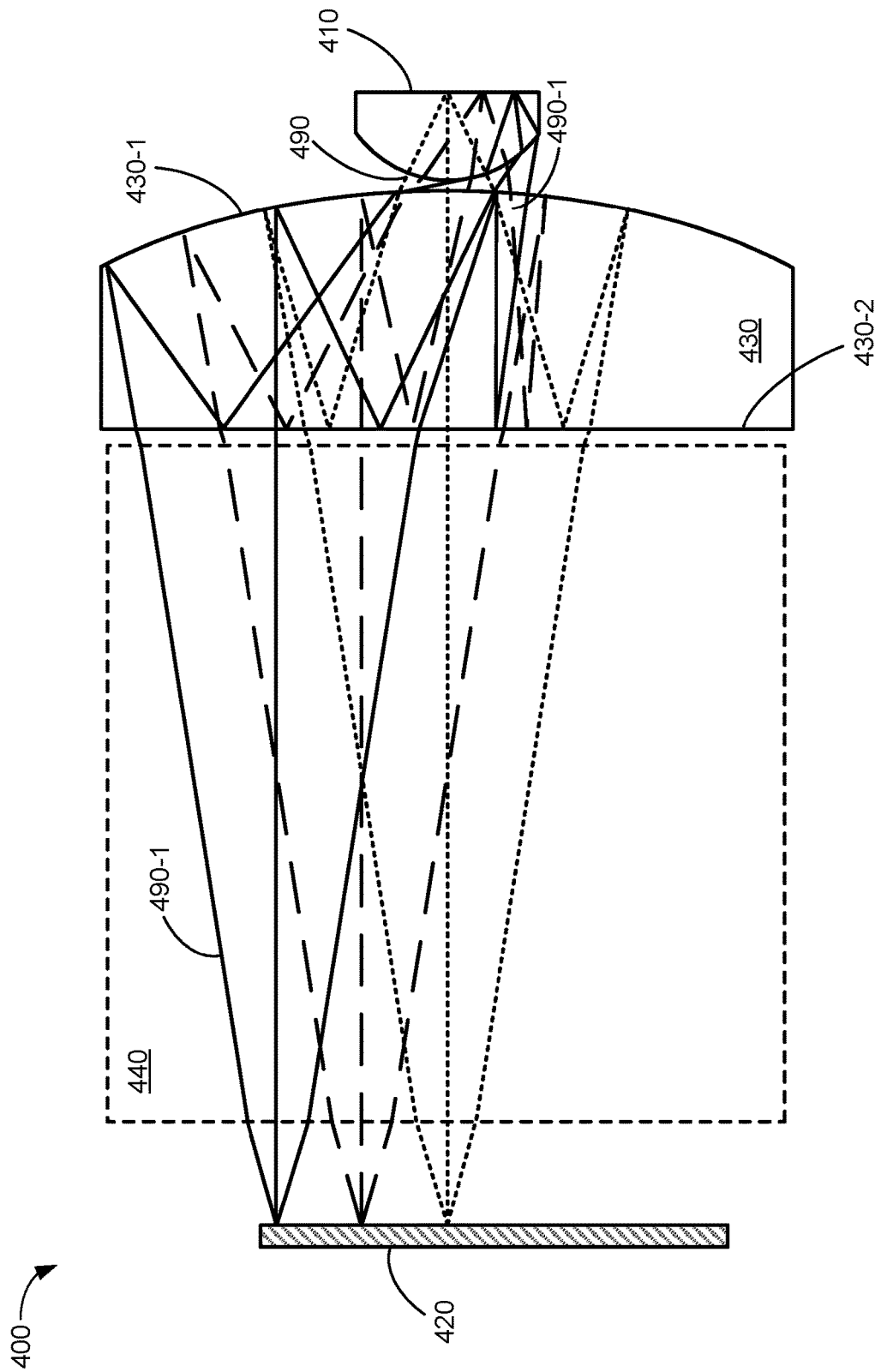
FIG. 4A is a schematic diagram illustrating a display device in accordance with some embodiments.

FIG. 4A is a schematic diagram illustrating a display device 400 that includes an optical assembly 430 in accordance with some embodiments. Display device 400 includes a light source 410 and a spatial light modulator 420 (e.g., a reflective spatial light modulator) so that the optical assembly 430 is disposed between the light source 410 and the spatial light modulator 420. The light source 410 is configured to provide (e.g., generate, emit, output, or direct) illumination light 490 toward the optical assembly 430. The optical assembly 430 includes a first reflective surface 430-1 and a second reflective surface 430-2 that is separate from (e.g., opposite to) the first reflective surface 430-1. The first reflective surface 430-1 is configured to receive the illumination light 490 and to transmit at least a first portion 490-1 of the illumination light 490 so that the at least the first portion 490-1 of the illumination light 490 is (i) transmitted through the first reflective surface 430-1 toward the second reflective surface 430-2, (ii) reflected by the second reflective surface 430-2 toward the first reflective surface 430-1, (iii) reflected by the first reflective surface 430-1 toward the second reflective surface 430-2, and (iv) transmitted through the second reflective surface 430-2.

In some embodiments, at least one of the first reflective surface 430-1 or the second reflective surface 430-2 is curved. In FIG. 4A, the first reflective surface 430-1 is curved and the second reflective surface 430-2 is not curved (e.g., flat). Alternatively, the first reflective surface 430-1 may be flat and the second reflective surface 430-2 may be curved. The radius of curvature of the first reflective surface 430-1 and/or the second reflective surface 430-2 contributes to an optical power to change a divergence of (e.g., focus or defocus) the first portion 490-1 of the illumination light 490 when the illumination light 490 is directed from the light source 410 to the spatial light modulator 420 via the optical assembly 430.

In some embodiments, the display device 400 also includes PBS 440 that is configured to receive the first portion 490-1 of the illumination light 490 and provide the first portion 490-1 of the illumination light 490 toward the spatial light modulator 420. In some embodiments, as shown, the optical assembly 430 is disposed between the light source 410 and the PBS 440 such that the first reflective surface 430-1 faces the light source 410 and the second reflective surface 430-2 faces the PBS 440.

In some embodiments, the spatial light modulator 420 is an LCoS spatial light modulator.

In some embodiments, the first reflective surface 430-1 is a partial reflector (e.g., a 50/50 mirror). In some configurations, the first reflective surface 430-1 is a reflective polarizer that is configured to selectively transmit or reflect light based on the polarization of the light. For example, a reflective polarizer may be configured to transmit light having a first polarization and reflect light having a second polarization that is different from (e.g., orthogonal to) the first polarization.

In some embodiments, the second reflective surface 430-2 is a liquid crystal based polarization selective element 450 (e.g., a polarization sensitive hologram, a cholesteric liquid crystal, etc.). Examples of a liquid crystal based polarization selective element 450 include a polarization selective element that includes a metasurface, a polarization selective element that includes a resonant structured surface, a polarization selective element that includes a continuous chiral layer, and a polarization selective element that includes a birefringent material. The liquid crystal based polarization selective element 450 may be configured to reflect light having a first polarization and transmit light having a second polarization that is different from (e.g., orthogonal to) the first polarization. In some embodiments, the first polarization is a first circular polarization and the second polarization is a second circular polarization that is orthogonal to the first polarization.

FIGS. 4B-4E illustrate polarization selective element 450 in accordance with some embodiments.

In some embodiments, polarization selective element 450 includes a layer of liquid crystals arranged in helical structures (e.g., a liquid crystal formed of a cholesteric liquid crystal). In some embodiments, polarization selective element 450 is polarization selective with respect to circular polarization of light. When the circularly polarized light has a handedness that corresponds to (e.g., is along or has the same handedness as) the helical twist of liquid crystal structures along their helical axis in polarization selective element 450, polarization selective element 450 interacts with the circularly polarized light, resulting in change of the direction of propagation of the light (e.g., reflect, refract, or diffract the light). In contrast, polarization selective element 450 will transmit light that has a circular polarization with opposite handedness to the helical twist of liquid crystal structures in polarization selective element 450 without changing its direction or polarization. Polarization selective element 450 can be configured to redirect light having certain properties without changing its polarization while light not having the certain properties is transmitted through the polarization selective element 450 without having its polarization changed.

For example, polarization selective element 450 can have right-handed liquid crystal helical structures and can be configured to redirect (e.g., reflect, refract, diffract) RCP light impinged thereon without changing the polarization of the RCP light while transmitting LCP light impinged thereon without changing its polarization or direction. In addition to polarization selectivity, polarization selective element 450 may also have wavelength selectivity. For example, a right-handed polarization selective element 450 is configured to reflect RCP light within a certain spectral range and to transmit all other light, including LCP light within the certain spectral range and RCP light that has a wavelength outside of the certain spectral range. Further, polarization selective element 450 may also be configured to have angular selectivity such that the polarization selective element 450 interacts with light that is incident upon a surface of the polarization selective element 450 within a certain angular range (e.g., substantially parallel to an optical axis of the polarization selective element 450, in some cases, the incident light and an optical axis of the polarization selective element 450 form an angle that is less than 20 degrees) and satisfies the polarization and wavelength conditions as described above. Light that is incident on the surface of the polarization selective element 450 at an angle that is outside the certain angular range would be transmitted through the polarization selective element 450 with no change in polarization or direction.

FIG. 4B illustrates an x-z cross-sectional view of polarization selective element 450. In some embodiments, polarization selective element 450 includes photoalignment layer 452 (e.g., a layer including organic or inorganic compounds including photosensitive groups) and helical structures 454 formed of optically anisotropic molecules. Photoalignment layer 452 is formed by adding a layer of photoalignment material (PAM). The PAM layer is then exposed to an alignment light (e.g., linearly polarized light) with a desired intensity and incident angle. The alignment light is gradually scanned over the layer of PAM while rotating polarization of the alignment light. The alignment light creates a cycloidal pattern on the layer of PAM (e.g., cycloidal patterns are explained below with respect to FIG. 5E). After preparation of photoalignment layer 452, a layer of optically anisotropic molecules is applied onto photoalignment layer 452 forming helical structures 454. The cycloidal pattern of photoalignment layer 452 defines the orientation of helical structures 454. After formation of helical structures 454, the layer of optically anisotropic molecules is firmed (e.g., fixed, set, or cured) to form a polymer. In some embodiments, the firming includes thermal or UV curing. In some embodiments, helical structures 454 are formed of liquid crystals, such as cholesteric liquid crystals. Helical structures 454 are aligned along helical axes 456 which is substantially parallel to the z-axis (e.g., helical axes 456 and the z-axis form an angle that is no greater than 20 degrees). In some embodiments, the optically anisotropic molecules are rotated in a same rotational direction (forming a helical twist) about helical axes 456 throughout the optically transparent substrate. Helical structures 454 define helical pitch 466, used herein to refer to a distance between two adjacent optically anisotropic molecules of a same helical structure that have the same orientation.

Polarization selective element 450 may change or affect the direction and/or polarization of light in a certain spectral range (e.g., polarization selective element 450 is wavelength selective) and having a first circular polarization (e.g., polarization selective element 450 is polarization selective) that has the same handedness as the helical structures in polarization selective element 450. Polarization selective element 450 does not change or affect the direction and polarization of light outside the certain spectral range and/or having a second circular polarization opposite to the handedness of the helical structures in polarization selective element 450. When first incident light having the first circular polarization and a wavelength in the certain spectral range impinges upon polarization selective element 450, polarization selective element 450 interacts with the first incident light and changes the direction of the first incident light (e.g., redirects, reflects, refracts, diffracts the first incident light). While interacting with the first incident light, polarization selective element 450 does not change the polarization of the first incident light (e.g., RCP light is reflected as RCP light). On the other hand, polarization selective element 450 is configured to transmit second incident light that has a wavelength outside the certain spectral range associated with polarization selective element 450 and/or having a circular polarization with handedness opposite to the helical structures in polarization selective element 450 without changing its direction or polarization. For example, polarization selective element 450 changes the direction of the first incident light (RCP) without changing its polarization and transmits second incident light (LCP) without changing its direction or polarization. In contrast, a conventional reflective lens or a mirror changes the polarization of polarized incident light when reflecting the light. In some embodiments, in addition to being selective based on the circular polarization of light, polarization selective element 450 is also wavelength selective and/or selective based on incident angle of the light. Optical properties of polarization selective element 450 are based on an orientation of the helical axes and/or a helical pitch of a liquid crystal.

FIG. 4C is a cross-sectional view of an x-y plane of polarization selective element 450. The helical structures 454 in polarization selective element 450 form lateral fringes (e.g., lateral fringes 460-1 and 460-2) that correspond to adjacent optically anisotropic molecules in the x-y plane that have the same alignment. A lateral pitch 462 is defined by the distance between two adjacent lateral fringes (e.g., lateral fringes 460-1 and 460-2).

FIG. 4D is a cross-sectional view of a x-z plane of polarization selective element 450 across reference plane AA' illustrated in FIG. 4C. The helical structures 454 in polarization selective element 450 form helical fringes (e.g., helical fringes 464-1 and 464-2) that correspond to adjacent optically anisotropic molecules in the x-z plane that have the same alignment. The helical pitch 466 is defined by the distance between two adjacent helical fringes (e.g., helical fringes 464-1 and 464-2). In some embodiments, as shown, the helical fringes are tilted at an angle α with respect to a surface of polarization selective element 450. Arrow 458 illustrates a direction of incident light upon polarization selective element 450.

FIG. 4E illustrates an exemplary example of the orientation of optically anisotropic molecules on a photoalignment layer (e.g., photoalignment layer 452). FIG. 4E shows two adjacent optically anisotropic molecules that have the same orientation (e.g., optically anisotropic molecules 459-1 and 459-2). The distance between optically anisotropic molecules 459-1 and 459-2 define the lateral pitch 462, also shown in FIG. 4C.

FIGS. 4F-4J are schematic diagrams illustrating a display device 400 that includes an optical assembly 430 in accordance with some embodiments.

Figure 4F:
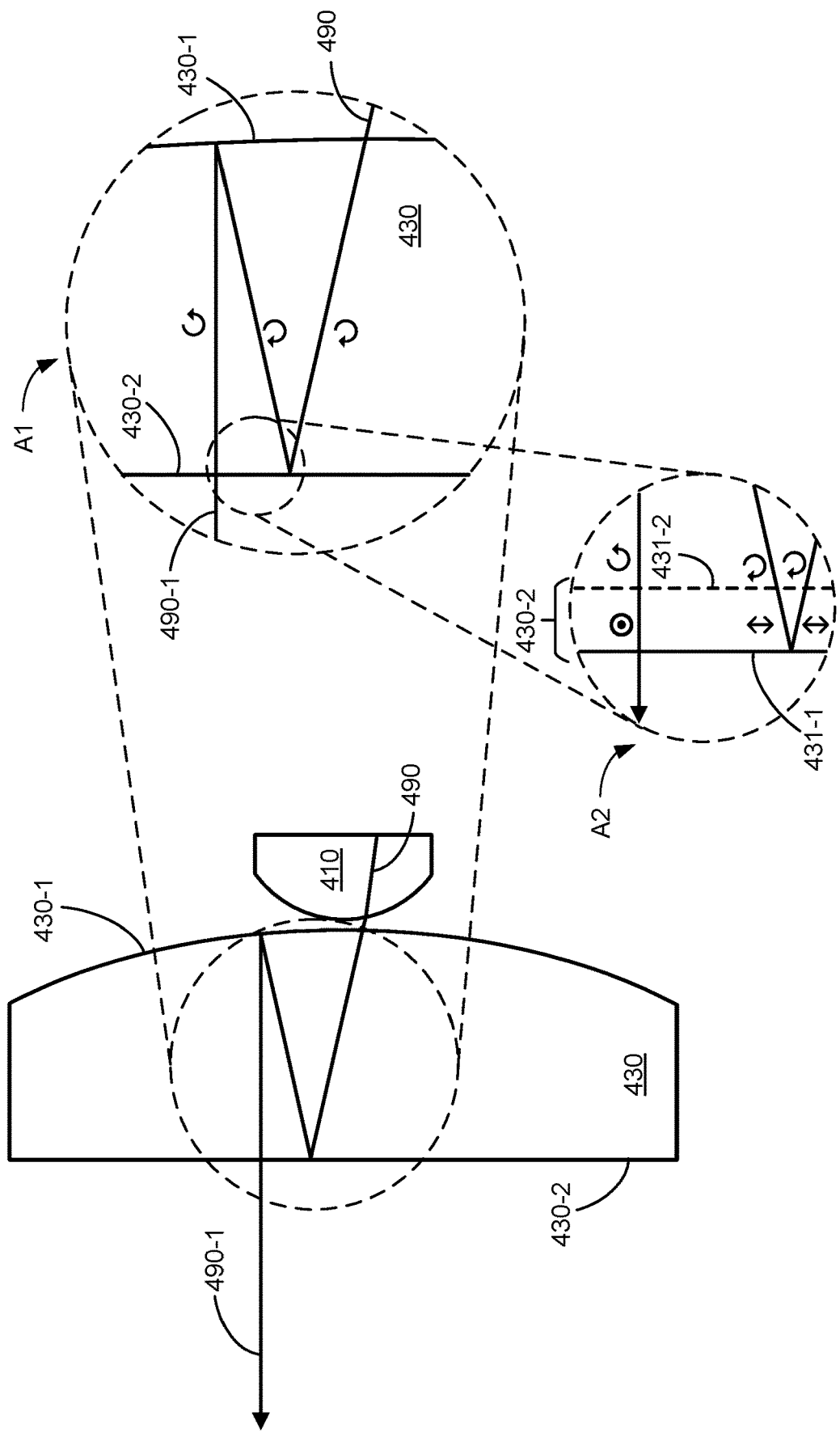
FIGS. 4F-4J are schematic diagrams illustrating display devices in accordance with some embodiments.

In some configurations, as shown in FIG. 4F, a reflective polarizer 431-1 and an optical retarder 431-2 (e.g., quarter wave-plate) are adjacent to the second reflective surface 430-2. The reflective polarizer 431-1 is configured to selectively transmit or reflect light based on the polarization of the light and the optical retarder 431-2 (e.g., quarter waveplate) is positioned to transmit light while converting the polarization of the light. For example, the reflective polarizer 431-1 may be configured to reflect light having a third polarization and transmit light having a fourth polarization that is different from (e.g., orthogonal to) the third polarization. In some embodiments, the third polarization is a first linear polarization (e.g., s-polarization) and the fourth polarization is a second linear polarization (e.g., p-polarization) that is orthogonal to the first polarization. In some configurations, the optical retarder 431-2 is positioned to transmit and convert light having a linear polarization to light having a circular polarization, or vice versa.

FIG. 4F illustrates an optical path of light transmitted through optical assembly 430 in accordance with some embodiments. In FIG. 4F, the first reflective surface 430-1 receives the illumination light 490, output from the light source 410, and transmits at least a portion of the illumination light 490 toward the second reflective surface 430-2. As shown in inset A1 of FIG. 4F, the second reflective surface 430-2 reflects at least a portion, of the received illumination light, having a first polarization (e.g., a first circular polarization) toward the first reflective surface 430-1. The first reflective surface 430-1 receives the reflected portion of the illumination light 490 and reflects at least a portion of the received light toward the second reflective surface 430-2 so that the reflected portion of the illumination light 490 has a second polarization that is different from (e.g., orthogonal to) the first polarization. The second reflective surface 430-2 transmits the at least a portion 490-1 of the illumination light 490 (or a portion thereof) reflected from the first reflective surface 430-1.

Inset A2 of FIG. 4F illustrates additional details regarding the optical path and polarization of the illumination light 490 at the second reflective surface 430-2 when a reflective polarizer 431-1 and an optical retarder 431-2 (e.g., a quarter wave-plate) are located adjacent to the second reflective surface 430-2. In some embodiments, optical retarder 431-2 is a coating on the second reflective surface 430-2. Alternatively, the optical retarder 431-2 may be an optical element that is spaced apart from the second reflective surface 430-2. As shown in inset A2, the optical retarder 431-2 receives at least a portion of the illumination light 490 transmitted through the first reflective surface 430-1. The optical retarder 431-2 transmits a portion of the illumination light 490 toward the reflective polarizer 431-1 while converting the polarization of the portion of the illumination light 490 from the first polarization to a third polarization (e.g., from a first circular polarization to a first linear polarization). The third polarization is different from each of the first polarization and the second polarization. The reflective polarizer 431-1 is configured to reflect at least a portion of the illumination light 490 having the third polarization back toward the optical retarder 431-2. The optical retarder 431-2 transmits at least a portion of the reflected light toward the first reflective surface 430-1 while converting the polarization of the at least a portion of the reflected light from the third polarization to the first polarization. The first reflective surface 430-1 reflects at least a portion of the reflected light having the first polarization, toward the optical retarder 431-2 so that a portion of the light reflected by the first reflective surface 430-1 has the second polarization. The optical retarder 431-2 transmits at least a portion 490-1 of the light having the second polarization toward the reflective polarizer 431-1 while converting the polarization of at least a portion of the received light from the second polarization to a fourth polarization (e.g., a second linear polarization) that is different from each of the first polarization, the second polarization, and the third polarization. The reflective polarizer 431-1 transmits at least a portion 490-1 of the received light having the fourth polarization.

In some embodiments, the first polarization is a first circular polarization (e.g., right-hand circular polarization), the second polarization is a second circular polarization (e.g., left-hand circular polarization) that is orthogonal to the first polarization (or vice versa), the third polarization is a first linear polarization (e.g., s-polarization), and the fourth polarization is a second linear polarization (e.g., p-polarization) that is orthogonal to the third polarization (or vice versa).

In the ideal case, each optical element and surface has zero or negligible loss. However, in practice, it is understood that some amount of light (such as the illumination light 490) may be lost through interaction with an optical element or surface (such as transmission through an optical surface or reflection at an optical surface).

FIGS. 4G-4J are schematic diagrams illustrating a display device 402 that includes an optical assembly 432 in accordance with some embodiments. Display device 402 is similar to display device 400 except that optical assembly 430 is replaced by optical assembly 432. Optical assembly 432 is similar to optical assembly 430 except that the first reflective surface 432-1 of optical assembly 432 defines an aperture 434 (e.g., a physical through-hole or a window, such as a portion of a surface without a reflective coating where the rest of the surface includes a reflective coating).

Figure 4G:
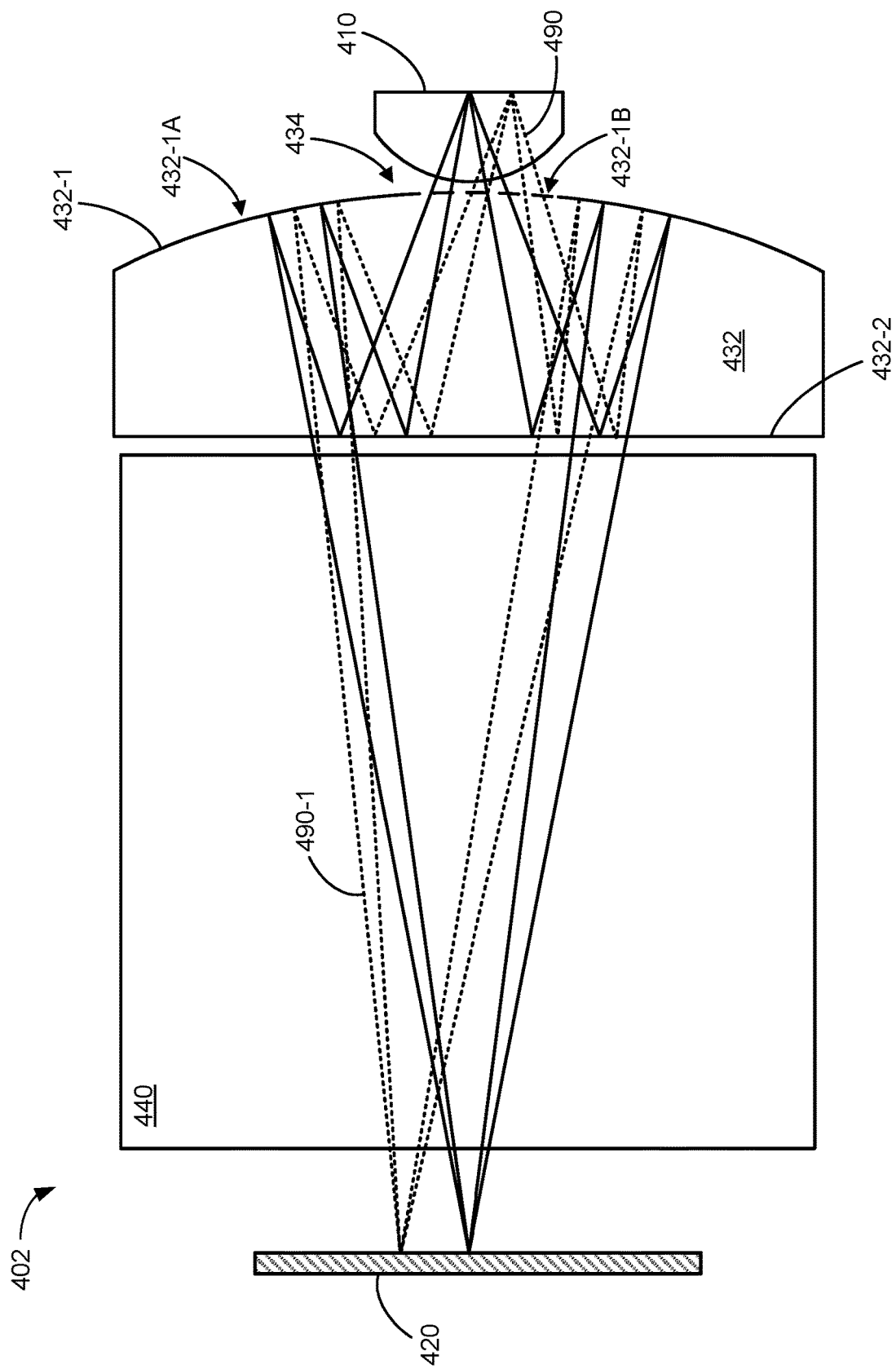

In some embodiments, the first reflective surface 432-1 includes a first portion 432-1A that includes a reflective coating and a second portion 432-1B that does not include the reflective coating. The first portion 432-1A surrounds the second portion 432-1B and the second portion 432-1B corresponds to the aperture 434 (e.g., the aperture 434 is a hole in a reflective coating of the first reflective surface 432-1). In FIG. 4G, the first portion 432-1A is illustrated with a solid line and the second portion 432-1B is illustrated with a dashed line.

In some embodiments, as shown in FIG. 4G, the optical assembly 432 is disposed between the light source 410 and the spatial light modulator 420 (e.g., a reflective spatial light modulator). In such cases, the light source 410 is aligned (e.g., coupled) with the aperture 434 in the first reflective surface 432-1 of the optical assembly 432 so that at least a portion (e.g., a first portion 490-1) of the illumination light 490 is transmitted through the aperture 434 of the first reflective surface 432-1 toward the second reflective surface 432-2.

In some embodiments, the second reflective surface 430-2 may be a liquid crystal based polarization selective element 450 (e.g., a polarization sensitive hologram, a cholesteric liquid crystal, etc.). Alternatively, the second reflective surface 430-2 may include a reflective polarizer and an optical retarder (e.g., quarter wave-plate), as described above with respect to inset A2 in FIG. 4F.

Figure 4H:
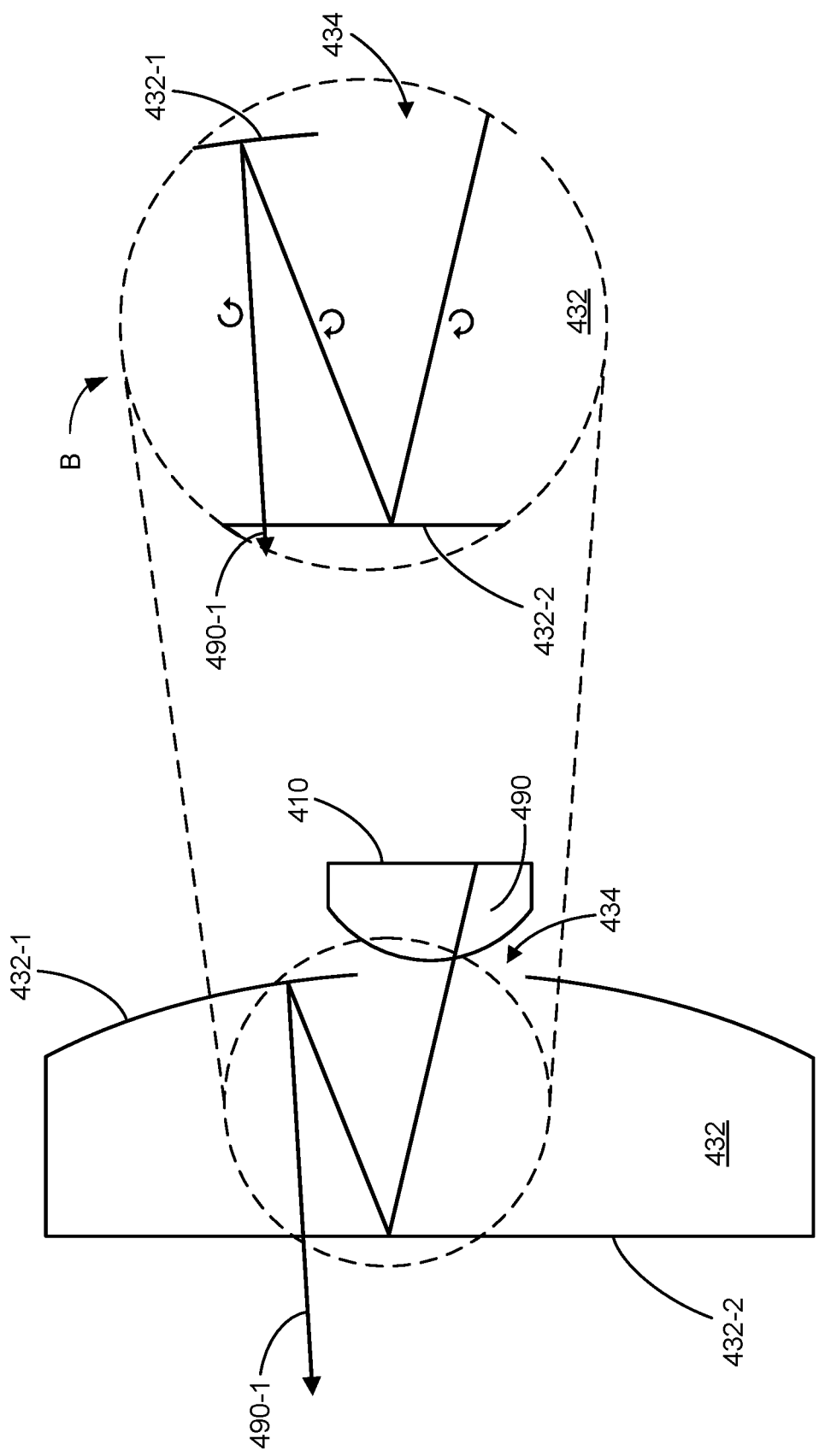

FIG. 4H illustrates an optical path of light transmitted through optical assembly 432 in accordance with some embodiments, such as when the optical assembly 432 is disposed between the light source 410 and the spatial light modulator 420. As shown in inset B of FIG. 4H, the first reflective surface 432-1 receives the illumination light 490, output from the light source 410, and transmits at least a portion of the illumination light 490 through the aperture 434 toward the second reflective surface 432-2. The second reflective surface 432-2 reflects at least a portion of the received light back toward the first reflective surface 432-1 so that the portion of the reflected light has the first polarization. The first reflective surface 432-1 reflects at least a portion of the light reflected by the second reflective surface 432-2 back toward the second reflective surface 432-2 so that the portion of the light reflected by the first reflective surface 432-1 has the second polarization. The second reflective surface 432-2 transmits at least a portion 490-1 of the light that was reflected at the first reflective surface 432-1.

In some embodiments, a reflective polarizer and an optical retarder are located adjacent to the second the second reflective surface 432-2, as described above with respect to inset A2 of FIG. 4F.

Compared to the optical path of the illumination light 490 transmitted through optical assembly 430, the illumination light 490 transmitted through optical assembly 432 is not transmitted through the first portion of the first reflective surface 432-1 that includes a reflective coating, but rather transmitted via the aperture 434 (as shown in FIG. 4H) toward the second reflective surface (as shown in FIG. 4F). In some cases, this eliminates any loss associated with transmission through the third reflective surface 533-1 and allows optical assembly 432 to have a higher transmission efficiency (e.g., lower loss) than the optical assembly 430.

Figure 4I:
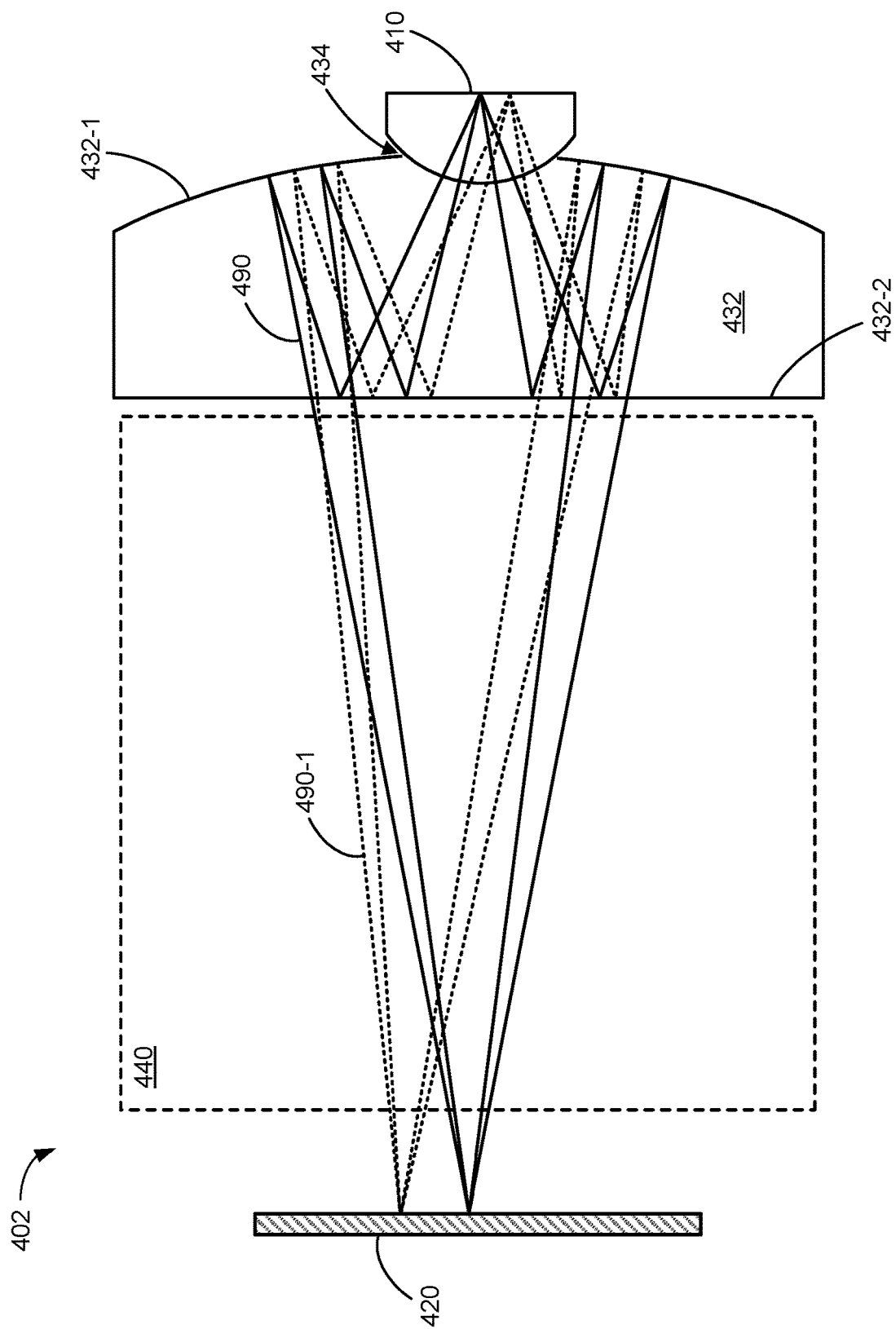

In some embodiments, the aperture 434 is a physical hole in the first reflective surface 432-1. In some cases, as shown in FIG. 4I, at least a portion of the light source 410 may be disposed inside the aperture 434.

Figure 4J:
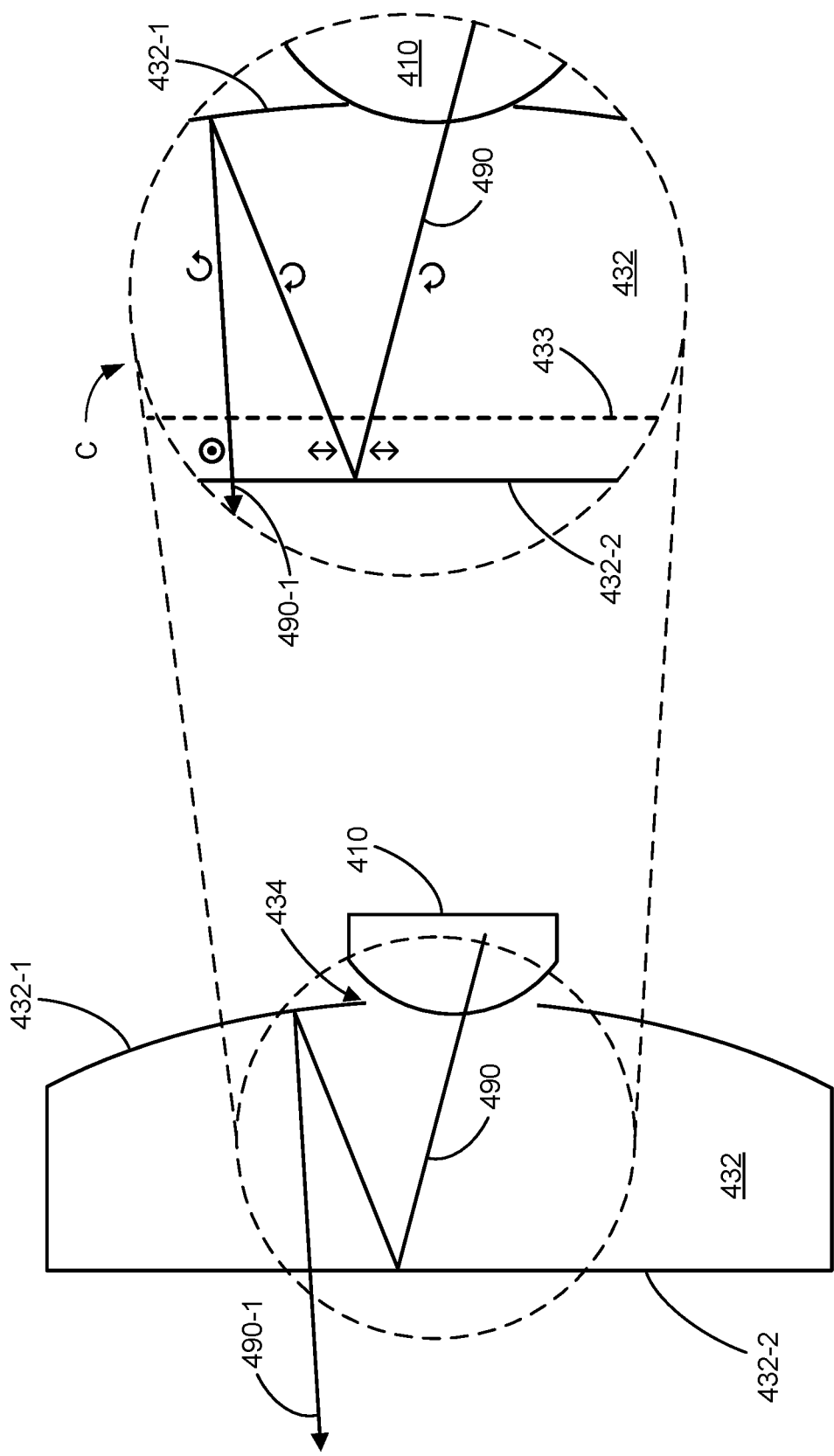

FIG. 4J illustrates an optical path of light transmitted through optical assembly 432 in accordance with some embodiments, such as when at least a portion of the light source 410 is disposed inside the aperture 434. As shown in inset C of FIG. 4J, the light source 410 outputs the illumination light 490 toward the second reflective surface 432-2. The second reflective surface 432-2 reflects at least a portion of the illumination light 490 back toward the first reflective surface 432-1 so that the reflected illumination light 490 has the first polarization. The first reflective surface 432-1 reflects at least a portion of the light reflected by the second reflective surface 432-2 back toward the second reflective surface 432-2 so that the portion of the light reflected by the first reflective surface 432-1 has the second polarization. The second reflective surface 432-2 transmits at least a portion 490-1 of the light that was reflected at the first reflective surface 432-1.

When the second reflective surface 432-2 includes a reflective polarizer and an optical retarder, details regarding the optical path and polarization of light at the second reflective surface 432-2 are the same as described above with respect to inset A2 of FIG. 4F.

Figure 5A:
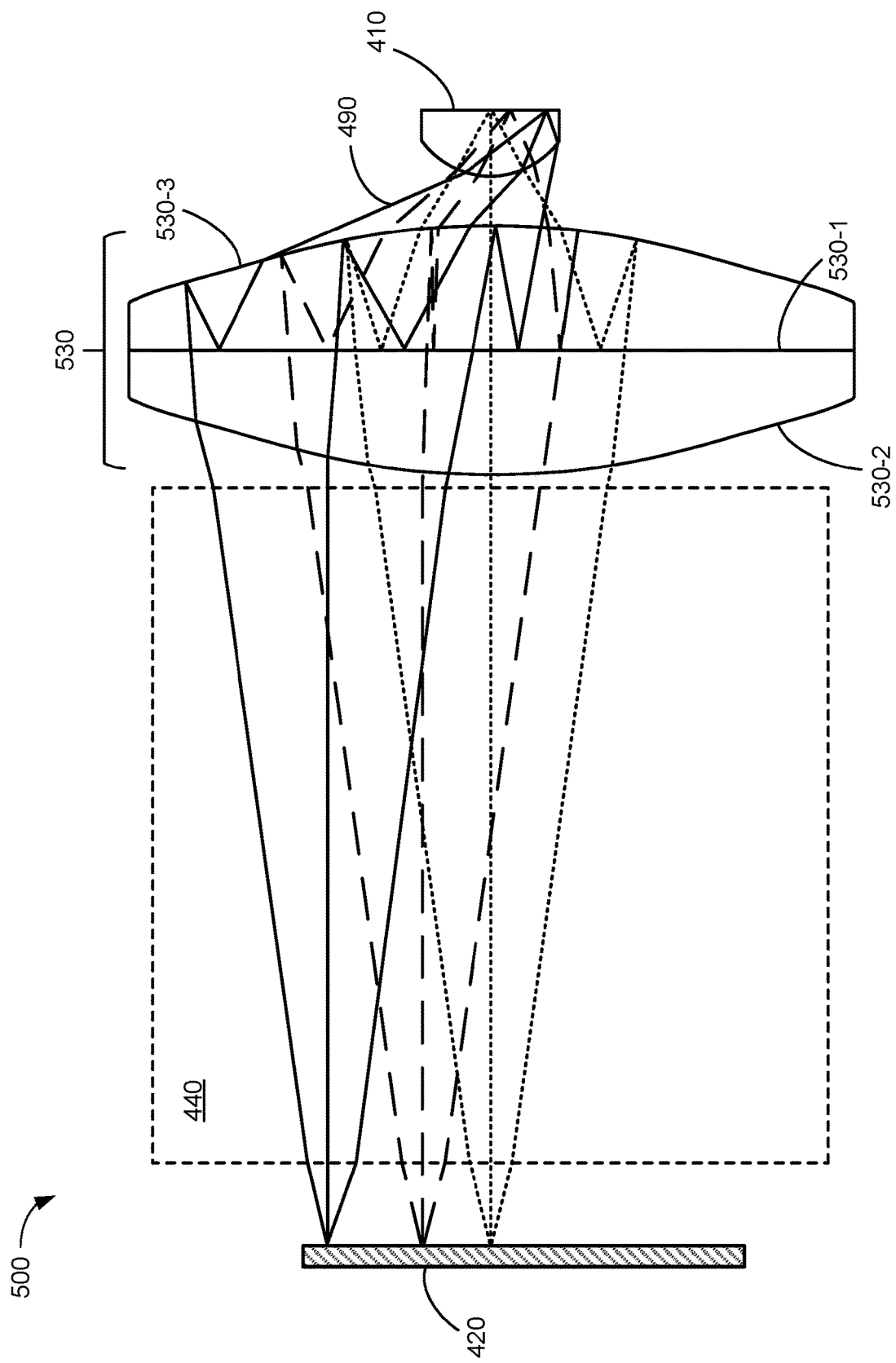
FIG. 5A is a schematic diagram illustrating a display device with an optical assembly in accordance with some embodiments.

FIG. 5A is a schematic diagram illustrating a display device 500 that includes an optical assembly 530 in accordance with some embodiments. Display device 500 is similar to display device 400 except that optical assembly 430 is replaced by optical assembly 530. Optical assembly 530 includes a first reflective surface 530-1, a second reflective surface 530-2, and a third reflective surface 530-3. The first reflective surface 530-1 is disposed between the second reflective surface 530-2 and the third reflective surface 530-3.

Figure 5B:
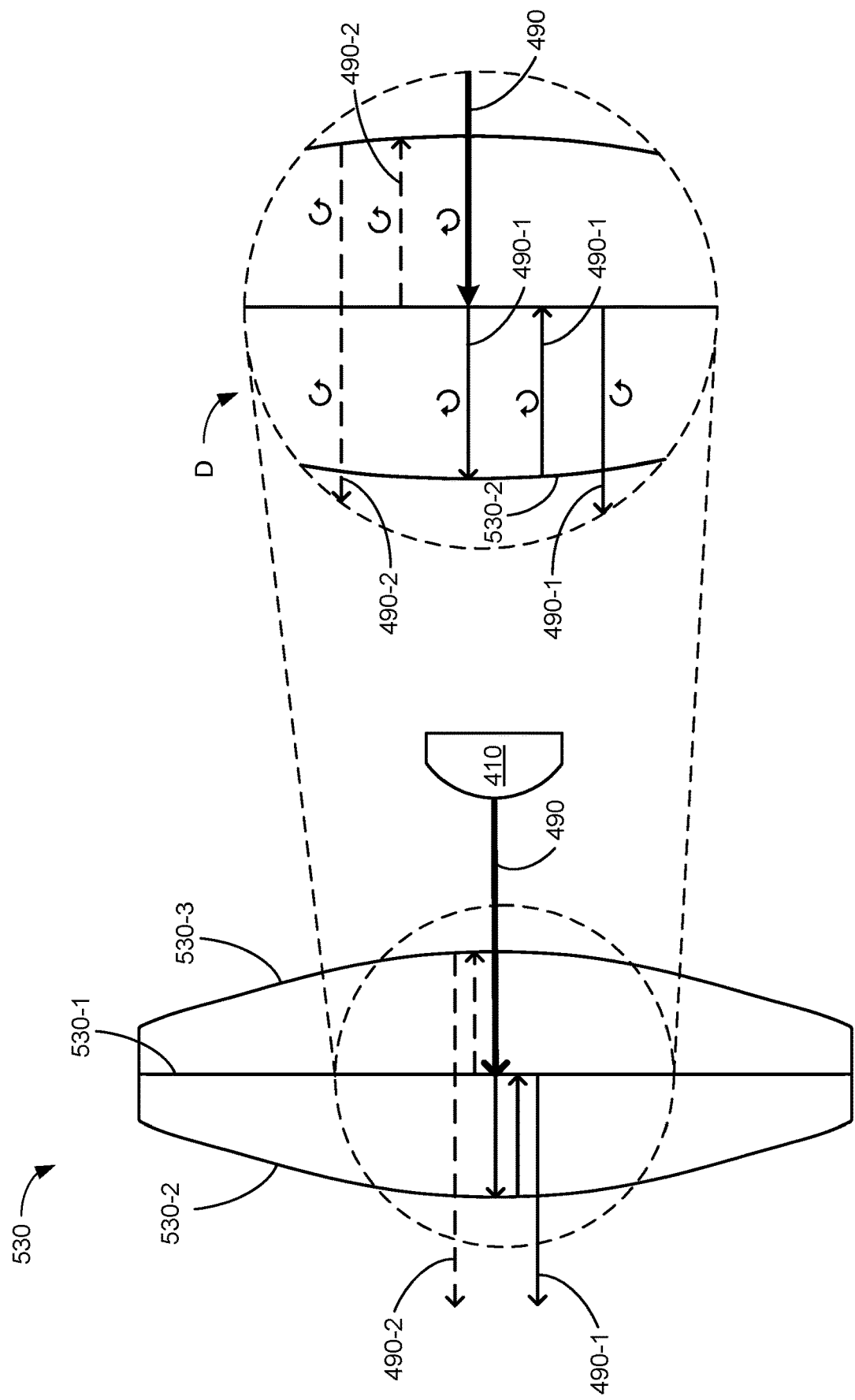
FIG. 5B is a schematic diagram illustrating optical paths in the optical assembly shown in FIG. 5A.

FIG. 5B is a schematic diagram illustrating optical paths in optical assembly 530. The arrows shown in FIG. 5B represent relative direction of light propagation among the surfaces of optical assembly 530 (e.g., from the third reflective surface 530-3 to the first reflective surface 530-1, etc.) and are not indicative of geometric directions of rays reflected or transmitted through optical assembly 530 (e.g., FIG. 5B is not a ray tracing diagram). The optical assembly 530 is configured to receive the illumination light 490 at the third reflective surface 530-3. The third reflective surface 530-3 is configured to transmit at least a first portion 490-1 of the illumination light 490 and the first portion 490-1 of the illumination light 490 is (i) transmitted through the first reflective surface 530-1 toward the second reflective surface 530-2, (ii) reflected by the second reflective surface 530-2 toward the first reflective surface 530 1, (iii) reflected by the first reflective surface 530-1 toward the second reflective surface 530-2, and (iv) transmitted through the second reflective surface 530-2. The third reflective surface 530-3 is also configured to transmit at least a second portion 490-2 of the illumination light 490 and the second portion 490-2 of the illumination light 490 is (i) reflected at the first reflective surface 530-1 toward the third reflective surface 530-3, (ii) reflected by the third reflective surface 530-3 toward the first reflective surface 530-1, and (iii) transmitted through the first reflective surface 530-1 and the second reflective surface 530-2.

In some embodiments, the first reflective surface 530-1 is a partial reflector (e.g., a 50/50 mirror).

In some embodiments, a liquid crystal based polarization selective element similar to the liquid crystal based polarization selective element 450 described above with respect to FIGS. 4B-4E may be disposed adjacent to the second reflective surface 530-2.

In some embodiments, a liquid crystal based polarization selective element similar to the liquid crystal based polarization selective element 450 described above with respect to FIGS. 4B-4E may be disposed adjacent to the third reflective surface 530-3.

In some embodiments, each of the second reflective surface 530-2 and the third reflective surface 520-3 is curved and the first reflective surface 530-1 is not curved (e.g., flat). The radius of curvature of the second reflective surface 530-2 contributes to an optical power of the first portion 490-1 of the illumination light 490 that is directed from the light source 410 to the spatial light modulator 420 via the optical assembly 530 and the radius of curvature of the third reflective surface 530-3 contributes to an optical power of the second portion 490-2 of the illumination light 490 that is directed from the light source 410 to the spatial light modulator 420 via the optical assembly 530. Thus, in some embodiments, each of the second reflective surface 530-2 and the third reflective surface 520-3 has a same radius of curvature. In some embodiments, the first portion 490-1 and the second portion 490-2 of the illumination light 490 are directed from the light source 410 to the spatial light modulator 420 via optical assembly 530 at a same optical power.

The optical paths of the first portion 490-1 and the second portion 490-2 of the illumination light 490 are shown in FIG. 5B. As shown in inset D of FIG. 5B, the third reflective surface 530-3 receives the illumination light 490, output from the light source 410 and having the first polarization, and transmits the illumination light 490 toward the first reflective surface 530-1. The first reflective surface 530-1 transmits a first portion 490-1 of the illumination light 490 toward the second reflective surface 530-2 and reflects a second portion 490-2 of the illumination light 490 toward the third reflective surface 530-3 such that the first portion 490-1 of the illumination light 490 transmitted through the first reflective surface 530-1 has the first polarization and the second portion 490-2 of the illumination light 490 reflected by the first reflective surface 530-1 has the second polarization.

Referring to the first portion 490-1 of the illumination light 490, the second reflective surface 530-2 is configured to reflect the first portion 490-1 of the illumination light 490 back toward the first reflective surface 530-1 without a change in polarization. The first reflective surface 530-1 receives the first portion 490-1 of the illumination light 490 having the first polarization, and reflects the first portion 490-1 of the illumination light 490 toward the second reflective surface 530-2 so that the reflected first portion 490-1 of the illumination light 490 has the second polarization. The second reflective surface 530-2 transmits the first portion 490-1 of the illumination light 490 having the second polarization.

Referring to the second portion 490-2 of the illumination light 490, the third reflective surface 530-3 is configured to reflect the second portion 490-2 of the illumination light 490 having the second polarization back toward the first reflective surface 530-1 so that the reflected second portion 490-2 of the illumination light 490 has the second polarization (e.g., without a change in polarization). The first reflective surface 530-1 transmits the second portion 490-2 of the illumination light 490 having the second polarization toward second reflective surface 530-2, and the second reflective surface 530-2 transmits the second portion 490-2 of the illumination light 490 that has been transmitted through the first reflective surface 530-1.

In some embodiments, a reflective polarizer and an optical retarder are located adjacent to the second reflective surface 530-2, as described above with respect to inset A2 of FIG. 4F.

Compared to the optical path of the illumination light 490 transmitted through optical assembly 430, the illumination light 490 transmitted through optical assembly 530 allows a portion (e.g., the second portion 490-2) of the illumination light 490 that is not initially transmitted through the first reflective surface 530-1 to be redirected toward the first reflective surface 530-1, thereby reducing loss. Thus, the optical assembly 530 may have a higher transmission efficiency (e.g., lower loss) compared to the optical assembly 430.

Figure 5C:
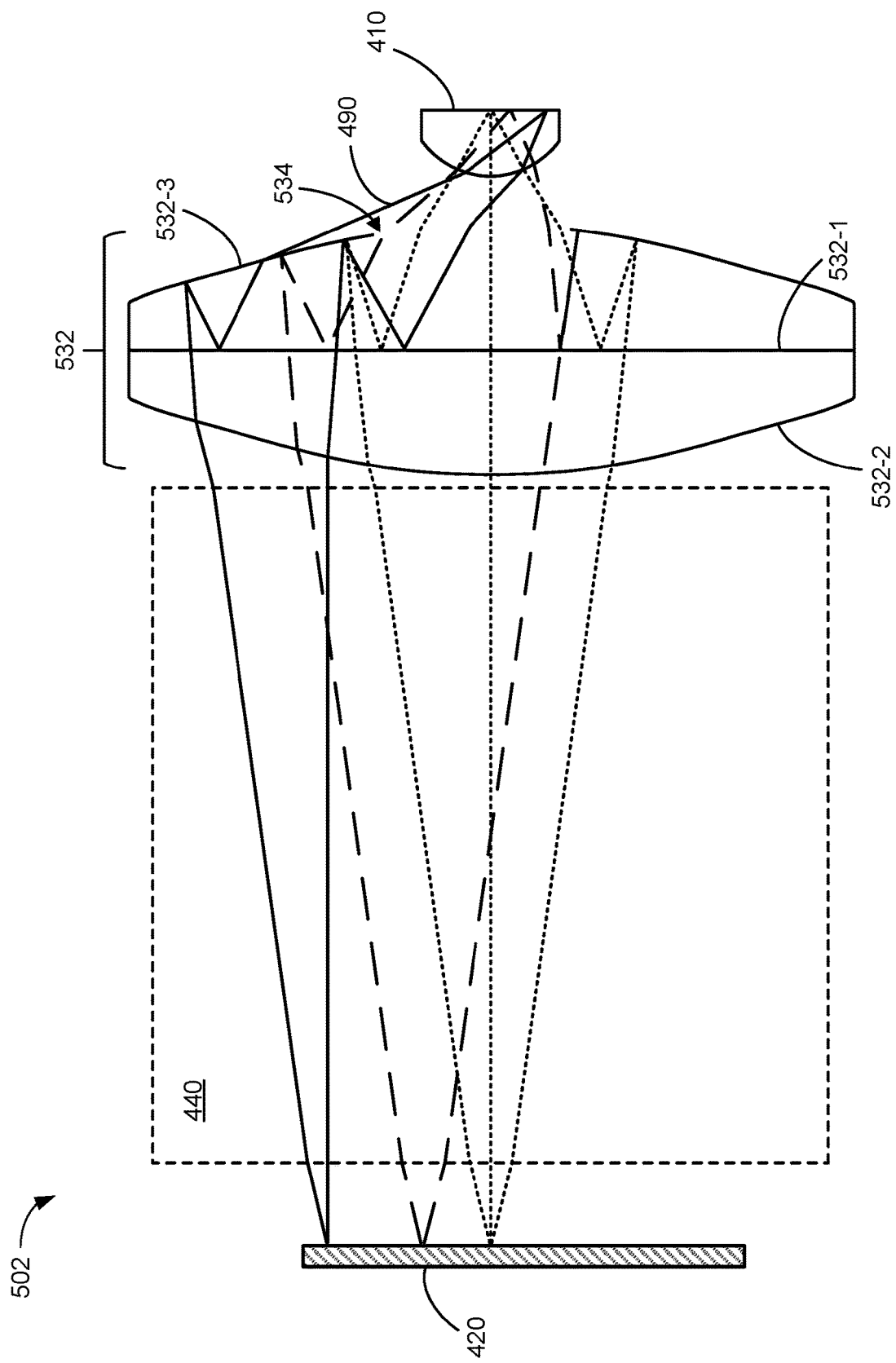
FIGS. 5C-5D are schematic diagrams illustrating display devices in accordance with some embodiments.
Figure 5D:
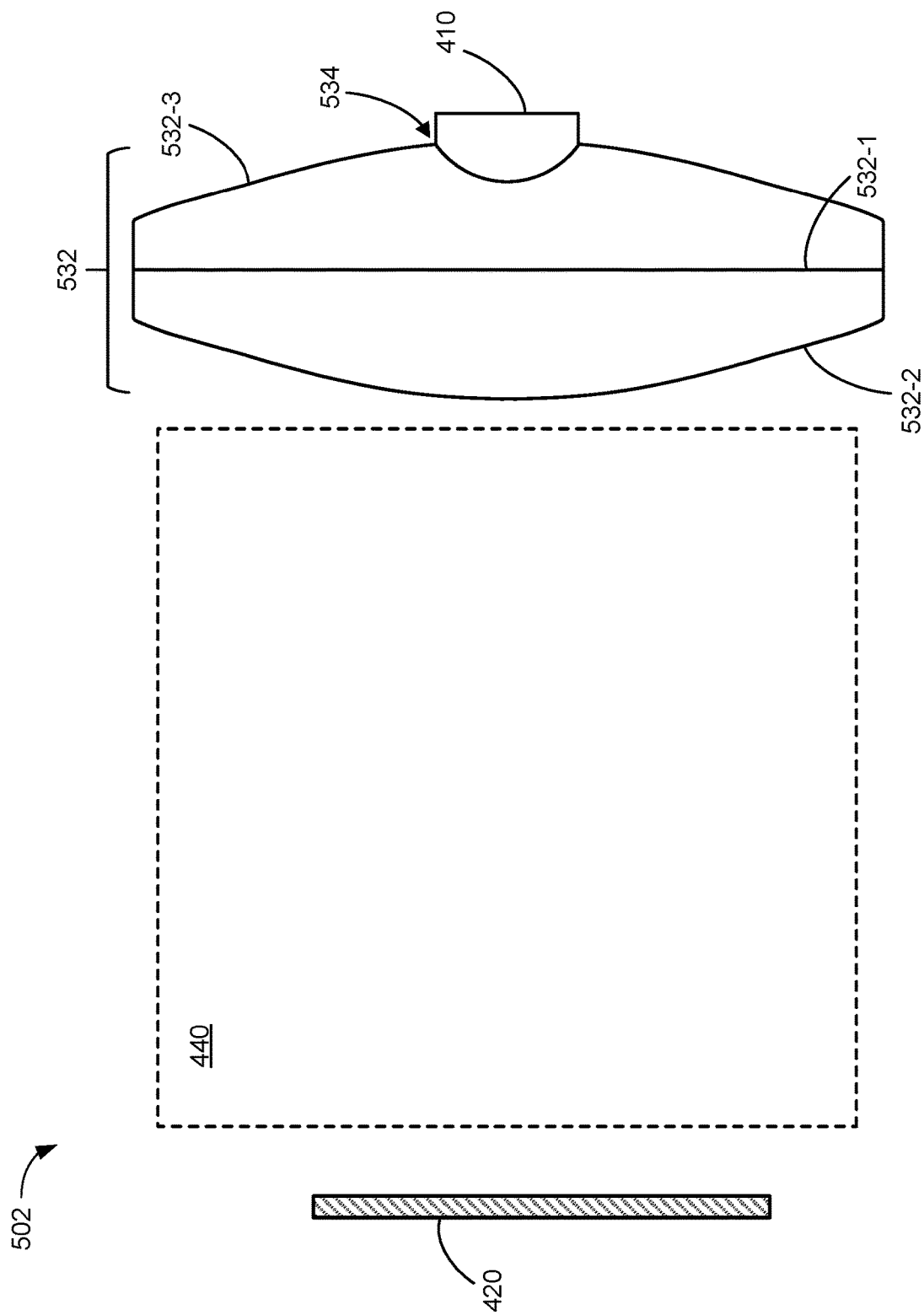

FIGS. 5C-5D are schematic diagrams illustrating a display device 502 that includes an optical assembly 532 in accordance with some embodiments. Display device 502 is similar to display device 500 except that optical assembly 530 is replaced by optical assembly 532. Optical assembly 532 is similar to optical assembly 530 except that the third reflective surface 532-3 of optical assembly 532 defines an aperture 534 (e.g., a physical through-hole or a window, such as a portion of a surface without a reflective coating where the rest of the surface includes a reflective coating).

In some embodiments, as shown in FIG. 5C, the optical assembly 532 is disposed between the light source 410 and the spatial light modulator 420 (e.g., a reflective spatial light modulator). In such cases, the light source 410 is aligned (e.g., coupled) with the aperture 534 in the third reflective surface 532-3 of the optical assembly 532 so that at least a portion (e.g., first portion 490-1 and second portion 490-2) of the illumination light 490 is transmitted through the aperture 534 of the third reflective surface 532-3 toward the first reflective surface 532-1. In such cases, the optical path and polarization of the illumination light 490 in the optical assembly 532 are similar to the optical path of the illumination light 490 in the optical assembly 530 except that the illumination light 490 is transmitted through the aperture 534 of the third reflective surface 532-3.

In some embodiments, the third reflective surface 532-3 includes a first portion that includes reflective coating and a second portion that does not include the reflective coating. The first portion surrounds the second portion and the second portion corresponds to the aperture 534 (e.g., the aperture 534 is a hole in a reflective coating of the third reflective surface 532-3).

In some embodiments, the aperture 534 is a physical hole in the third reflective surface 532-3. In some cases, as shown in FIG. 5D, at least a portion of the light source 410 may be disposed inside the aperture 534. In such cases, the optical path of the illumination light 490 in the optical assembly 532 is similar to the optical path of the illumination light 490 in the optical assembly 530 except that the illumination light 490 is output from the light source 410 toward the first reflective surface 532-1 and thus, the illumination light 490 is not transmitted through the third reflective surface 532-3 prior to being incident upon the first reflective surface 532-1.

Compared to the optical path of the illumination light 490 transmitted through optical assembly 530, the illumination light 490 transmitted through optical assembly 532 is not transmitted through the third reflective surface 533-1, but rather transmitted via the aperture 534 (as shown in FIG. 5C) or directly toward the second reflective surface (as shown in FIG. 5D). In some cases, this eliminates any loss associated with transmission through the third reflective surface 533-1 and allows optical assembly 532 to have a higher transmission efficiency (e.g., lower loss) compared to the optical assembly 530.

Figure 6A:
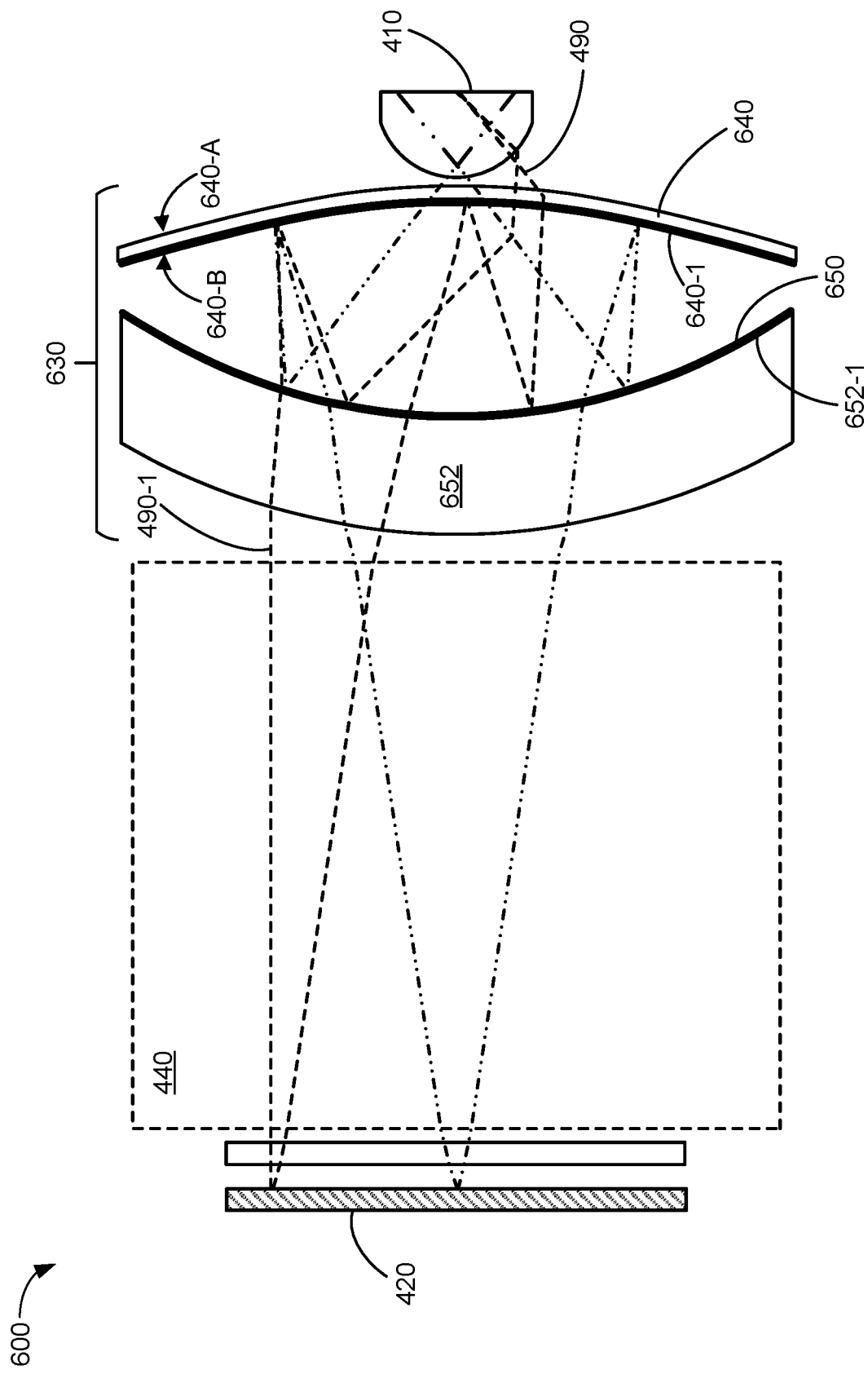
FIGS. 6A-6E are schematic diagrams illustrating display devices in accordance with some embodiments.
Figure 6B:
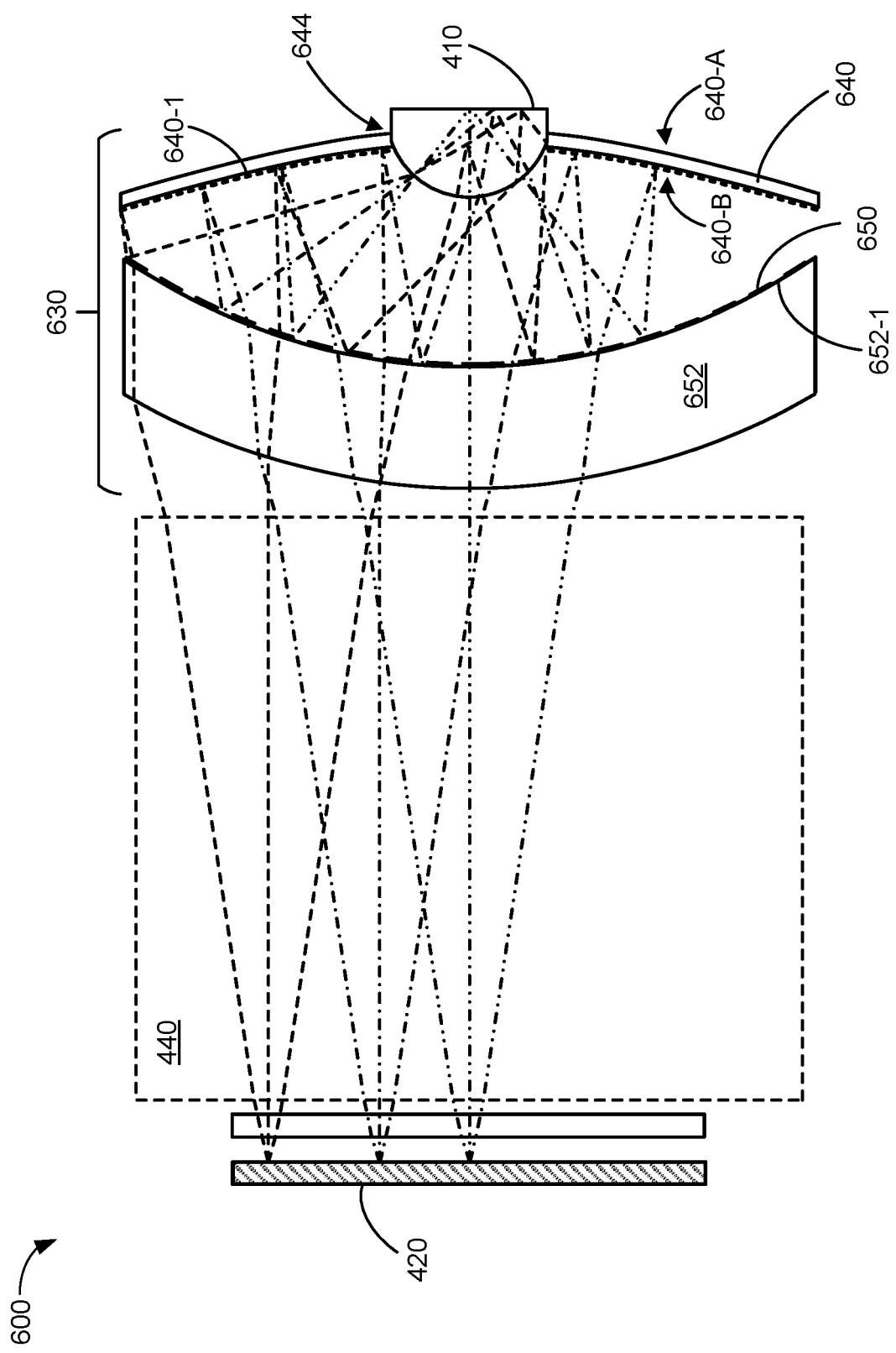
Figure 6C:
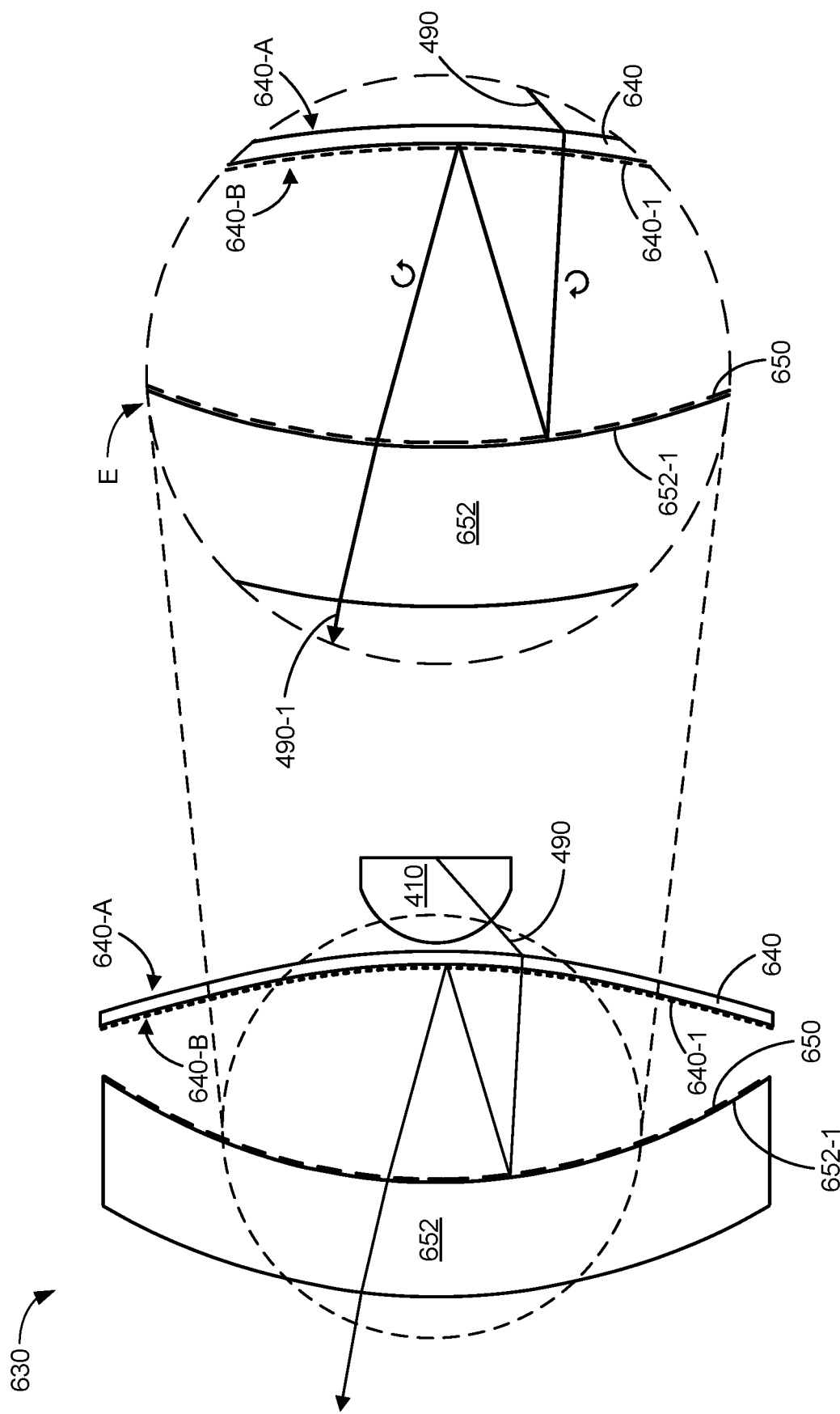

FIGS. 6A-6C are schematic diagrams illustrating a display device 600 that includes optical assembly 630 in accordance with some embodiments. Display device 600 is similar to display device 400 except that optical assembly 430 is replaced by optical assembly 630. Optical assembly 630 includes an optical element 640 and a curved reflector 650. In some embodiments, the curved reflector 650 includes a reflective polarizer and an optical retarder, as described above with respect to FIGS. 4A and 4F. Alternatively, the curved reflector 650 may include a liquid crystal based polarization selective element 450, details of which are provided above with respect to FIGS. 4B-4E.

As shown in FIG. 6A, the curved reflector 650 is configured to receive the illumination light 490 so that at least a portion 490-1 of the illumination light 490 is (i) reflected by the curved reflector 650 toward the optical element 640, (ii) is reflected by the optical element 640 toward the curved reflector 650, and (iii) is transmitted through the curved reflector 650.

In some embodiments, the optical assembly 630 (including both the optical element 640 and the curved reflector 650) is disposed between the light source 410 and the spatial light modulator 420. In such cases, at least a portion 490-1 of the illumination light 490 is transmitted through optical element 640 toward the curved reflector 650 before being reflected by the curved reflector 650.

In some embodiments, as shown in FIG. 6A, the curved reflector 650 is disposed on a substrate 652. In some embodiments, the curved reflector 650 includes one or more coatings disposed on a surface 652-1 of the substrate 652 that faces the optical element 640. For example, the curved reflector 650 may include a polarization sensitive reflective coating and an optical retarder coating, as described above with respect to inset A2 of FIG. 4F. In another example, the curved reflector 650 may include a coating that includes a layer of liquid crystals, such a polarization selective element 450, described above with respect to Figured 4B-4E.

In some embodiments, the optical element 640 includes a reflective surface 640-1 that is a partial reflector (e.g., a 50/50 mirror). Alternatively, the reflective surface 640-1 may be a reflective polarizer that is configured to selectively transmit or reflect light based on the polarization of the light. The reflective surface 640-1 may be disposed on either a first side 640-A or a second side 640-B of the optical element 640. In some embodiments, the reflective surface 640-1 is a reflective coating or a partially reflective coating.

FIG. 6B illustrates a display device 600, in which the optical element 640 defines an aperture 644. In some embodiments, the reflective surface 640-1 is a full reflector. In some cases, the light source 410 is aligned (e.g., coupled) with the aperture 644 so that at least a portion 490-1 of the illumination light 490 is transmitted through the aperture 644 toward the curved reflector 650. In some embodiments, as shown in FIG. 6B, at least a portion of the light source 410 is disposed inside the aperture 644 of the optical element 640.

In some embodiments, the reflective surface 640-1 includes a first portion that includes a reflective coating and a second portion that does not include the reflective coating. The first portion surrounds the second portion and the second portion corresponds to the aperture 644 (e.g., the aperture 644 is a hole in a reflective coating of the reflective surface 640-1).

In some embodiments, the reflective surface 640-1 of the optical element 640 is curved. The radius of curvature of each of the curved reflector 650 and the reflective surface 640-1 (when curved) contributes to an optical power of the portion 490-1 of the illumination light 490 that is directed from the light source 410 to the spatial light modulator 420 via the optical assembly 630.

In some embodiments, as shown in FIG. 6A, the optical assembly 630, including the curved reflector 650 and the optical element 640, is disposed between the light source 410 and the PBS 440.

FIG. 6C illustrates the optical path and the polarization of light transmitted through optical assembly 630. As shown in inset E of FIG. 6C, the reflective surface 640-1 receives the illumination light 490 output from the light source 410, and transmits at least a portion of the illumination light 490 toward curved reflector 650. The curved reflector 650 reflects at least a portion of the illumination light 490, having a first polarization, toward the reflective surface 640-1. The reflective surface 640-1 receives the at least a portion of the illumination light, having the first polarization, and reflects at least a portion of the received light toward the curved reflector 650 so that a portion 490-1 of the light reflected by the reflective surface 640-1 has the second polarization. The curved reflector 650 transmits at least a portion 490-1 of the illumination light 490 that was reflected by the reflective surface 640-1.

In some cases, such as when curved reflector 650 is a coating on the surface 652-1 of the substrate 652, the at least a portion 490-1 of the illumination light 490 is transmitted through the substrate 652.

In some embodiments, in which at least a portion of the light source 410 is disposed inside the aperture 644 of the optical element 640, the optical path of the illumination light 490 is similar to the optical path described above except that the illumination light 490 is output from the light source 410 toward the curved reflector 650 and thus, the illumination light 490 is not transmitted through the reflective surface 640-1 of the optical element 640 prior to being incident upon the curved reflector 650.

In some embodiments, the curved reflector 650 includes a reflective polarizer and an optical retarder. Details regarding the optical path and the polarization of light at the curved reflector are similar to those described above with respect to inset A2 of FIG. 4F. For brevity, such details are not repeated herein.

Figure 6D:
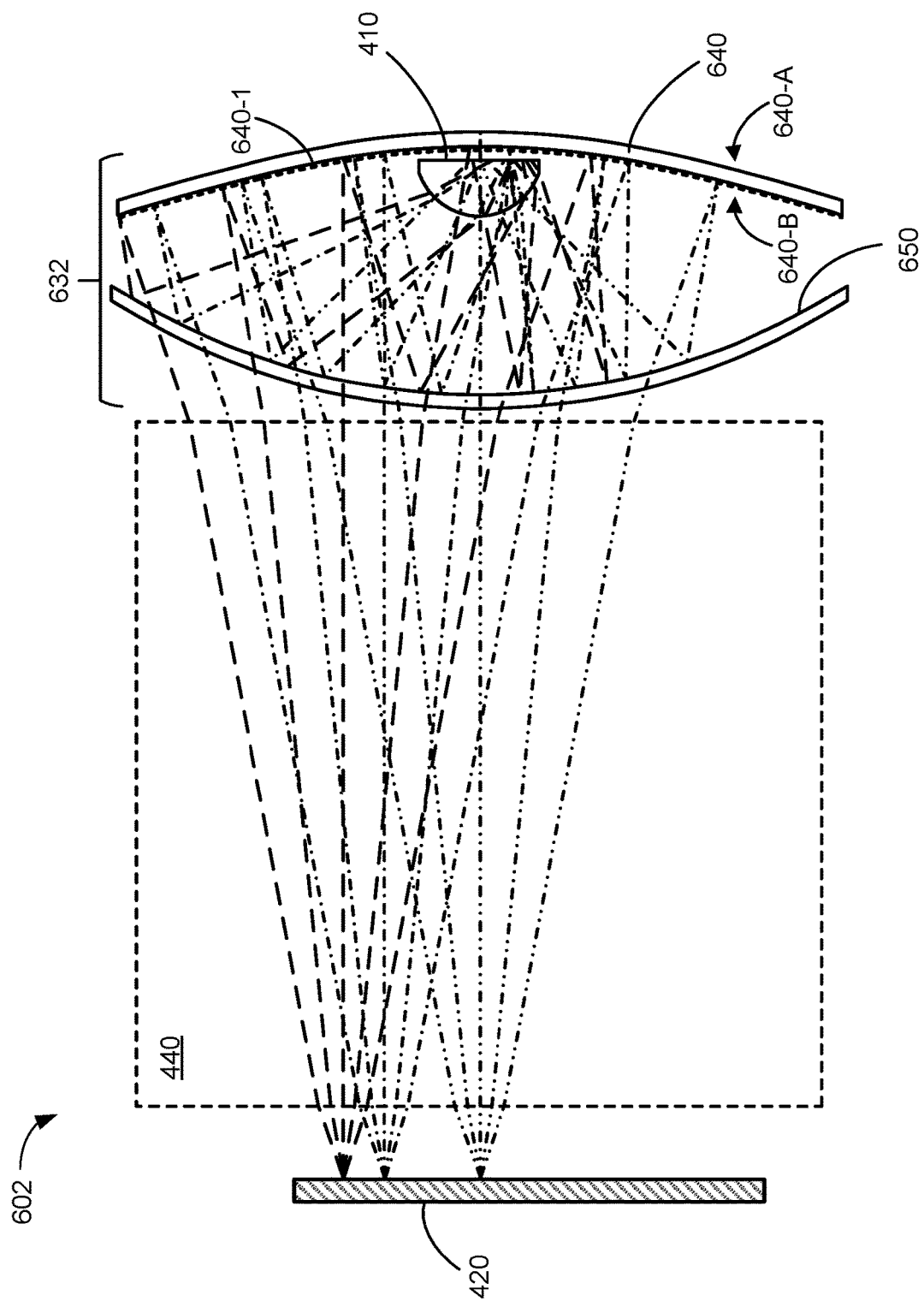

FIG. 6D illustrates a display device 602 in accordance with some embodiments. Display device 602 is similar to display device 600 except that the optical assembly 630 is replaced with an optical assembly 632. In FIG. 6D, the light source 410 is disposed between the optical element 640 and the curved reflector 650. The light source 410 shown in FIG. 6D is configured to provide (e.g., generate, emit, or output) the illumination light 490 towards the curved reflector 650. The curved reflector 650 is configured to receive the illumination light 490 and reflect at least a portion of the illumination light 490 to so that at least a portion 490-1 of the illumination light 490 that is reflected at the curved reflector 650 is: (i) received by the optical element 640, (ii) reflected by the optical element 640 (e.g., the reflective surface 640-1 of the optical element 640) toward curved reflector 650, and (iii) transmitted through the curved reflector 650.

In some embodiments, the light source 410 may not be completely (e.g., 100%) transparent (e.g., optically transparent to the illumination light 490). In such cases, when the light source 410 is disposed between the curved reflector 650 and the optical element 640, the light source 410 may block some of the illumination light 490 as the illumination light 490 is reflected between the curved reflector 650 and the optical element 640. Thus, a portion of the illumination light 490 reflected by the curved reflector 650 is not received at the optical element 640 and a portion of the illumination light 490 reflected by the optical element 640 toward the curved reflector 650 is not received by the curved reflector 650. In such cases, the at least a portion 490-1 of the illumination light is a subset, less than all, of the illumination light provided (e.g., generated, emitted, or output) by the light source 410.

In some embodiments, in which at least a portion of the light source 410 is disposed inside the aperture 644 of the optical element 640 (shown in FIG. 6C) or the light source 410 is disposed between the optical element 640 and the curved reflector 650, the optical element 640 includes a full reflector (e.g., a mirror, such as a reflector with a reflectance greater than 80%, 85%, 90%, 95%, 97%, 98%, or 99%). In some embodiments, the reflective surface 640-1 is a full reflector.

The optical path of the illumination light 490 in optical assembly 632 is similar to the optical path of the illumination light 490 in optical assembly 630 except that the illumination light 490 is output from the light source 410 toward the curved reflector 650 and thus, the illumination light 490 is not transmitted through the reflective surface 640-1 or the optical element 640 prior to being incident upon the curved reflector 650.

Figure 6E:
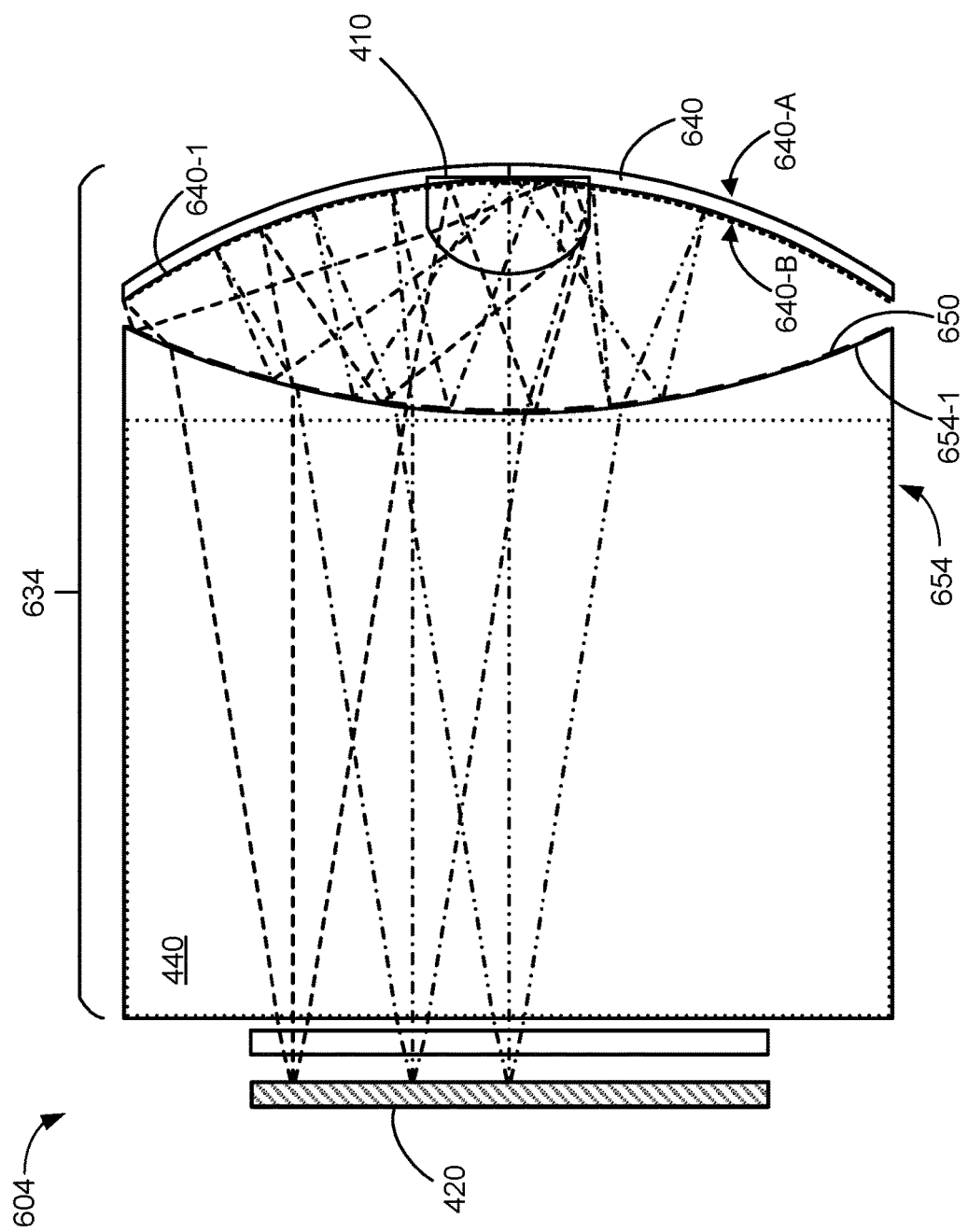

FIG. 6E illustrates a display device 604 in accordance with some embodiments. Display device 604 is similar to display device 600 except that the optical assembly 630 is replaced with an optical assembly 634. In FIG. 6E, the curved reflector 650 is disposed on a substrate 654 that includes PBS 440 (e.g., the curved reflector 650 is integrated with PBS 440, and the PBS 440 that is included as part of substrate 654 is indicated by a dotted box). In some embodiments, the curved reflector 650 is a polarization selective coating disposed on a surface 654-1 of the substrate 654 that faces the optical element 640.

The optical path of the illumination light 490 in optical assembly 634 is similar to the optical path of the illumination light 490 in optical assembly 630 except that the illumination light 490 is output from the light source 410 toward the curved reflector 650 and thus, the illumination light 490 is not transmitted through the reflective surface 640-1 or the optical element 640 prior to being incident upon the curved reflector 650. Additionally, the at least a portion 490-1 of the illumination light 490 that is transmitted through the curved reflector is coupled into the substrate 654 and PBS 440.

FIG. 7 is a schematic diagram illustrating a display device 700 that includes an optical element 730 in accordance with some embodiments. Display device 700 is similar to display device 400 except that optical assembly 430 is replaced by optical element 730. The optical element 730 includes a first reflective surface 730-1 and a second surface 730-2 that is opposite to the first reflective surface 730-1. The light source 410 is disposed between the optical element 730 and the spatial light modulator 420 (e.g., a reflective spatial light modulator), and is configured to provide (e.g., generate, emit, or output) illumination light 490 towards the optical element 730. The first reflective surface 730-1 is configured to receive and reflect the illumination light 490 so that at least a portion of the illumination light 490 illuminates the spatial light modulator 420.

In some embodiments, as shown, the second surface 730-2 is configured to receive the illumination light 490 provided (e.g., generated, emitted, or output) by the light source 410 and to transmit the received illumination light 490 toward the first reflective surface 730-1. The first reflective surface 730-1 is configured to reflect at least a portion 490-1 of the illumination light, transmitted through the second surface 730-2, back toward the second reflective surface 730-2 so that at least a portion 490-1 of the light reflected by the first reflective surface 730-1 is transmitted through the second surface.

In some embodiments, the display device 700 includes PBS 440. In such cases, the light source 410 is disposed between the optical element 730 and the PBS 440 such that the at least a portion 490-1 of the illumination light 490 is received at the PBS 440.

In some embodiments, the light source 410 may not be completely (e.g., 100%) transparent (e.g., optically transparent to the illumination light 490). In such cases, the at least a portion 490-1 of the illumination light is a subset, less than all, of the illumination light provided (e.g., generated, emitted, or output) by the light source 410.

In some embodiments, as shown in FIG. 7, the first reflective surface 730-1 is curved and has a first radius of curvature. The first radius of curvature of the first reflective surface 730-1 contributes, at least partially, to an optical power of the at least a portion 490-1 of the illumination light 490 that is directed from the light source 410 to the spatial light modulator 420 via the optical element 730.

In some embodiments, the second surface 730-2 is curved and has a second radius of curvature that is different from the first radius of curvature. Due to refraction (of the illumination light 490 and/or the at least a portion 490-1 of the illumination light 490) at the second surface 730-2, the second radius of curvature of the second surface 730-2 may contribute, at least partially, to the optical power of the at least a portion 490-1 of the illumination light 490 that is directed from the light source 410 to the spatial light modulator 420 via the optical element 730.

In some embodiments, the first reflective surface 730-1 is a full reflector (e.g., mirror). Alternatively, the first reflective surface 730-1 may be a partial reflector (e.g., a 50/50 mirror) or a reflective polarizer that is configured to selectively transmit or reflect light based on the polarization of the light.

In some embodiments, the second surface 730-2 is a non-reflective surface (e.g., an optical surface that does not include any reflective or partially reflective coatings). In some embodiments, the second surface 730-2 may include a non-reflective coating (e.g., anti-reflection coating) that is configured to reduce loss due to reflection at an optical surface.

Figure 8A:
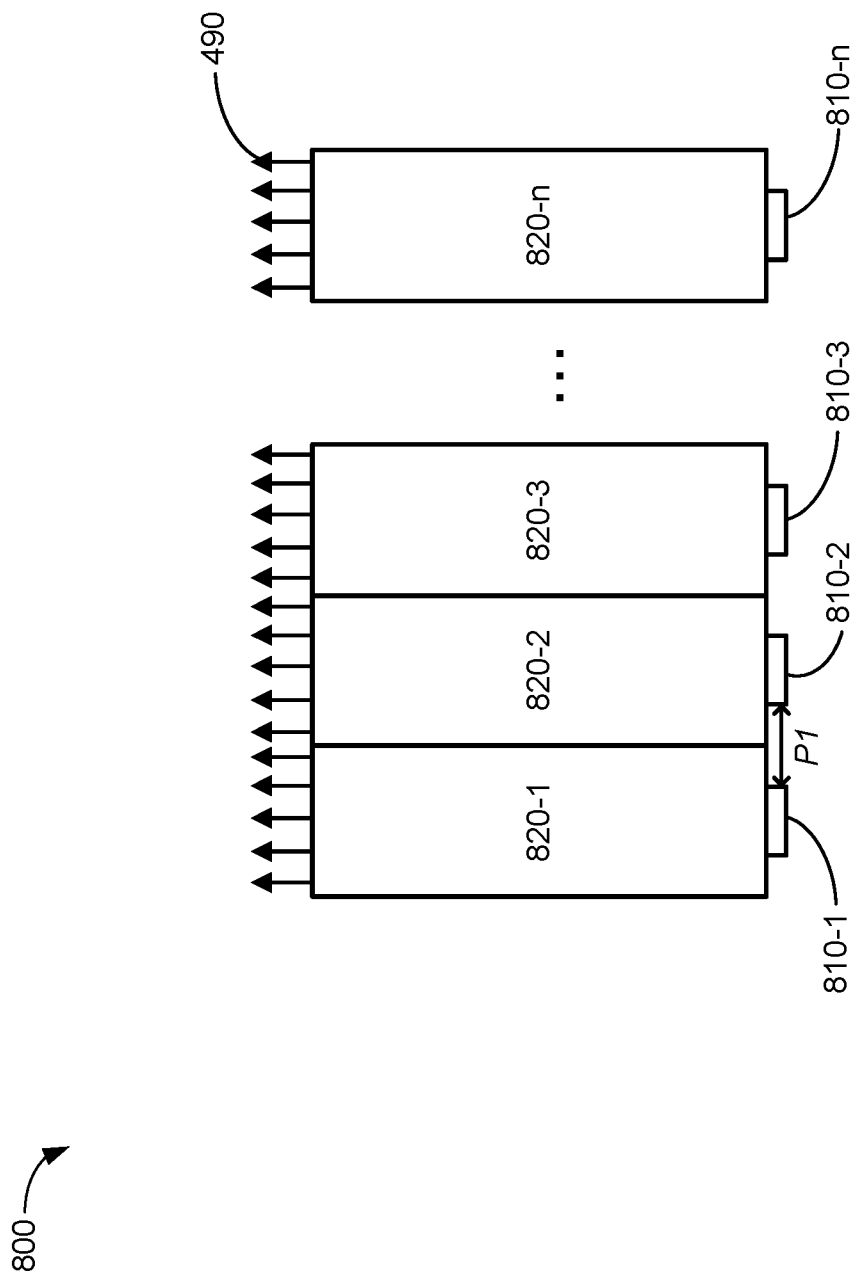
Figure 8C:
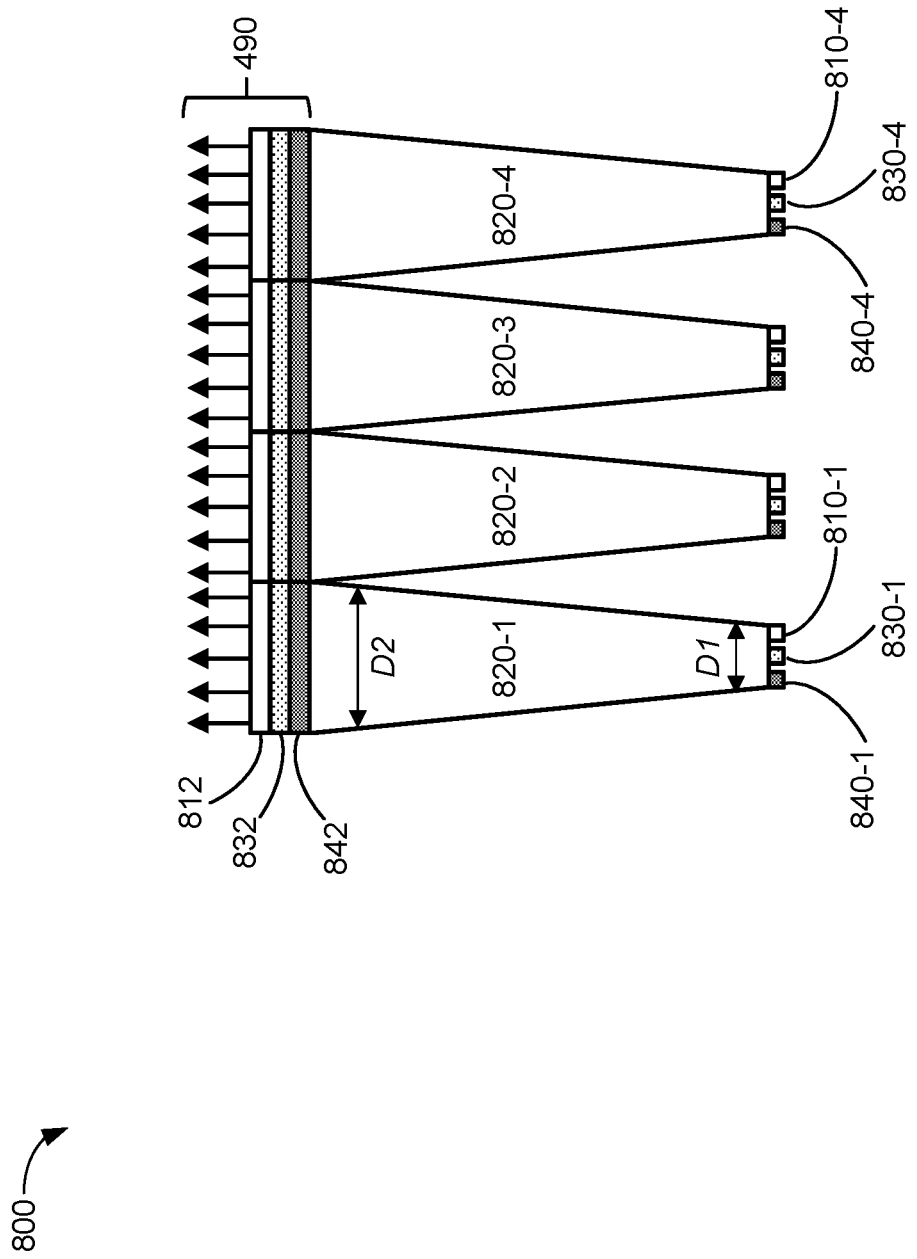

FIGS. 8A-8C are schematic diagrams illustrating a light source 800, which corresponds to light source 410 in some embodiments. Light source 800 includes a first plurality of light emitting elements 810 (e.g., LEDs, miniLEDs) that is configured to provide (e.g., generate, emit, or output) first light having wavelengths in a first wavelength range (e.g., red light). The light source also includes a plurality of waveguides 820. A respective waveguide 820 (e.g., one of waveguides 820-1, 820-2, 820-3, ..., 820-n) of the plurality of waveguides 820 includes an input end that is coupled to a respective light emitting element 810 (e.g., light emitting elements 810-1, 810-2, 810-3, ..., 810-n) of the first plurality of light emitting elements 810 (e.g., the respective light emitting element 810 is disposed adjacent to or at the input end of the respective waveguide 820). A respective waveguide 820 is configured to transmit the first light output from the respective light emitting element 810, so that the first light is output, from an output end of the waveguide 820 that is opposite to the input end of the waveguide 820, as illumination light 490. In some embodiments, the plurality of waveguides 820 is configured to transmit the first light such that the illumination light 490 provides uniform illumination. For example, the plurality of waveguides 820 has a particular length for providing uniform illumination. In some cases, the length of the plurality of waveguides 820 is selected based on a divergence of the light emitting elements 810. In some embodiments, the plurality of waveguides 820 is configured to transmit the first light such that the illumination light 490 output from the light source is collimated (e.g., a respective waveguide of the plurality of waveguides 820 is tapered to provide collimated light).

In some embodiments, a distance P1 between two consecutive (e.g., adjacent) light emitting elements, as shown in FIG. 8A, is between 50 microns and 120 microns. For example, when light emitting elements 810 are red LEDs or red miniLEDs, the distance P may be less than 60 microns, between 50 and 70 microns, between and 60 and 80 microns, between 70 and 90 microns, between 80 and 100 microns, between 90 and 110 microns, between 100 and 120 microns, or greater than 110 microns.

In some embodiments, as shown in FIG. 8B, the light source also includes a second plurality of light emitting elements 830 that is configured to provide (e.g., generate, emit, or output) second light having wavelengths in a second wavelength range (e.g., green light) that is different from the first wavelength range. A respective waveguide 820 is further coupled to a respective light emitting element (e.g., light emitting elements 830-1, 830-2, 830-3, 830-4) of the second plurality of light emitting elements 830. The respective waveguide 820 is configured to transmit the second light provided from the respective light emitting element of the second plurality of light emitting elements 830. In some embodiments, the plurality of waveguides 820 is configured to transmit each of the first light and the second light such that the illumination light 490 provides uniform illumination. In some embodiments, the plurality of waveguides 820 act as homogenizers, allowing each of the first and second light to be output from the light source 800.

In some embodiments, the light source further includes a third plurality of light emitting elements 834 that are configured to provide (e.g., generate, emit, or output) third light having wavelengths in a third wavelength range (e.g., blue light) that is different from each of the first wavelength range and the second wavelength range. A respective waveguide 820 is further coupled to a respective light emitting element (e.g., light emitting elements 840-1, 840-2, 840-3, 840-4) of the third plurality of light emitting elements 840. The respective waveguide 820 is configured to transmit the third light provided from the respective light emitting element of the third plurality of light emitting elements 840. In some embodiments, the plurality of waveguides 820 is configured to transmit each of the first light, the second light, and the third light such that the illumination light 490 provides uniform illumination. In some embodiments, the plurality of waveguides 820 acts as homogenizers, allowing each of the first, second, and third light to provide uniform illumination when output from the light source 800. In some embodiments, the illumination light 490, output from the plurality of waveguides 820, include each of the first, second, and third light, illustrated by the boxes 812, 832, and 842, respectively.

In some embodiments, a distance P2 between two consecutive (e.g., adjacent) light emitting elements that are configured to provide light having different wavelength ranges is between 30 microns and 70 microns. For example, when light emitting elements 840 are configured to provide red light and light emitting elements 830 are configured to provide green light, the distance P2 may be less than 30 microns, between 20 and 40 microns, between 30 and 50 microns, between 40 and 60 microns, between 50 and 70 microns, between 60 and 80 microns, or greater than 70 microns.

Although four waveguides and four light emitting elements are shown for each of the first plurality of light emitting elements 810, the second plurality of light emitting elements 830, and the third plurality of light emitting elements 840, it is understood that the light source 800 may include any number of waveguides and light emitting elements.

In some embodiments, the first wavelength range and the second wavelength range include non-overlapping wavelengths (e.g., the first wavelength range and the second wavelength range are mutually exclusive). For example, the first light may correspond to light having a red color and the second light may correspond to light having a green color. Thus, the first wavelength range may include wavelengths from 635 nanometers (nm) to 700 nm and the second wavelength range may include wavelengths from 520 nm-560 nm.

In some embodiments, the first wavelength range and the second wavelength range include common wavelengths (e.g., the first wavelength range and the second wavelength range partially overlap with each other). For example, the first light may correspond to light having a (primarily or dominantly) blue color and the second light may correspond to light having a (primarily or dominantly) green color. Thus, the first wavelength range may include wavelengths from 450 nanometers (nm) to 500 nm and the second wavelength range may include wavelengths from 490 nm to 570 nm.

For example, any of the first light and the second light may correspond to light having any color, such as red, blue, green, white, yellow, orange, etc. Some examples of wavelength ranges include 420-440 nm (blue), 490 nm-570 nm (green), 570-585 nm (yellow), 585-620 nm (orange), and 620-780 nm (red). Light source 800 may include light emitting elements that are configured to provide light having any wavelength range and are not limited to the examples provided herein.

In some embodiments, the third wavelength range is mutually exclusive to the first wavelength range and the second wavelength range. In some embodiments, the third wavelength range partially overlaps with the first wavelength range or the second wavelength range.

In some embodiments, a respective waveguide 820 of the plurality of waveguides 820 is tapered. As shown in FIG. 8C, the input end of a respective waveguide 820 has a first width D1 and the output end of the respective waveguide 820 has a second width D2 that is different from (e.g., greater than) the first width D1. Although FIG. 8C shows that a respective waveguide 820 is coupled to three light emitting elements, it is understood that a respective waveguide 820 may be coupled to any number of light emitting elements. Additionally, the respective waveguide 820 may have the first width D1 that is equal to or greater than a width of the light emitting element(s) that the respective waveguide 820 is coupled to. For example, if a light emitting element is a miniLED that has a width of 10 microns and a respective waveguide 820 is coupled to the light emitting element, the respective waveguide 820 may have a width D1 that is 10 microns or greater. Similarly, if the respective waveguide 820 is coupled to two light emitting elements that each have a width of 10 microns, the respective waveguide 820 may have a width D1 that is 20 microns or greater (e.g., 50 microns or greater if the two light emitting elements are separated by 30 microns). In some embodiments, the respective waveguide 820 has a cylindrical shape (or a conical shape) and the first width D1 and the second width D2 correspond to a diameter D1 and a diameter D2 of the respective waveguide 820 on both ends.

In some embodiments, the use of tapered waveguides collimates light. This, in turn, improves an efficiency as light emitted from a light emitting element can provide uniform intensity over a wider area compared to light emitted from the same light emitting element via a non-tapered waveguide.

In some embodiments, the tapered waveguide 820 has a linear taper profile (e.g., the respective waveguide 820 has straight side walls). Alternatively, the respective waveguide 820 may have a non-linear taper profile, such as a parabolic, curved, or exponential taper profile (e.g., as in a compound parabolic concentrator).

In some embodiments, the waveguide is a planar or slab waveguide and widths D1 and D2 correspond to distances between the side walls of the waveguide at respective ends. In some embodiments, the waveguide is an optical fiber and distances D1 and D2 correspond to diameters of a core of the optical fiber at respective ends. For example, planar waveguides may have side walls that are separated by as little as a few microns (e.g., ~1-3 microns) or as large as an a few millimeters (1-2 millimeters). For example, for an optical fiber may have a core diameter ranging from a few microns (e.g., ~1-3 microns) up to 800 microns or larger. Some common core diameters are 9 microns, 50 microns, and 62.5 microns.

In some embodiments, a respective waveguide 820 may include an extramural absorption element (e.g., extramural layer) for absorbing stray light that may escape from the respective waveguide 820.

Figure 9B:
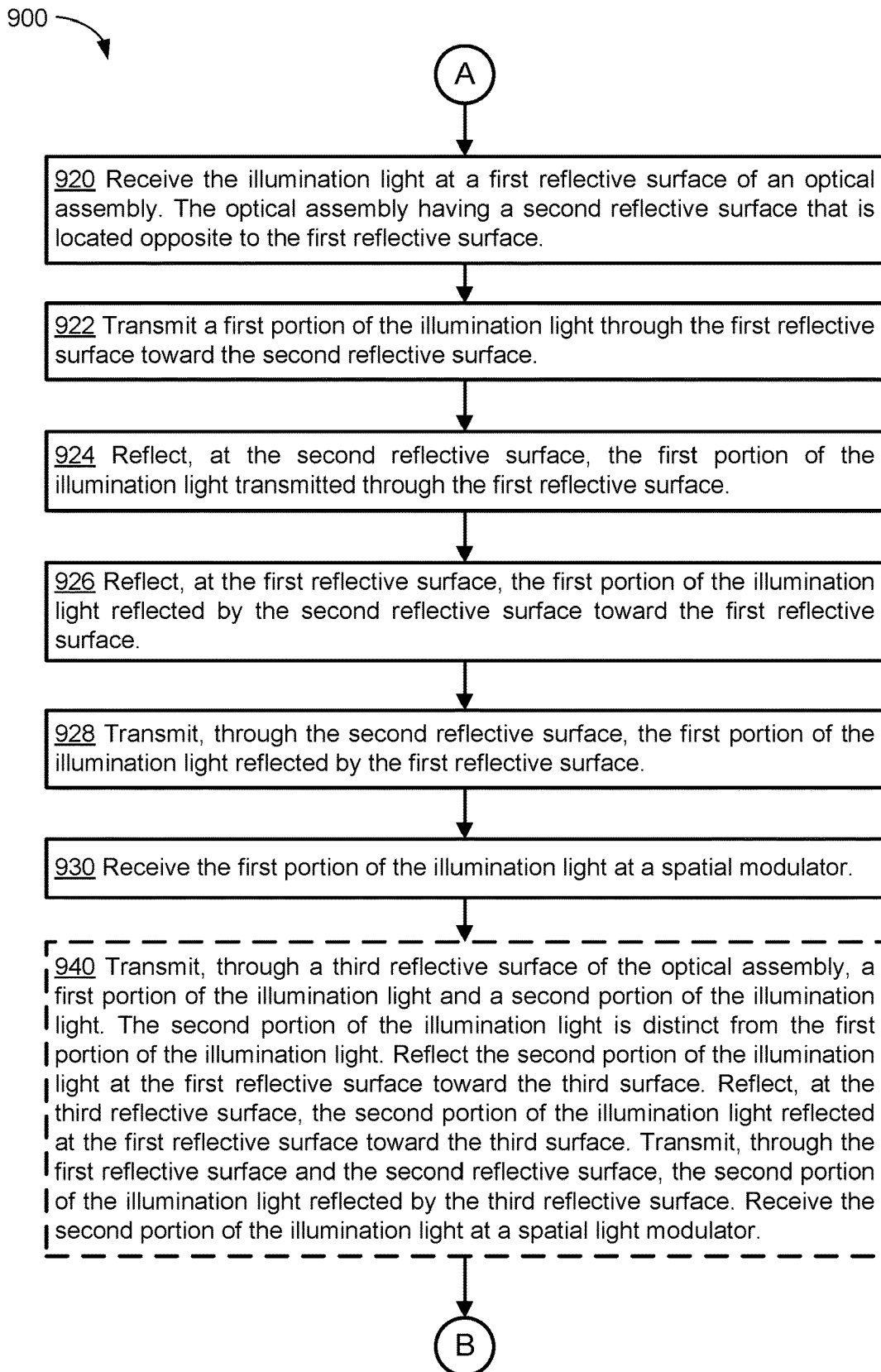

FIGS. 9A-9C are flow diagrams illustrating a method 900 of providing short distance illumination in accordance with some embodiments. The method 900 includes (operation 902) outputting illumination light 490 from a light source 410, (operation 920) receiving the illumination light 490 at a first reflective surface 430-1 or 530-1 of an optical assembly 430 or 530. The optical assembly 430 or 530 includes a second reflective surface 430-2 or 530-2 that is located opposite to the first reflective surface 430-1 or 530-1. The method 900 also includes (operation 922) transmitting a first portion 490-1 of the illumination light 490 through the first reflective surface 430-1 or 530-1 toward the second reflective surface 430-2 or 530-2; (operation 924) reflecting, at the second reflective surface 430-2 or 530-2, the first portion 490-1 of the illumination light 490 that has been transmitted through the first reflective surface 430-1 or 530-1; and (operation 926) reflecting, at the first reflective surface 430-1 or 530-1, the first portion 490-1 of the illumination light 490 that has been reflected by the second reflective surface 430-2 or 530-2 toward the first reflective surface 430-1 or 530-1. The method further includes (operation 928) transmitting, through the second reflective surface 430-2 or 530-2, the first portion 490-1 of the illumination light 490 reflected by the first reflective surface 430-1 or 530-1; and (operation 930) receiving the first portion of the illumination light at a spatial light modulator (e.g., spatial light modulator 420).

In some embodiments, the light source 800 (corresponding to light source 410) includes a first plurality of light emitting elements 810 (e.g., light emitting elements 810-1, 810-2, 810-3, . . . , 810-$n$) and a plurality of waveguides 820 (e.g., waveguides 820-1, 820-2, 820-3, . . . , 820-$n$). In some embodiments, the method 900 includes (operation 904) providing first light having wavelengths in a first wavelength range (e.g., the first light may correspond to light having a red color) from a respective light emitting element of the first plurality of light emitting elements 810, guiding the first light by a respective waveguide of the plurality of waveguides 820 that is coupled to the respective light emitting element of the first plurality of light emitting elements 810, and transmitting the first light provided by the respective light emitting element of the first plurality of light emitting elements 810 via (e.g., by) the respective waveguide 820 as at least a portion of the illumination light 490.

In some embodiments, the light source 800 (corresponding to light source 410) also includes a second plurality of light emitting elements 830. The method 900 further includes (operation 910) providing second light having wavelengths in a first wavelength range (e.g., the second light may correspond to light having a green color) from a respective light emitting element of the second plurality of light emitting elements 830, guiding the second light by a respective waveguide of the plurality of waveguides 820 that is coupled to the respective light emitting element of the second plurality of light emitting elements 830, and transmitting the second light provided by the respective light emitting element of the second plurality of light emitting elements 830 via (e.g., by) the respective waveguide 820 as at least a portion of the illumination light 490.

In some embodiments, the respective waveguide of the plurality of waveguides 820 is tapered, illustrated in FIG. 8C.

In some embodiments, the light source includes a plurality of light emitting elements (e.g., light emitting elements 810-1 through 810-$n$, light emitting elements 830, and/or light emitting elements 840) and the method 900 further includes (operation 916) activating a subset, less than all, of the plurality of light emitting elements.

In some embodiments, the method 900 further includes (operation 940) transmitting, through a third reflective surface 530-3 of the optical assembly 530, a first portion 490-1 of the illumination light 490 and a second portion 490-2 of the illumination light 490 that is distinct from the first portion 490-1 of the illumination light 490, illustrated in FIG. 5B. In some embodiments, the method 900 also includes reflecting the second portion of the illumination light at the first reflective surface toward the third surface; reflecting, at the third reflective surface 530-3, the second portion 490-2 of the illumination light 490 reflected at the first reflective surface 530-1 toward the third reflective surface 530-3; transmitting, through the first reflective surface 530-1 and the second reflective surface 530-2, the second portion 490-2 of the illumination light 490 reflected by the third reflective surface 530-3; and receiving the second portion 490-2 of the illumination light 490 output from optical assembly 530 at the spatial light modulator 420.

In some embodiments, the method 900 further includes (operation 950) receiving the first portion 490-1 of the illumination light 490 transmitted through the optical assembly 430 or 530 at a beam splitter 440 (e.g., PBS 440); providing with the beam splitter 440 the first portion 490-1 of the illumination light 490 in a first direction toward a spatial light modulator 420; and (operation 952) receiving, at the beam splitter 440, the first portion 490-1 of the illumination light 490 in a first direction toward the spatial light modulator 420.

In some embodiments, modulating least the first portion 490-1 of the illumination light 490 includes (operation 952) reflecting a subset, less than all, of the first portion 490-1 of the illumination light 490.

In some embodiments, the method 900 also includes (operation 960) modulating the second portion 490-2 of the illumination light 490 with the spatial light modulator 420, outputting the at least the first portion 490-1 of the illumination light 490 from the spatial light modulator 420 as modulated light, outputting the at least the second portion 490-2 of the illumination light 490 from the spatial light modulator 420 as modulated light. In such cases, the modulated light output from the spatial light modulator 420 includes the modulated first portion 490-1 of the illumination light 490 and the modulated second portion 490-2 of the illumination light 490. The method 900 also includes providing, by the beam splitter 440, the modulated light in a second direction that is non-parallel to the first direction.

Figure 10B:
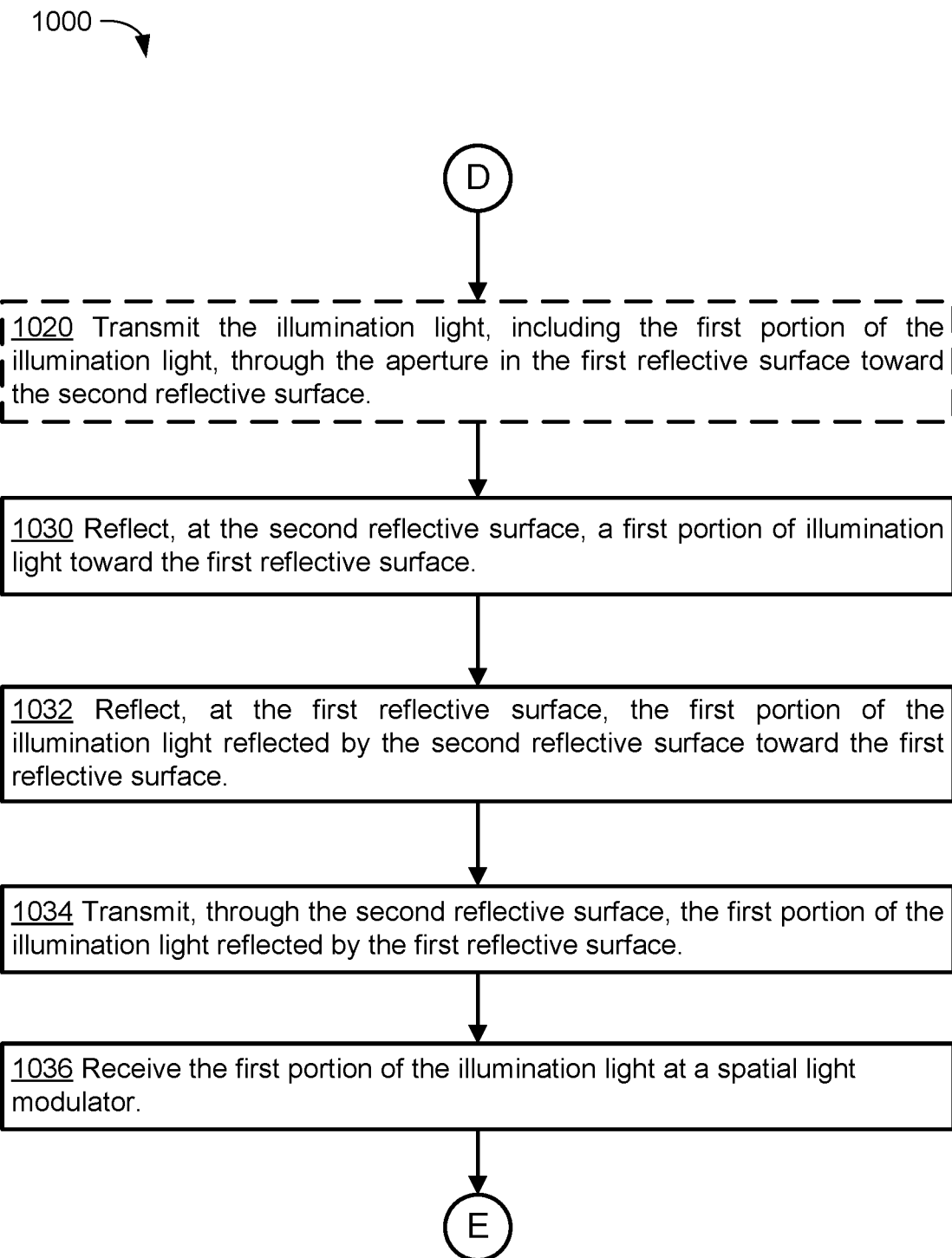

FIGS. 10A-10C is a flow diagram illustrating a method 1000 of providing short distance illumination in accordance with some embodiments. The method 1000 includes (operation 1002) outputting illumination light 490 from a light source 410. The light source 410 is positioned adjacent to a first reflective surface (e.g., first reflective surface 432-1 or third reflective surface 532-3) of an optical assembly 432 or 532. The first reflective surface (e.g., first reflective surface 432-1 or third reflective surface 532-3) defines an aperture 434 or 534, and the optical assembly 432 or 532 has a second reflective surface (e.g., second reflective surface 432-2 or first reflective surface 532-1) that is located opposite to the first reflective surface (e.g., first reflective surface 432-1 or third reflective surface 532-3). The method 1000 also includes (operation 1030) reflecting, at the second reflective surface (e.g., second reflective surface 432-2 or first reflective surface 532-1), a first portion 490-1 of illumination light 490 toward the first reflective surface (e.g., first reflective surface 432-1 or third reflective surface 532-3); (operation 1032) reflecting, at the first reflective surface (e.g., first reflective surface 432-1 or third reflective surface 532-3), the first portion 490-1 of the illumination light 490 that was reflected by the second reflective surface (e.g., second reflective surface 432-2 or first reflective surface 532-1) toward the first reflective surface (e.g., first reflective surface 432-1 or third reflective surface 532-3); (operation 1034) transmitting, through the second reflective surface (e.g., second reflective surface 432-2 or first reflective surface 532-1), the first portion 490-1 of the illumination light 490 reflected by the first reflective surface (e.g., first reflective surface 432-1 or third reflective surface 532-3); and (operation 1036) receiving the first portion 490-1 of the illumination light 490 at a spatial light modulator 420.

In some embodiments, at least a portion of the light source 410 is disposed in the aperture 434 or 534 in the first reflective surface (e.g., first reflective surface 432-1 or third reflective surface 532-3).

In some embodiments, the light source 800 (corresponding to light source 410) includes a first plurality of light emitting elements 810 (e.g., light emitting elements 810-1, 810-2, 810-3, . . . , 810-$n$) and a plurality of waveguides 820 (e.g., waveguides 820-1, 820-2, 820-3, . . . , 820-$n$). In some embodiments, the method 1000 includes (operation 1006) providing first light having wavelengths in a first wavelength range (e.g., the first light may correspond to light having a red color) from a respective light emitting element of the first plurality of light emitting elements 810, guiding the first light by a respective waveguide of the plurality of waveguides 820 that is coupled to the respective light emitting element of the first plurality of light emitting elements 810, and transmitting the first light provided by the respective light emitting element of the first plurality of light emitting elements 810 via (e.g., by) the respective waveguide 820 as at least a portion of the illumination light 490.

In some embodiments, the light source 800 (corresponding to light source 410) also includes a second plurality of light emitting elements 830. The method 1000 further (operation 1010) includes providing second light having wavelengths in a first wavelength range (e.g., the second light may correspond to light having a green color) from a respective light emitting element of the second plurality of light emitting elements 830, guiding the second light by a respective waveguide of the plurality of waveguides 820 that is coupled to the respective light emitting element of the second plurality of light emitting elements 830, and transmitting the second light provided by the respective light emitting element of the second plurality of light emitting elements 830 via (e.g., by) the respective waveguide 820 as at least a portion of the illumination light 490.

In some embodiments, the respective waveguide of the plurality of waveguides 820 is tapered, illustrated in FIG. 8C.

In some embodiments, the light source 800 includes a plurality of light emitting elements (e.g., light emitting elements 810-1 through 810-*n*, light emitting elements 830, and/or light emitting elements 840). The method 1000 further includes (operation 1014) activating a subset, less than all, of the plurality of light emitting elements.

In some embodiments, the method 1000 further includes (operation 1020) includes transmitting the illumination light 490, including the first portion 490-1 of the illumination light 490, through the aperture 434 or 534 in the first reflective surface 432-1 or 532-3 toward the second reflective surface 432-2 or 532-1.

In some embodiments, the method 1000 further includes (operation 1040) transmitting a second portion 490-2 of the illumination light 490 at the second reflective surface (e.g., first reflective surface 532-1) toward a third reflective surface (e.g., second reflective surface 532-2). The second portion 490-2 of the illumination light 490 is distinct from the first portion 490-1 of the illumination light 490. The method 1000 also includes reflecting, at the third reflective surface (e.g., second reflective surface 532-2), the second portion 490-2 of the illumination light 490 transmitted through the second reflective surface (e.g., first reflective surface 532-1) toward the third reflective surface (e.g., second reflective surface 532-2); reflecting, at the second reflective surface (e.g., first reflective surface 532-1), the second portion of the illumination light reflected at the third reflective surface (e.g., second reflective surface 532-2) toward the third reflective surface (e.g., second reflective surface 532-2); and transmitting, through the third reflective surface (e.g., second reflective surface 532-2), the second portion 490-2 of the illumination light 490 reflected by the second reflective surface (e.g., first reflective surface 532-1).

In some embodiments, the method 1000 further includes (operation 1050) receiving the first portion 490-1 of the illumination light 490 transmitted through the second reflective surface (e.g., second reflective surface 432-2 or first reflective surface 532-1) at the beam splitter 440 (e.g., PBS 440). The method 1000 also includes directing, with the beam splitter 440, the first portion 490-1 of the illumination light 490 in a first direction toward the spatial light modulator 420; modulating, with the spatial light modulator 420, the first portion 490-1 of the illumination light 490; outputting, from the spatial light modulator 420, the at least a portion 490-1 of the illumination light 490 as modulated light; receiving, at the beam splitter 440, the first portion 490-1 of the illumination light 490 in a first direction toward the spatial light modulator 420; and directing, with the beam splitter 440, the modulated light in a second direction that is non-parallel to the first direction.

In some embodiments, modulating the first portion 490-1 of the illumination light 490 with the spatial light modulator 420 includes (operation 1052) reflecting a subset, less than all, of the first portion 490-1 of the illumination light 490.

Figure 11B:
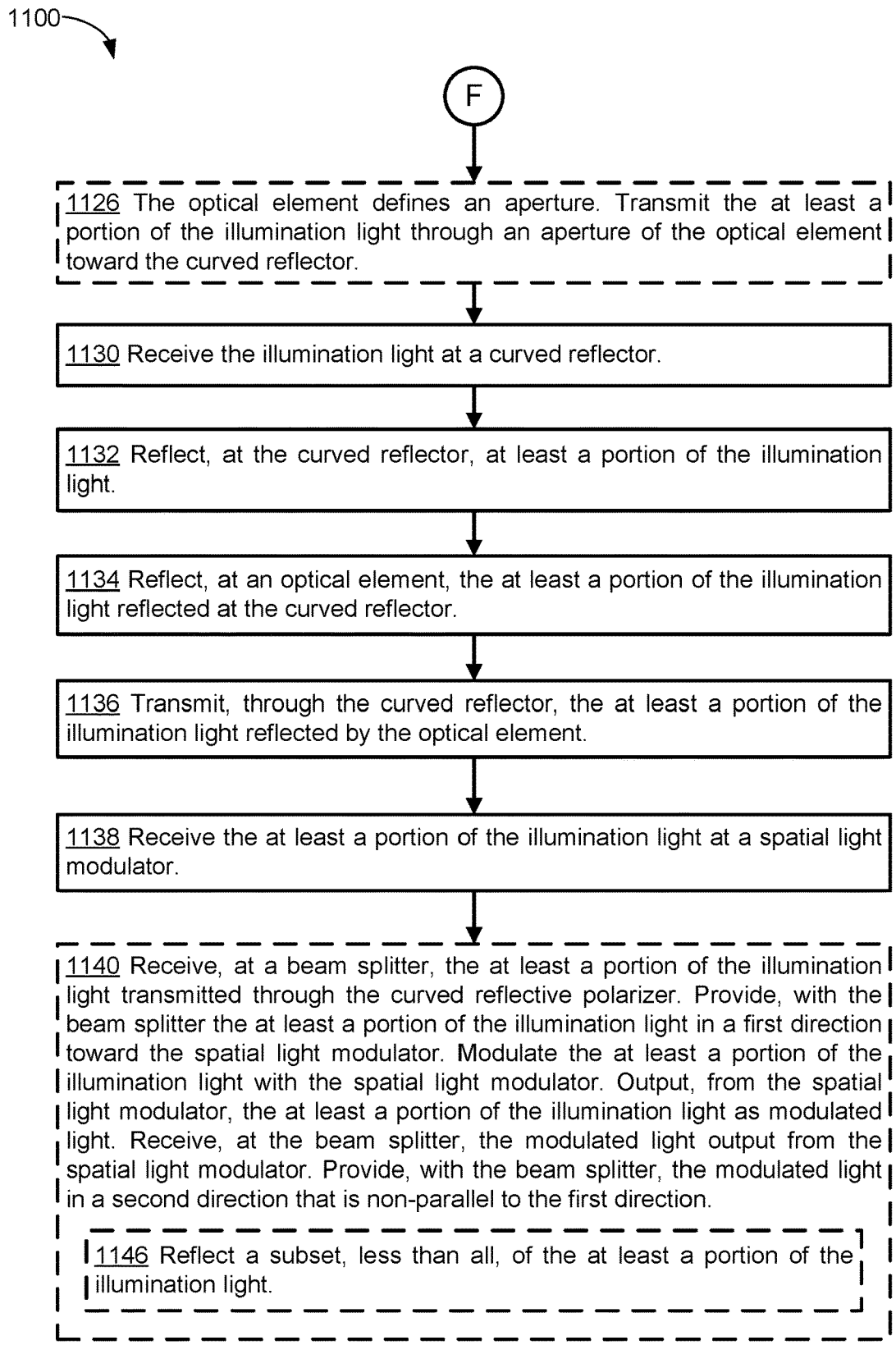

FIGS. 11A-11B is a flow diagram illustrating a method 1100 of providing short distance illumination in accordance with some embodiments. The method 1100 includes (operation 1102) outputting illumination light 490 from a light source 410, (operation 1130) receiving the illumination light 490 at a curved reflector 650, and (operation 1132) reflecting at least a portion 490-1 of the illumination light 490 at the curved reflector 650. The method also includes (operation 1134) reflecting, at an optical element 640, the at least a portion 490-1 of the illumination light 490 reflected at the curved reflector 650; (operation 1136) transmitting, through the curved reflector 650, the at least a portion 490-1 of the illumination light 490 reflected by the optical element 640; and (operation 1138) receiving the at least a portion 490-1 of the illumination light 490 at a spatial light modulator 420.

In some embodiments, the light source 800 (corresponding to light source 410) includes a first plurality of light emitting elements 810 (e.g., light emitting elements 810-1, 810-2, 810-3, . . . , 810-*n*) and a plurality of waveguides 820 (e.g., waveguides 820-1, 820-2, 820-3, . . . , 820-*n*). In some embodiments, the method 1100 includes (operation 1104) providing first light having wavelengths in a first wavelength range (e.g., the first light may correspond to light having a red color) from a respective light emitting element of the first plurality of light emitting elements 810, guiding the first light by a respective waveguide of the plurality of waveguides 820 that is coupled to the respective light emitting element of the first plurality of light emitting elements 810, and transmitting the first light provided by the respective light emitting element of the first plurality of light emitting elements 810 via (e.g., by) the respective waveguide 820 as at least a portion of the illumination light 490.

In some embodiments, the light source 800 (corresponding to light source 410) also includes a second plurality of light emitting elements 830. The method 1100 further includes (operation 1112) providing second light having wavelengths in a first wavelength range (e.g., the second light may correspond to light having a green color) from a respective light emitting element of the second plurality of light emitting elements 830, guiding the second light by a respective waveguide of the plurality of waveguides 820 that is coupled to the respective light emitting element of the second plurality of light emitting elements 830, and transmitting the second light provided by the respective light emitting element of the second plurality of light emitting elements 830 via (e.g., by) the respective waveguide 820 as at least a portion of the illumination light 490.

In some embodiments, the respective waveguide of the plurality of waveguides 820 is tapered, illustrated in FIG. 8C.

In some embodiments, the light source 800 includes a plurality of light emitting elements (e.g., light emitting elements 810-1 through 810-*n*, light emitting elements 830, and/or light emitting elements 840). The method 1100 further includes (operation 1122) activating a subset, less than all, of the plurality of light emitting elements.

In some embodiments, the optical element 640 is disposed relative to the light source 410 and the method 1100 further includes (operation 1124) transmitting the at least a portion 490-1 of the illumination light 490 through the optical element 640 toward the curved reflector 650.

In some embodiments, the optical element 640 defines an aperture 644. The method 1100 further includes (operation 1126) transmitting the at least a portion 490-1 of the illumination light 490 through the aperture 644 of the optical element 640 toward the curved reflector 650. The optical element 640 defines the aperture 644.

In some embodiments, the method 1100 further includes (operation 1140) receiving, at a beam splitter 440 (e.g., PBS 440), the at least a portion 490-1 of the illumination light 490 transmitted through the curved reflector 650; providing, with the beam splitter 440, the at least a portion 490-1 of the illumination light 490 in a first direction toward the spatial light modulator 420; modulating, the at least a portion 490-1 of the illumination light 490 with the spatial light modulator 420; outputting the at least a portion 490-1 of the illumination light 490 from the spatial light modulator 420 as modulated light; receiving the modulated light output from the spatial light modulator 420; and providing, by the beam splitter 440, the modulated light in a second direction that is non-parallel to the first direction.

In some embodiments, modulating the at least a portion 490-1 of the illumination light 490 with the spatial light modulator 420 includes (operation 1146) reflecting a subset, less than all, of the at least a portion 490-1 of the illumination light 490.

Figure 12B:
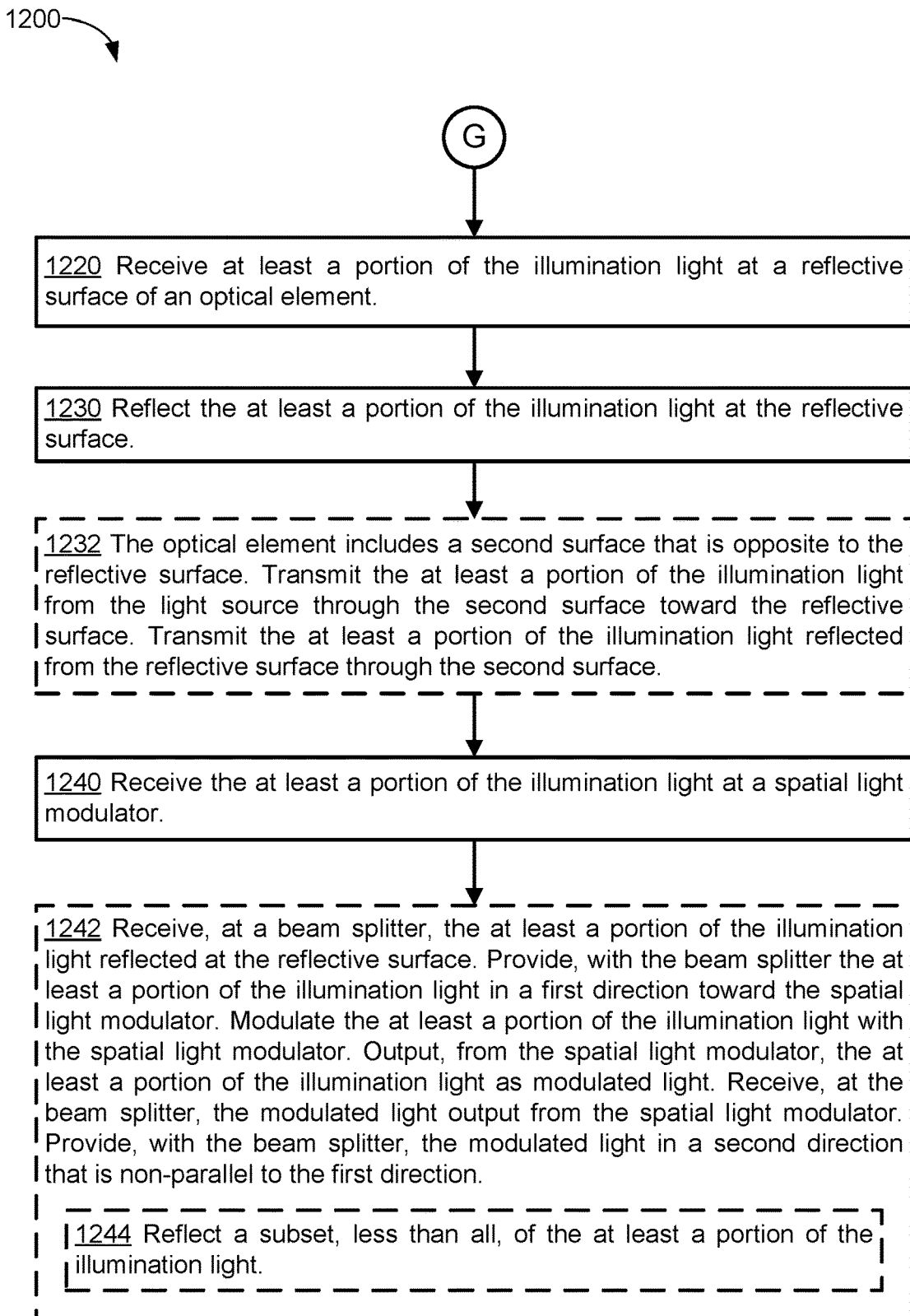

FIGS. 12A-12B is a flow diagram illustrating a method 1200 of providing short distance illumination in accordance with some embodiments. The method 1200 includes (operation 1202) outputting illumination light 490 from a light source 410, (operation 1220) receiving at least a portion 490-1 of the illumination light 490 at a reflective surface 730-1 of an optical element 730, (operation 1230) reflecting the at least a portion 490-1 of the illumination light 490 at the reflective surface 730-1, and (operation 1240) receiving the at least a portion 490-1 of the illumination light 490 at a spatial light modulator 420.

In some embodiments, the light source 800 (corresponding to light source 410) includes a first plurality of light emitting elements 810 (e.g., light emitting elements 810-1, 810-2, 810-3, . . . , 810-n) and a plurality of waveguides 820 (e.g., waveguides 820-1, 820-2, 820-3, . . . , 820-n). In some embodiments, the method 1200 includes (operation 1210) providing first light having wavelengths in a first wavelength range (e.g., the first light may correspond to light having a red color) from a respective light emitting element of the first plurality of light emitting elements 810, guiding the first light by a respective waveguide of the plurality of waveguides 820 that is coupled to the respective light emitting element of the first plurality of light emitting elements 810, and transmitting the first light provided by the respective light emitting element of the first plurality of light emitting elements 810 via (e.g., by) the respective waveguide 820 as at least a portion of the illumination light 490.

In some embodiments, the light source 800 (corresponding to light source 410) also includes a second plurality of light emitting elements 830. The method 1200 further includes (operation 1212) providing second light having wavelengths in a first wavelength range (e.g., the second light may correspond to light having a green color) from a respective light emitting element of the second plurality of light emitting elements 830, guiding the second light by a respective waveguide of the plurality of waveguides 820 that is coupled to the respective light emitting element of the second plurality of light emitting elements 830, and transmitting the second light provided by the respective light emitting element of the second plurality of light emitting elements 830 via (e.g., by) the respective waveguide 820 as at least a portion of the illumination light 490.

In some embodiments, the respective waveguide of the plurality of waveguides 820 is tapered, illustrated in FIG. 8C.

In some embodiments, the light source 800 includes a plurality of light emitting elements (e.g., light emitting elements 810-1 through 810-n, light emitting elements 830, and/or light emitting elements 840). The method 1200 further includes (operation 1216) activating a subset, less than all, of the plurality of light emitting elements.

In some embodiments, the reflective surface 730-1 is curved.

In some embodiments, the reflective surface 730-1 includes a full reflector (e.g., a mirror).

In some embodiments, the optical element 730 includes a second surface 730-2 that is opposite to the reflective surface 730-1. The method 1200 further includes (operation 1232) transmitting the at least a portion 490-1 of the illumination light 490 from the light source 410 through the second surface 730-2 toward the reflective surface 730-1 and transmitting the at least a portion 490-1 of the illumination light 490 reflected from the reflective surface 730-1 through the second surface 730-2.

In some embodiments, the method 1200 further includes (operation 1242) receiving, at a beam splitter 440, the at least a portion 490-1 of the illumination light 490 reflected at the reflective surface 730-1; providing, with the beam splitter 440 the at least a portion 490-1 of the illumination light 490 in a first direction toward the spatial light modulator 420; modulating the at least a portion 490-1 of the illumination light 490 with the spatial light modulator 420; outputting, from the spatial light modulator 420, the at least a portion 490-1 of the illumination light 490 as modulated light; receiving, at the beam splitter 440, the modulated light output from the spatial light modulator 420; and providing, with the beam splitter 440, the modulated light in a second direction that is non-parallel to the first direction.

In some embodiments, modulating the at least a portion 490-1 of the illumination light 490 with the spatial light modulator 420 includes (operation 1244) reflecting a subset, less than all, of the at least a portion 490-1 of the illumination light 490.

In light of these principles, we now turn to certain embodiments of display devices.

In accordance with some embodiments, a display device (e.g., display device 400 shown in FIG. 4A or display device 500 shown in FIG. 5A) includes a light source (e.g., light source 410), a spatial light modulator (e.g., spatial light modulator 420), and an optical assembly (e.g., optical assembly 430 or 530). The light source is configured to provide illumination light and the spatial light modulator is positioned to receive the illumination light. The optical assembly includes a first reflective surface (e.g., first reflective surface 430-1 or 530-1) and a second reflective surface (e.g., second reflective surface 430-2 or 530-2) that is opposite to the first reflective surface. The optical assembly is positioned relative to the light source so that at least a first portion of the illumination light received by the optical assembly (i) is transmitted through the first reflective surface toward the second reflective surface, (ii) is reflected by the second reflective surface toward the first reflective surface, (iii) is reflected by the first reflective surface toward the second reflective surface, and (iv) is transmitted through the second reflective surface.

In some embodiments, the display device (e.g., display device 400 or 500) further includes a beam splitter (e.g., PBS 440) that is disposed relative to (e.g., between) the optical assembly (e.g., optical assembly 430 or 530) and the spatial light modulator (e.g., spatial light modulator 420) so that the beam splitter receives the at least a first portion (e.g., first portion 490-1) of the illumination light (e.g., illumination light 490) that is transmitted through the optical assembly and provides the at least a first portion of the illumination light in a first direction. The spatial light modulator modulates the at least a first portion of the illumination light and outputs modulated light. The beam splitter receives the modulated light output from the spatial light modulator and provides the modulated light in a second direction that is non-parallel to the first direction (e.g., the second direction is perpendicular to the first direction).

In some embodiments, the first reflective surface (e.g., first reflective surface 430-1 or 530-1) is a partial reflector (e.g., 50/50 mirror or a mirror having less than 90%, 80%, 70%, 60%, 50%, 40%, 30%, 20%, or 10% reflectance).

In some embodiments, at least one of the first reflective surface (e.g., first reflective surface 430-1 or 530-1) and the second reflective surface (e.g., second reflective surface 430-2 or 530-2) is curved. For example, in FIG. 4A, the first reflective surface 430-1 is curved. In FIG. 5A, the second reflective surface 530-2 is curved.

In some embodiments, the optical assembly (e.g., optical assembly 530) further includes a third reflective surface (e.g., third reflective surface 530-3). The first reflective surface (e.g., first reflective surface 530-1) is disposed between the second reflective surface (e.g., second reflective surface 530-2) and the third reflective surface so that the optical assembly transmits the at least a first portion (e.g., first portion 490-1) of the illumination light (e.g., illumination light 490) through the third reflective surface toward the first reflective surface and receives a second portion (e.g., second portion 490-2) of the illumination light, distinct from the at least a first portion of the illumination light, such that the second portion of the illumination light is: (i) transmitted through the third reflective surface toward the first reflective surface, (ii) reflected by the first reflective surface toward the third reflective surface, (iii) reflected by the third reflective surface toward the first reflective surface, and (iv) transmitted through the first reflective surface and the second reflective surface.

In some embodiments, the light source (e.g., light source 800 shown in FIG. 8A, which corresponds to light source 410) includes a plurality of light emitting elements (e.g., light emitting elements 810) and a respective light emitting element of the plurality of light emitting elements is individually activatable.

In some embodiments, the light (e.g., light source 800 corresponding to light source 410) includes a first plurality of light emitting elements (e.g., light emitting elements 810-1 through 810-n) and a plurality of waveguides (e.g., waveguides 820-1 through 820-n). The first plurality of light emitting elements is configured to emit first light having wavelengths in a first wavelength range. A respective waveguide of the plurality of waveguides is coupled to a respective light emitting element of the first plurality of light emitting elements and is configured to transmit the first light emitted from the respective light emitting element of the first plurality of light emitting elements as at least a portion of the illumination light (e.g., illumination light 490).

In some embodiments, the light source (e.g., light source 800 corresponding to light source 410) also includes a second plurality of light emitting elements (e.g., light emitting elements 830-1 shown in FIG. 8B). The second plurality of light emitting elements is configured to output second light having wavelengths in a second wavelength range that is distinct from the first wavelength range. The respective waveguide (e.g., waveguide 820) is further coupled to a respective light emitting element of the second plurality of light emitting elements and configured to transmit the second light emitted from the respective light emitting element of the second plurality of light emitting elements as at least a portion of the illumination light (e.g., illumination light 490).

In some embodiments, a respective waveguide of the plurality of waveguides (e.g., waveguide 820-1 through 820-n) is tapered (e.g., FIG. 8C).

In some embodiments, the spatial light modulator (e.g., spatial light modulator 420) is a reflective spatial light modulator, such as a liquid crystal on silicon (LCoS) display.

In accordance with some embodiments, a method (e.g., method 900) includes (operation 902) outputting illumination light (e.g., illumination light 490) from a light source (e.g., light source 410) and (operation 920) receiving the illumination light at a first reflective surface (e.g., first reflective surface 430-1 or 530-1) of an optical assembly (e.g., optical assembly 430 or 530). The optical assembly has a second reflective surface (e.g., second reflective surface 430-2 or 530-2) that is located opposite to the first reflective surface. The method also includes (operation 922) transmitting a first portion (e.g., first portion 490-1) of the illumination light through the first reflective surface toward the second reflective surface; (operation 924) reflecting, at the second reflective surface, the first portion of the illumination light transmitted through the first reflective surface toward the first reflective surface; (operation 926) reflecting, at the first reflective surface, the first portion of the illumination light reflected by the second reflective surface toward the second reflective surface; (operation 928) transmitting, through the second reflective surface, the first portion of the illumination light reflected by the first reflective surface; and (operation 930) receiving the first portion of the illumination light at a spatial light modulator (e.g., spatial light modulator 420).

In some embodiments, the light source (e.g., light source 800 corresponding to light source 410) includes a first plurality of light emitting elements (e.g., light emitting elements 810-1 through 810-n) and a plurality of waveguides (e.g., waveguide 820-1 through 820-n). The method (e.g., method 900) further includes (operation 904) providing, from a respective light emitting element of the first plurality of light emitting elements, first light having wavelengths in a first wavelength range; guiding the first light by a respective waveguide of the plurality of waveguides that is coupled to the respective light emitting element of the first plurality of light emitting elements; and transmitting, by the respective waveguide, the first light provided by the respective light emitting element of the first plurality of light emitting elements as at least a portion of the illumination light (e.g., illumination light 490).

In some embodiments, the light source (e.g., light source 800 corresponding to light source 410) also includes a second plurality of light emitting elements (e.g., light emitting elements 830). The method (e.g., method 900) further includes (operation 910) providing, from a respective light emitting element of the second plurality of light emitting elements, second light having wavelengths in a second wavelength range distinct from the first wavelength range; guiding the second light by a respective waveguide of the plurality of waveguides (e.g., waveguides 820-1 through 820-n) that is coupled to the respective light emitting element of the second plurality of light emitting elements; and transmitting, by the respective waveguide, the second light provided by the respective light emitting element of the second plurality of light emitting elements as at least a portion of the illumination light (e.g., illumination light 490).

In some embodiments, the respective waveguide of the plurality of waveguides (e.g., waveguides 820-1 through 820-n) is tapered.

In some embodiments, the light source (e.g., light source 800 corresponding to light source 410) includes a plurality of light emitting elements (e.g., light emitting elements 810-1 through 810-n) and the method (e.g., method 900) includes (operation 916) activating a subset, less than all, of the plurality of light emitting elements.

In some embodiments, the optical assembly (e.g., optical assembly 530) further includes a third reflective surface (e.g., third reflective surface 530-3). The method (e.g., method 900) further includes (operation 940) transmitting, through the third reflective surface, the first portion (e.g., first portion 490-1) of the illumination light (e.g., illumination light 490) and a second portion (e.g., second portion 490-2) of the illumination light toward the first reflective surface. The second portion of the illumination light is distinct from the first portion of the illumination light. The method also includes reflecting the second portion of the illumination light at the first reflective surface (e.g., first reflective surface 530-1) toward the third reflective surface; reflecting, at the third reflective surface, the second portion of the illumination light reflected at the first reflective surface toward the third reflective surface; transmitting, through the first reflective surface and the second reflective surface, the second portion of the illumination light reflected by the third reflective surface; and receiving the second portion of the illumination light at the spatial light modulator (e.g., spatial light modulator 420).

In some embodiments, the method (e.g., method 900) further includes (operation 950) receiving, at a beam splitter (e.g., PBS 440), the first portion (e.g., first portion 490-1) of the illumination light (e.g., illumination light 490) transmitted through the second reflective surface (e.g., second reflective surface 430-2 or 530-2; providing, with the beam splitter, the first portion of the illumination light in a first direction toward the spatial light modulator (e.g., illumination light 390 shown in FIG. 3B); modulating, with the spatial light modulator, the first portion of the illumination light; outputting modulated light from the spatial light modulator; receiving, at the beam splitter, the modulated light output from the spatial light modulator; and providing, with the beam splitter, the modulated light in a second direction that is non-parallel to the first direction (e.g., modulated light 392).

In some embodiments, modulating the first portion of the illumination light with the spatial light modulator includes (operation 952) reflecting a subset, less than all, of the first portion of the illumination light.

In some embodiments, the first reflective surface (e.g., first reflective surface 430-1 or 530-1) is a partial reflector.

In some embodiments, at least one of the first reflective surface (e.g., first reflective surface 430-1 or 530-1) and the second reflective surface (e.g., second reflective surface 430-2 or 530-2) is curved.

In accordance with some embodiments, a display device (e.g., display device 402 shown in FIG. 4G or display device 502 shown in FIG. 5C) includes a light source (e.g., light source 410), a spatial light modulator (e.g., spatial light modulator 420), or an optical assembly (e.g., optical assembly 432 or 532). The light source is configured to provide illumination light (e.g., illumination light 490) and the spatial light modulator is positioned to receive the illumination light. The optical assembly includes a first reflective surface (e.g., first reflective surface 432-1 or 532-1) that defines an aperture (e.g., aperture 434 or 534) and a second reflective surface (e.g., second reflective surface 432-2 or 532-2) that is opposite to the first reflective surface. The optical assembly is positioned relative to the light source so that at least a first portion of the illumination light received by the optical assembly is (i) reflected by the second reflective surface toward the first reflective surface, (ii) reflected by the first reflective surface toward the second reflective surface, and (iii) transmitted through the second reflective surface.

In some embodiments, a beam splitter (e.g., PBS 440) is disposed relative to the optical assembly (e.g., optical assembly 432 or 532) and the spatial light modulator (e.g., spatial light modulator 420) so that the beam splitter receives the at least a first portion (e.g., first portion 490-1) of the illumination light (e.g., illumination light 490) output from the optical assembly and directs the at least a first portion of the illumination light in a first direction. The spatial light modulator modulates the at least a first portion of the illumination light and outputs modulated light. The beam splitter receives the modulated light output from the spatial light modulator and directs the modulated light in a second direction that is non-parallel to the first direction.

In some embodiments, the light source (e.g., light source 410) is located outside a space between the first reflective surface (e.g., first reflective surface 430-1 or 530-1) and the second reflective surface (e.g., second reflective surface 430-2 or 530-2). For example, the first reflective surface is located between the light source and the second reflective surface. The light source is aligned with the aperture (e.g., aperture 434 or 534) in the first reflective surface so that the illumination light (e.g., illumination light 490), including the at least a first portion (e.g., first portion 490-1) of the illumination light, is transmitted through the aperture of the first reflective surface toward the second reflective surface before being reflected by the second reflective surface.

In some embodiments, at least a portion of the light source (e.g., light source 410) is disposed inside the aperture (e.g., aperture 434 or 534) defined by the first reflective surface (e.g., first reflective surface 430-1 or 530-1). For example, a portion of the light source remains inserted into the aperture.

In some embodiments, the optical assembly (e.g., optical assembly 532) further includes a third reflective surface (e.g., third reflective surface 532-3) and the second reflective surface (e.g., second reflective surface 532-2) is disposed between the first reflective surface (e.g., first reflective surface 532-1) and the third reflective surface so that a second portion (e.g., second portion 490-2) of the illumination light (e.g., illumination light 490) received by the optical assembly is: (i) transmitted through the second reflective surface toward the third reflective surface, (ii) reflected by the third reflective surface toward the second reflective surface, (iii) reflected by the second reflective surface toward the third reflective surface, and (iv) transmitted through the third reflective surface.

In some embodiments, the light source (e.g., light source 410) includes a plurality of light emitting elements (e.g., light emitting elements 810 shown in FIG. 8A). A respective light emitting element of the plurality of light emitting elements is individually activatable.

In some embodiments, the light source (e.g., light source 410) includes a first plurality of light emitting elements (e.g., light emitting elements 810-1 through 810-n) and a plurality of waveguides (e.g., waveguides 820-1 through 820-n shown in FIG. 8A). A respective light emitting element of the first plurality of light emitting elements is configured to emit first light having wavelengths in a first wavelength range. A respective waveguide of the plurality of waveguides is coupled to the respective light emitting element of the first plurality of light emitting elements and configured to transmit the first light emitted from the respective light emitting element of the first plurality of light emitting elements as at least a portion of the illumination light (e.g., illumination light 490).

In some embodiments, the light source (e.g., light source) also includes a second plurality of light emitting elements (e.g., light emitting elements 830-1 through 830-n shown in FIG. 8B). A respective light emitting element of the second plurality of light emitting elements is configured to output second light having wavelengths in a second wavelength range that is distinct from the first wavelength range. The respective waveguide (e.g., waveguide 820) is further coupled to a respective light emitting element of the second plurality of light emitting elements and configured to transmit the second light emitted from the respective light emitting element of the second plurality of light emitting elements as at least a portion of the illumination light (e.g., illumination light 490).

In some embodiments, a respective waveguide of the plurality of waveguides (e.g., waveguide 820-1 through 820-n shown in FIG. 8C) is tapered.

In some embodiments, the spatial light modulator (e.g., spatial light modulator 420) is a reflective spatial light modulator.

In accordance with some embodiments, a method (e.g., method 1000) includes (operation 1002) outputting illumination light (e.g., illumination light 490) from a light source (e.g., light source 410). The light source is positioned adjacent to a first reflective surface (e.g., first reflective surface 432-1 or reflective surface 532-3) of an optical assembly (e.g., optical assembly 432 or 532). The first reflective surface defines an aperture (e.g., aperture 434 or 534). The optical assembly includes a second reflective surface (e.g., second reflective surface 432-2 or first reflective surface 532-1) that is located opposite to the first reflective surface. The method includes (operation 1030) reflecting, at the second reflective surface, a first portion (e.g., first portion 490-1) of the illumination light toward the first reflective surface; (operation 1032) reflecting, at the first reflective surface, the first portion of the illumination light reflected by the second reflective surface toward the second reflective surface; (operation 1034) transmitting, through the second reflective surface, the first portion of the illumination light reflected by the first reflective surface; and (operation 1036) receiving the first portion of the illumination light at a spatial light modulator (e.g., spatial light modulator 420).

In some embodiments, the light source (e.g., light source 800 corresponding to light source 410) includes a first plurality of light emitting elements (e.g., light emitting elements 810-1 through 810-n) and a plurality of waveguides (e.g., waveguides 820-1 through 820-n). The method (e.g., method 1000) further includes (operation 1006) providing, from a respective light emitting element of the first plurality of light emitting elements, first light having wavelengths in a first wavelength range; guiding the first light by a respective waveguide of the plurality of waveguides that is coupled to the respective light emitting element of the first plurality of light emitting elements; and transmitting, by the respective waveguide, the first light provided by the respective light emitting element of the first plurality of light emitting elements as at least a portion of the illumination light (e.g., illumination light 490).

In some embodiments, the light source (e.g., light source 800 corresponding to light source 410) also includes a second plurality of light emitting elements (e.g., light emitting elements 830). The method (e.g., method 1000) further includes (operation 1010) providing, from a respective light emitting element of the second plurality of light emitting elements, second light having wavelengths in a second wavelength range distinct from the first wavelength range; guiding the second light by a respective waveguide of the plurality of waveguides (e.g., waveguides 820-1 through 820-n) that is coupled to the respective light emitting element of the second plurality of light emitting elements; and transmitting, by the respective waveguide, the second light provided by the respective light emitting element of the second plurality of light emitting elements as at least a portion of the illumination light (e.g., illumination light 490).

In some embodiments, the respective waveguide of the plurality of waveguides (e.g., waveguides 820-1 through 820-n) is tapered.

In some embodiments, the light source (e.g., light source 800 corresponding to light source 410) includes a plurality of light emitting elements (e.g., light emitting elements 810-1 through 810-n). The method (e.g., method 1000) includes (operation 1014) activating a subset, less than all, of the plurality of light emitting elements.

In some embodiments, the method (e.g., method 1000) further includes (operation 1020) transmitting the illumination light (e.g., illumination light 490), including the first portion (e.g., first portion 490-1) of the illumination light, through the aperture (e.g., aperture 434 or 534) in the first reflective surface (e.g., first reflective surface 432-1 or reflective surface 532-3) toward the second reflective surface (e.g., second reflective surface 432-2 or reflective surface 532-1).

In some embodiments, at least a portion of the light source (e.g., light source 410) is disposed in the aperture (e.g., aperture 434 or 534) in the first reflective surface (e.g., first reflective surface 432-1 or third reflective surface 532-3).

In some embodiments, the optical assembly (e.g., optical assembly 532) further includes a third reflective surface (e.g., second reflective surface 532-2) and the method (e.g., method 1000) further includes (operation 1040) transmitting a second portion (e.g., second portion 490-2) of the illumination light (e.g., illumination light 490) at the second reflective surface (e.g., first reflective surface 532-1) toward the third reflective surface. The second portion of the illumination light is distinct from the first portion (e.g., first portion 490-1) of the illumination light. The method also includes reflecting, at the third reflective surface, the second portion of the illumination light transmitted at the second reflective surface toward the second reflective surface; reflecting, at the second reflective surface, the second portion of the illumination light reflected at the third reflective surface toward the third reflective surface; and transmitting, through the third reflective surface, the second portion of the illumination light reflected by the second reflective surface.

In some embodiments, the method (e.g., method 1000) further includes (operation 1050) receiving, at a beam splitter (e.g., PBS 440), the first portion (e.g., first portion 490-1) of the illumination light (e.g., illumination light 490) transmitted through the second reflective surface (e.g., second reflective surface 432-2 or first reflective surface 532-1); directing, with the beam splitter, the first portion of the illumination light in a first direction toward the spatial light modulator (e.g., spatial light modulator 420); modulating, with the spatial light modulator, the first portion of the illumination light; outputting modulated light from the spatial light modulator; receiving, at the beam splitter, the modulated light output from the spatial light modulator; and directing, with the beam splitter, the modulated light in a second direction that is non-parallel to the first direction.

In some embodiments, modulating the first portion (e.g., first portion 490-1) of the illumination light (e.g., illumination light 490) with the spatial light modulator (e.g., spatial light modulator 420) includes (operation 1052) reflecting a subset, less than all, of the first portion of the illumination light.

In accordance with some embodiments, a display device (e.g., display device 600 shown in FIG. 6A, display device 602 shown in FIG. 6D, or display device 604 shown in FIG. 6E) includes a light source (e.g., light source 410), a spatial light modulator (e.g., spatial light modulator 420), and an optical assembly (e.g., optical assembly 630, 632, 634). The light source is configured to provide illumination light (e.g., illumination light 490) and the spatial light modulator is positioned to receive the illumination light. The optical assembly includes an optical element (e.g., optical element 640) and a curved reflector (e.g., curved reflector 650) that is distinct and separate from the optical element. The curved reflector is disposed relative to the light source so that at least a portion (e.g., portion 490-1) of the illumination light is: (i) reflected by the curved reflector toward the optical element, (ii) reflected by the optical element toward the curved reflector, and (iii) transmitted through the curved reflector.

In some embodiments, the display device (e.g., display device 600, 602, or 604) includes a beam splitter (e.g., PBS 440) disposed relative to the optical assembly (e.g., optical assembly 630, 632, 634) and the spatial light modulator (e.g., spatial light modulator 420) so that the beam splitter receives the at least a portion (e.g., portion 490-1) of the illumination light (e.g., illumination light 490) output from the light source (e.g., light source 410) and provides the at least a portion of the illumination light in a first direction. The spatial light modulator (e.g., spatial light modulator 420) modulates the illumination light and outputs modulated light. The beam splitter receives the modulated light output from the spatial light modulator and provides the modulated light in a second direction that is non-parallel to the first direction.

In some embodiments, the optical assembly is disposed relative to the light source and the spatial light modulator so that the at least a portion of the illumination light received by the optical assembly is transmitted through the optical element toward the curved reflector before being reflected by the curved reflector.

In some embodiments, the optical element (e.g., optical element 640) defines an aperture (e.g., aperture 644) and the optical assembly is disposed relative to the light source (e.g., light source 410) and the spatial light modulator (e.g., spatial light modulator 420) so that the at least a portion (e.g., portion 490-1) of the illumination light (e.g., illumination light 490) received by the optical assembly (e.g., optical assembly 630, 632, or 634) is transmitted through the aperture of the optical element toward the curved reflector (e.g., curved reflector 650) before being reflected by the curved reflector.

In some embodiments, at least a portion of the light source (e.g., light source 410) is disposed inside the aperture (e.g., aperture 644) of the optical element (e.g., optical element 640).

In some embodiments, the light source (e.g., light source 410) is disposed between the curved reflector (e.g., curved reflector 650) and the optical element (e.g., optical element 640).

In some embodiments, the optical element (e.g., optical element 640) is a partial reflector (e.g., a 50/50 mirror).

In some embodiments, the light source (e.g., light source 800 shown in FIG. 8A, corresponding to light source 410) includes a plurality of light emitting elements (e.g., light emitting elements 810-1 to 810-*n*). A respective light emitting element of the plurality of light emitting elements is individually activatable.

In some embodiments, the light source (e.g., light source 800 corresponding to light source 410) includes a first plurality of light emitting elements (e.g., light emitting elements 810-1 to 810-*n*) and a plurality of waveguides (e.g., waveguides 820-1 through 820-*n*). A respective light emitting element of the first plurality of light emitting elements is configured to emit first light having wavelengths in a first wavelength range. A respective waveguide of the plurality of waveguides is coupled to a respective light emitting element of the first plurality of light emitting elements and is configured to transmit the first light emitted from the respective light emitting element of the first plurality of light emitting elements as at least a portion of the illumination light (e.g., illumination light 490).

In some embodiments, the light source (e.g., light source 800 corresponding to light source 410) also includes a second plurality of light emitting elements (e.g., light emitting elements 830 shown in FIG. 8B). The second plurality of light emitting elements is configured to output second light having wavelengths in a second wavelength range that is distinct from the first wavelength range. The respective waveguide (e.g., waveguide 820) is further coupled to a respective light emitting element of the second plurality of light emitting elements and is configured to transmit the second light emitted from the respective light emitting element of the second plurality of light emitting elements as at least a portion of the illumination light (e.g., illumination light 490).

In some embodiments, a respective waveguide of the plurality of waveguides (e.g., waveguides 820-1 through 820-*n* shown in FIG. 8C) is tapered.

In accordance with some embodiments, a method (e.g., method 1100) includes (operation 1102) outputting illumination light (e.g., illumination light 490) from a light source (e.g., light source 410), (operation 1130) receiving the illumination light at a curved reflector (e.g., curved reflector 650), and (operation 1132) reflecting at least a portion (e.g., portion 490-1) of the illumination light (e.g., illumination light 490) at the curved reflector (e.g., curved reflector 650). The method also includes (operation 1134) reflecting, at an optical element (e.g., optical element 640), the at least a portion of the illumination light reflected by the curved reflector toward the curved reflector; (operation 1136) transmitting, through the curved reflector, the at least a portion of the illumination light reflected by the optical element; and (operation 1138) receiving the at least a portion of the illumination light at a spatial light modulator (e.g., spatial light modulator 420).

In some embodiments, the light source (e.g., light source 410) is disposed between the curved reflector (e.g., curved reflector 650) and the optical element (e.g., optical element 640).

In some embodiments, the optical element (e.g., optical element 640) is a partial reflector (e.g., a 50/50 mirror).

In some embodiments, the light source (e.g., light source 800 corresponding to light source 410) includes a first plurality of light emitting elements (e.g., light emitting elements 810-1 through 810-n) and a plurality of waveguides (e.g., waveguides 820-1 through 820-n). The method (e.g., method 1100) further includes (operation 1104) providing, from a respective light emitting element of the first plurality of light emitting elements, first light having wavelengths in a first wavelength range; guiding the first light by a respective waveguide of the plurality of waveguides that is coupled to the respective light emitting element of the first plurality of light emitting elements; and transmitting, by the respective waveguide, the first light provided by the respective light emitting element of the first plurality of light emitting elements as at least a portion of the illumination light (e.g., illumination light 490).

In some embodiments, the light source (e.g., light source 800 corresponding to light source 410) also includes a second plurality of light emitting elements (e.g., light emitting elements 830). The method (e.g., method 1100) further includes (operation 1112) providing, from a respective light emitting element of the second plurality of light emitting elements, second light having wavelengths in a second wavelength range distinct from the first wavelength range; guiding the second light by a respective waveguide of the plurality of waveguides (e.g., waveguides 820-1 through 820-n) that is coupled to the respective light emitting element of the second plurality of light emitting elements; and transmitting, by the respective waveguide, the second light provided by the respective light emitting element of the second plurality of light emitting elements as at least a portion of the illumination light (e.g., illumination light 490).

In some embodiments, the respective waveguide of the plurality of waveguides (e.g., waveguides 820-1 through 820-n) is tapered.

In some embodiments, the light source (e.g., light source 800 corresponding to light source 410) includes a plurality of light emitting elements (e.g., light emitting elements 810-1 through 810-n). The method (e.g., method 1100) also includes (operation 1122) activating a subset, less than all, of the plurality of light emitting elements.

In some embodiments, the optical element (e.g., optical element 640) is disposed relative the light source (e.g., light source 410) and the curved reflector (e.g., curved reflector 650). The method (e.g., method 1100) further including (operation 1124) transmitting the at least a portion (e.g., portion 490-1) of the illumination light (e.g., illumination light 490) through the optical element (e.g., optical element 640) toward the curved reflector (e.g., curved reflector 650).

In some embodiments, the optical element (e.g., optical element 640) defines an aperture (e.g., aperture 644). The method (e.g., method 1100) further includes (operation 1126) transmitting the at least a (e.g., portion 490-1) of the illumination light (e.g., illumination light 490) through the aperture of the optical element toward the curved reflector (e.g., curved reflector 650).

In some embodiments, the optical element (e.g., optical element 640) defines an aperture (e.g., aperture 644) and at least a portion of the light source (e.g., light source 410) is disposed inside the aperture of the optical element.

In some embodiments, the method (e.g., method 1100) further includes (operation 1140) receiving, at a beam splitter (e.g., PBS 440), the at least a portion (e.g., portion 490-1) of the illumination light (e.g., illumination light 490) transmitted through the curved reflector (e.g., curved reflector 650); providing, with the beam splitter, the at least a portion of the illumination light in a first direction toward the spatial light modulator (e.g., spatial light modulator 420); modulating, with the spatial light modulator, the at least a portion of the illumination light; outputting, from the spatial light modulator, the at least a portion of the illumination light as modulated light; receiving the modulated light output from the spatial light modulator at the beam splitter; and providing, with the beam splitter, the modulated light in a second direction that is non-parallel to the first direction.

In some embodiments, modulating the at least a portion of the illumination light with the spatial light modulator includes (operation 1146) reflecting a subset, less than all, of the at least a portion of the illumination light (e.g., illumination light 490).

In accordance with some embodiments, a display device (e.g., display device 700 shown in FIG. 7 includes a light source (e.g., light source 410), a spatial light modulator (e.g., spatial light modulator 420), and an optical element (e.g., optical element 730). The light source is configured to provide illumination light (e.g., illumination light 490) and the spatial light modulator is positioned to receive the illumination light. The optical element includes a reflective surface (e.g., reflective surface 730-1). The optical element is positioned relative to the light source so that at least a portion (e.g., portion 490-1) of the illumination light (e.g., illumination light 490) received by the optical element is reflected at the reflective surface back toward the light source.

In some embodiments, the display device (e.g., display device 700) includes a beam splitter (e.g., PBS 440) that is disposed relative to the optical element (e.g., optical element 730) and the spatial light modulator (e.g., spatial light modulator 420) so that the beam splitter receives at least a portion (e.g., portion 490-1) of the illumination light (e.g., illumination light 490) reflected at the reflective surface (e.g., reflective surface 730-1) and provides the at least a portion (e.g., portion 490-1) of the illumination light (e.g., illumination light 490) in a first direction. The spatial light modulator modulates the at least a portion of the illumination light and outputs modulated light. The beam splitter receives the modulated light output from the spatial light modulator and provides the modulated light in a second direction that is non-parallel to the first direction.

In some embodiments, the reflective surface (e.g., reflective surface 730-1) is curved.

In some embodiments, the optical element (e.g., optical element 730) includes a second surface (e.g., second surface 730-2) that is opposite to the reflective surface (e.g., reflective surface 730-1). The reflective surface has a first radius of curvature and the second surface has a second radius of curvature that is different from the first curvature.

In some embodiments, the reflective surface (e.g., reflective surface 730-1) includes a full reflector (e.g., a mirror).

In some embodiments, the light source (e.g., light source 800 shown in FIG. 8A, corresponding to light source 410) includes a plurality of light emitting elements (e.g., light emitting elements 810-1 to 810-n). A respective light emitting element of the plurality of light emitting elements is individually activatable.

In some embodiments, the light source (e.g., light source 800 corresponding to light source 410) includes a first plurality of light emitting elements (e.g., light emitting elements 810-1 to 810-*n*) and a plurality of waveguides (e.g., waveguides 820-1 through 820-*n*). A respective light emitting element of the first plurality of light emitting elements is configured to emit first light having wavelengths in a first wavelength range. A respective waveguide of the plurality of waveguides is coupled to a respective light emitting element of the first plurality of light emitting elements and is configured to transmit the first light emitted from the respective light emitting element of the first plurality of light emitting elements as at least a portion of the illumination light (e.g., illumination light 490).

In some embodiments, the light source (e.g., light source 800 corresponding to light source 410) also includes a second plurality of light emitting elements (e.g., light emitting elements 830 shown in FIG. 8B). The second plurality of light emitting elements is configured to output second light having wavelengths in a second wavelength range that is distinct from the first wavelength range. The respective waveguide (e.g., waveguide 820) is further coupled to a respective light emitting element of the second plurality of light emitting elements and is configured to transmit the second light emitted from the respective light emitting element of the second plurality of light emitting elements as at least a portion of the illumination light (e.g., illumination light 490).

In some embodiments, a respective waveguide of the plurality of waveguides (e.g., waveguides 820-1 through 820-*n* shown in FIG. 8C) is tapered.

In some embodiments, the spatial light modulator (e.g., spatial light modulator 420) is a reflective spatial light modulator.

In accordance with some embodiments, a method (e.g., method 1200) includes (operation 1202) outputting illumination light (e.g., illumination light 490) from a light source (e.g., light source 410), (operation 1220) receiving at least a portion (e.g., portion 490-1) of the illumination light at a reflective surface (e.g., reflective surface 730-1) of an optical element (e.g., optical element 730), (operation 1230) reflecting the at least a portion of the illumination light at the reflective surface, and (operation 1240) receiving the at least a portion of the illumination light at a spatial light modulator (e.g., spatial light modulator 420).

In some embodiments, the reflective surface (e.g., reflective surface 730-1) is curved.

In some embodiments, the reflective surface (e.g., reflective surface 730-1) includes a full reflector (e.g., mirror).

In some embodiments, the light source (e.g., light source 800 corresponding to light source 410) includes a first plurality of light emitting elements (e.g., light emitting elements 810-1 through 810-*n*) and a plurality of waveguides (e.g., waveguides 820-1 through 820-*n*). The method (e.g., method 1200) further includes (operation 1210) providing, from a respective light emitting element of the first plurality of light emitting elements, first light having wavelengths in a first wavelength range; guiding the first light by a respective waveguide of the plurality of waveguides that is coupled to the respective light emitting element of the first plurality of light emitting elements; and transmitting, by the respective waveguide, the first light provided by the respective light emitting element of the first plurality of light emitting elements as at least a portion of the illumination light (e.g., illumination light 490).

In some embodiments, the light source (e.g., light source 800 corresponding to light source 410) also includes a second plurality of light emitting elements (e.g., light emitting elements 830). The method (e.g., method 1200) further includes (operation 1212) providing, from a respective light emitting element of the second plurality of light emitting elements, second light having wavelengths in a second wavelength range distinct from the first wavelength range; guiding the second light by a respective waveguide of the plurality of waveguides (e.g., waveguides 820-1 through 820-*n*) that is coupled to the respective light emitting element of the second plurality of light emitting elements; and transmitting, by the respective waveguide, the second light provided by the respective light emitting element of the second plurality of light emitting elements as at least a portion of the illumination light (e.g., illumination light 490).

In some embodiments, the respective waveguide of the plurality of waveguides (e.g., waveguides 820-1 through 820-*n*) is tapered.

In some embodiments, the light source (e.g., light source 800 corresponding to light source 410) includes a plurality of light emitting elements (e.g., light emitting elements 810-1 through 810-*n*). The method (e.g., method 1200) also includes (operation 1216) activating a subset, less than all, of the plurality of light emitting elements.

In some embodiments, the optical element (e.g., optical element 730) includes a second surface (e.g., second surface 730-2) that is opposite to the reflective surface (e.g., reflective surface 730-1). The method (e.g., method 1200) further includes (operation 1232) transmitting the at least a portion (e.g., portion 490-1) of the illumination light (e.g., illumination light 490) from the light source (e.g., light source 410) through the second surface toward the reflective surface, and transmitting the at least a portion of the illumination light reflected from the reflective surface through the second surface.

In some embodiments, the method (e.g., method 1200) further includes (operation 1242) receiving, at a beam splitter (e.g., PBS 440), the at least a portion (e.g., portion 490-1) of illumination light (e.g., illumination light 490) reflected at the reflective surface (e.g., reflective surface 730-1); providing, with the beam splitter, the at least a portion of the illumination light in a first direction toward the spatial light modulator (spatial light modulator 420); modulating the at least a portion of the illumination light with the spatial light modulator; outputting, from the spatial light modulator, the at least a portion of the illumination light as modulated light; receiving, at the beam splitter, the modulated light output from the spatial light modulator; and providing, with the beam splitter, the modulated light in a second direction that is non-parallel to the first direction.

In some embodiments, modulating the at least a portion (e.g., portion 490-1) of the illumination light (e.g., illumination light 490) with the spatial light modulator (e.g., spatial light modulator 420) includes (operation 1244) reflecting a subset, less than all, of the at least a portion of the illumination light.

Although various drawings illustrate operations of particular components or particular groups of components with respect to one eye, a person having ordinary skill in the art would understand that analogous operations can be performed with respect to the other eye or both eyes. For brevity, such details are not repeated herein.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A display device, comprising:
a light source configured to provide illumination light;
a spatial light modulator positioned to receive the illumination light; and
an optical assembly including an optical element and a curved reflector that is distinct and separate from the optical element, the curved reflector being disposed relative to the light source so that at least a portion of the illumination light is reflected by the curved reflector toward the optical element, is reflected by the optical element toward the curved reflector, and is transmitted through the curved reflector,
wherein the optical element is a partial reflector and the optical assembly is disposed relative to the light source and the spatial light modulator so that the at least a portion of the illumination light received by the optical assembly is transmitted through the optical element toward the curved reflector before being reflected by the curved reflector.

2. The display device of claim 1, further comprising:
a beam splitter disposed relative to the optical assembly and the spatial light modulator so that the beam splitter receives the at least a portion of the illumination light output from the light source and provides the at least a portion of the illumination light in a first direction, the spatial light modulator modulates the illumination light and outputs modulated light, and the beam splitter receives the modulated light output from the spatial light modulator and provides the modulated light in a second direction that is non-parallel to the first direction.

3. The display device of claim 1, wherein:
the optical element defines an aperture;
the optical assembly is disposed relative to the light source and the spatial light modulator so that the at least a portion of the illumination light received by the optical assembly is transmitted through the aperture of the optical element toward the curved reflector before being reflected by the curved reflector; and
at least a portion of the light source is disposed inside the aperture of the optical element.

4. The display device of claim 1, wherein:
the light source includes a plurality of light emitting elements; and
a respective light emitting element of the plurality of light emitting elements is individually activatable.

5. The display device of claim 1, wherein the light source includes:
a first plurality of light emitting elements configured to emit first light having wavelengths in a first wavelength range; and
a plurality of waveguides, a respective waveguide of the plurality of waveguides being coupled to a respective light emitting element of the first plurality of light emitting elements and configured to transmit the first light emitted from the respective light emitting element of the first plurality of light emitting elements as at least a portion of the illumination light.

6. The display device of claim 5, wherein:
the light source also includes a second plurality of light emitting elements;
the second plurality of light emitting elements is configured to output second light having wavelengths in a second wavelength range that is distinct from the first wavelength range; and
the respective waveguide is further coupled to a respective light emitting element of the second plurality of light emitting elements and configured to transmit the second light emitted from the respective light emitting element of the second plurality of light emitting elements as at least a portion of the illumination light.

7. The display device of claim 5, wherein a respective waveguide of the plurality of waveguides is tapered.

8. A display device, comprising:
a light source configured to provide illumination light;
a spatial light modulator positioned to receive the illumination light; and
an optical assembly including an optical element and a curved reflector that is distinct and separate from the optical element, the curved reflector being disposed relative to the light source so that at least a portion of the illumination light is reflected by the curved reflector toward the optical element, is reflected by the optical element toward the curved reflector, and is transmitted through the curved reflector,
wherein the light source is disposed between the curved reflector and the optical element.

9. A method, comprising:
outputting illumination light from a light source;
receiving the illumination light at a curved reflector;
reflecting, at the curved reflector, at least a portion of the illumination light;
reflecting, at an optical element, the at least a portion of the illumination light reflected by the curved reflector toward the curved reflector;
transmitting, through the curved reflector, the at least a portion of the illumination light reflected by the optical element; and
receiving the at least a portion of the illumination light at a spatial light modulator,
wherein the optical element defines an aperture and at least a portion of the light source is disposed inside the aperture of the optical element.

10. The method of claim 9, further comprising:
receiving, at a beam splitter, the at least a portion of the illumination light transmitted through the curved reflector;
providing, with the beam splitter, the at least a portion of the illumination light in a first direction toward the spatial light modulator;
modulating, with the spatial light modulator, the at least a portion of the illumination light;
outputting, from the spatial light modulator, the at least a portion of the illumination light as modulated light;
receiving, at the beam splitter, the modulated light output from the spatial light modulator; and providing, with the beam splitter, the modulated light in a second direction that is non-parallel to the first direction.

11. The method of claim 10, wherein:
modulating the at least a portion of the illumination light with the spatial light modulator includes reflecting a subset, less than all, of the at least a portion of the illumination light.

12. The method of claim 9, wherein:
the light source includes a plurality of light emitting elements; and
the method also includes activating a subset, less than all, of the plurality of light emitting elements.

13. The method of claim 9, wherein the light source includes a first plurality of light emitting elements and a plurality of waveguides, the method further comprising:
providing, from a respective light emitting element of the first plurality of light emitting elements, first light having wavelengths in a first wavelength range;
guiding the first light by a respective waveguide of the plurality of waveguides that is coupled to the respective light emitting element of the first plurality of light emitting elements; and
transmitting, by the respective waveguide, the first light provided by the respective light emitting element of the first plurality of light emitting elements as at least a portion of the illumination light.

14. The method of claim 13, wherein the light source also includes a second plurality of light emitting elements, the method further comprising:
providing, from a respective light emitting element of the second plurality of light emitting elements, second light having wavelengths in a second wavelength range distinct from the first wavelength range;
guiding the second light by a respective waveguide of the plurality of waveguides that is coupled to the respective light emitting element of the second plurality of light emitting elements; and
transmitting, by the respective waveguide, the second light provided by the respective light emitting element of the second plurality of light emitting elements as at least a portion of the illumination light.

15. The display device of claim 1, wherein the partial reflector has a predefined reflectance and a predefined transmittance.

16. The display device of claim 1, wherein the partial reflector has less than 90% reflectance and at least 15% transmittance.

17. The display device of claim 16, wherein the partial reflector has 50% reflectance and 50% transmittance.

\* \* \* \* \*